United States Patent [19]
Packer

[11] Patent Number: 5,551,054
[45] Date of Patent: Aug. 27, 1996

[54] PAGE MODE BUFFER CONTROLLER FOR TRANSFERRING NB BYTE PAGES BETWEEN A HOST AND BUFFER MEMORY WITHOUT INTERRUPTION EXCEPT FOR REFRESH

[75] Inventor: John S. Packer, San Jose, Calif.

[73] Assignee: Adaptec, Inc., Milpitas, Calif.

[21] Appl. No.: 795,161

[22] Filed: Nov. 19, 1991

[51] Int. Cl.$^6$ .................................................. G06F 12/00
[52] U.S. Cl. ................. 395/843; 364/246.91; 364/238.4; 364/242.3; 364/DIG. 1; 395/848
[58] Field of Search ..................................... 395/250, 425, 395/275, 843, 848

[56] References Cited

U.S. PATENT DOCUMENTS

| | | | |
|---|---|---|---|
| 4,454,595 | 6/1984 | Case ........................................... | 395/425 |
| 4,527,233 | 7/1985 | Ambrosius, III et al. .............. | 395/250 |
| 4,654,819 | 3/1987 | Stiffler et al. ............................ | 395/575 |
| 4,811,205 | 3/1989 | Normington et al. ................... | 395/163 |
| 4,873,666 | 10/1989 | Lefebure et al. ...................... | 365/189.07 |
| 5,034,917 | 7/1991 | Bland et al. .............................. | 395/425 |
| 5,072,420 | 12/1991 | Conley et al. .......................... | 395/425 |
| 5,121,480 | 6/1992 | Bonke et al. ............................ | 395/250 |
| 5,155,854 | 10/1992 | Flynn et al. .............................. | 395/725 |
| 5,201,037 | 4/1993 | Kohiyama et al. ..................... | 395/164 |
| 5,317,713 | 5/1994 | Glassburn ................................. | 395/425 |
| 5,438,666 | 8/1995 | Cratt et al. ............................... | 395/842 |

Primary Examiner—Thomas C. Lee
Assistant Examiner—Sang Hui Kim
Attorney, Agent, or Firm—Skjerven, Morrill, MacPherson Franklin & Friel

[57] ABSTRACT

According to the principles of this invention, a disk drive includes a page mode buffer memory controller that is used to control transfer of data from and to a buffer memory. The page mode buffer memory controller transfers a page of Nb data bytes from the buffer memory to a host of the disk drive if the data transfer is not interrupted by another request to the page mode buffer memory controller. The transfer of Nb data bytes requires only four overhead clock cycles. The page mode buffer memory controller includes a buffer prioritizer, a memory sequencer, a disk FIFO circuit, a refresh counter, a buffer address generator, and a disk byte counter. The buffer prioritizer receives request signals on port input lines and generates control output signals to the memory sequencer, disk byte counter and buffer address generator. The refresh counter repetitively loads itself with a refresh time period, that is stored in a register, for refreshing the buffer memory. After the refresh counter is loaded, the counter counts down and generates a refresh request at the end of each refresh time period. The memory sequencer includes a state machine that generates control signals for the buffer memory as well as control signals for the buffer address generator and disk byte counter. The buffer address generator generates the addresses for the locating in the buffer memory that are used in the data transfer.

28 Claims, 50 Drawing Sheets

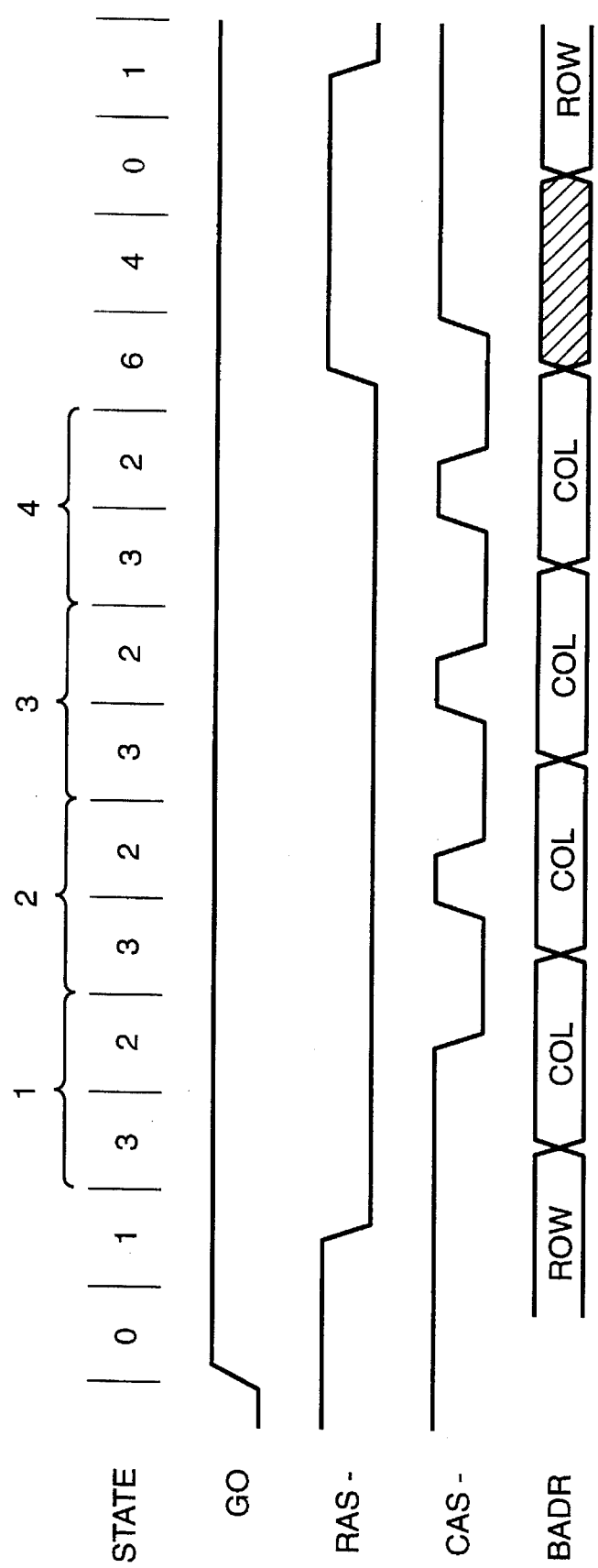
FIG._1

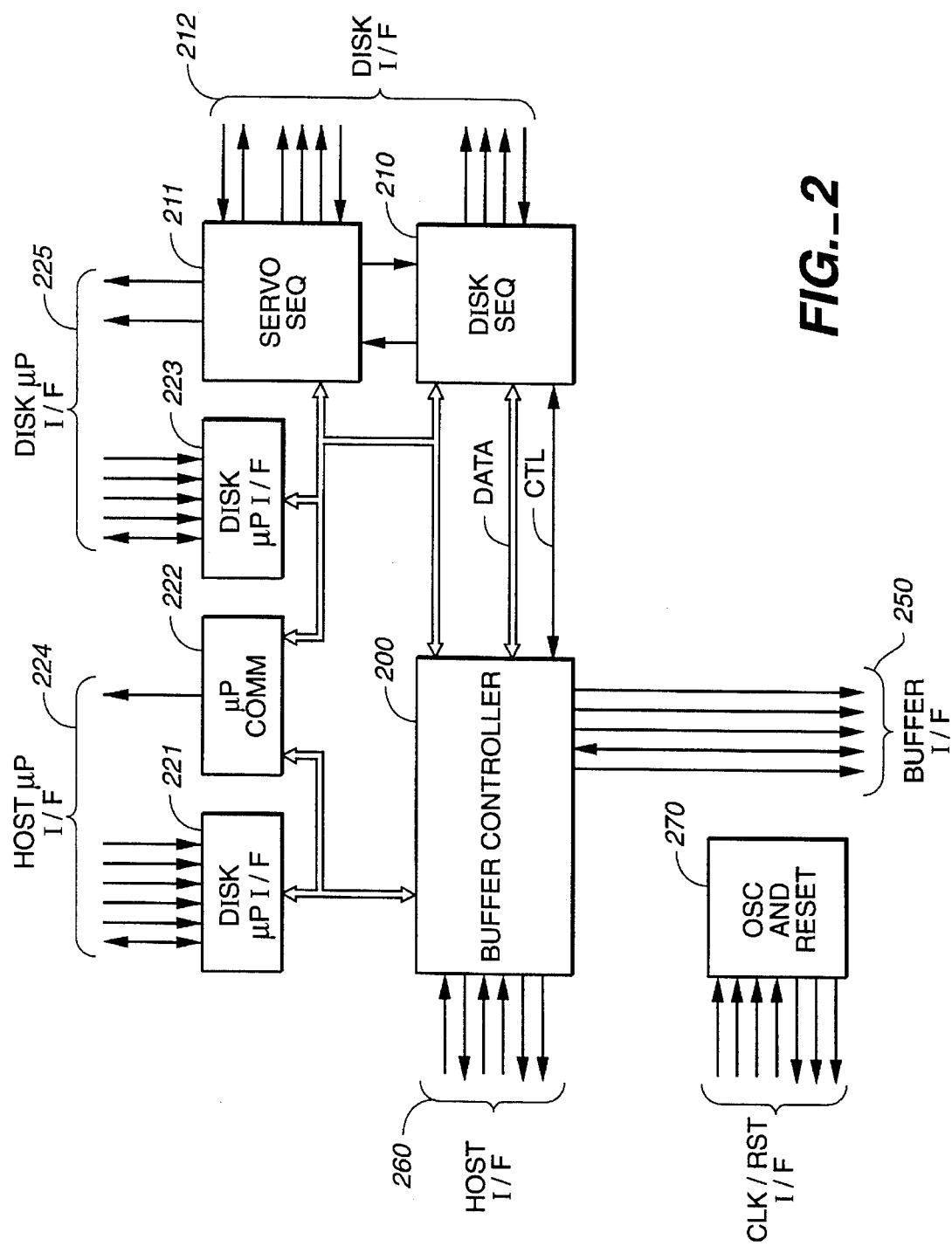
FIG._2

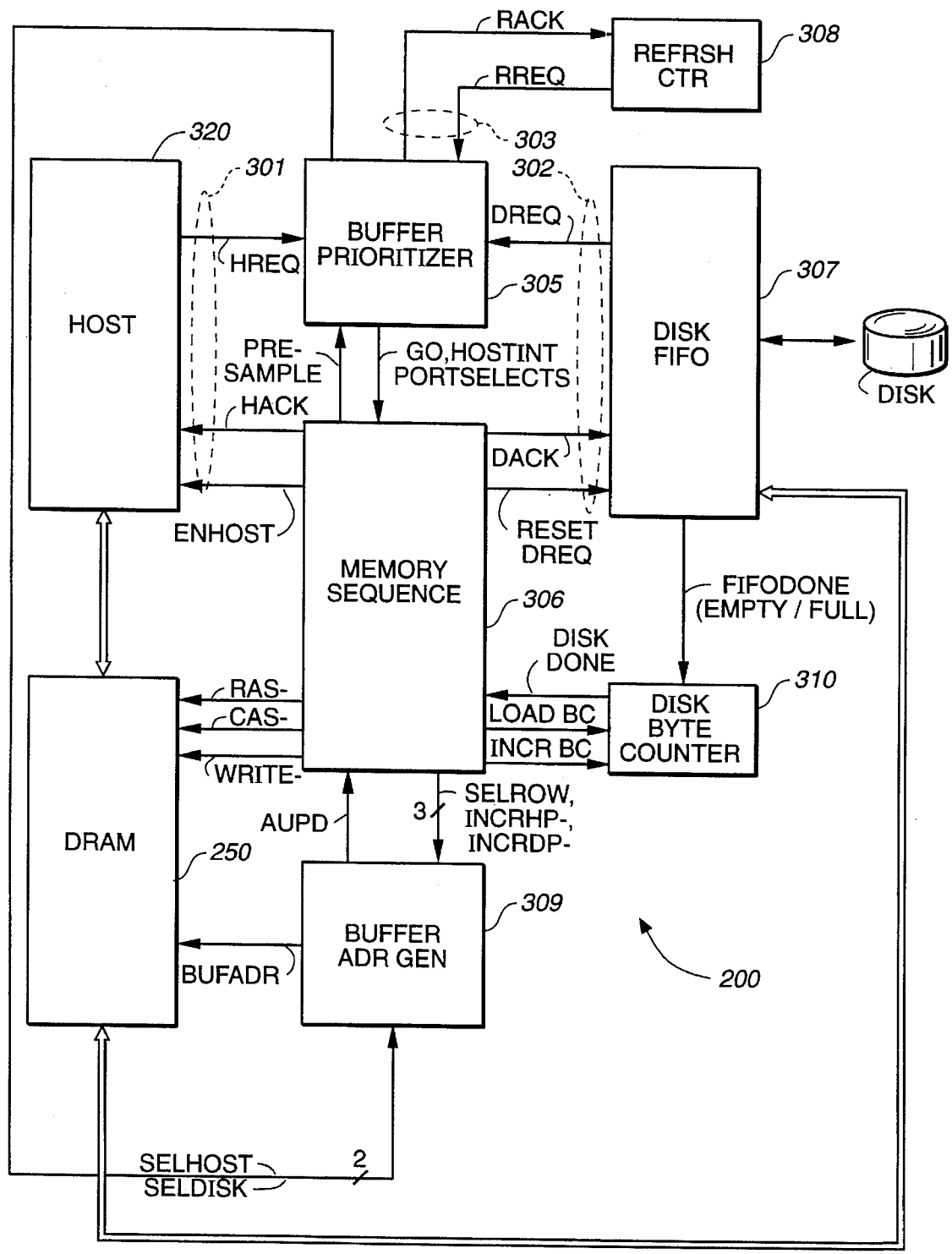
FIG._3

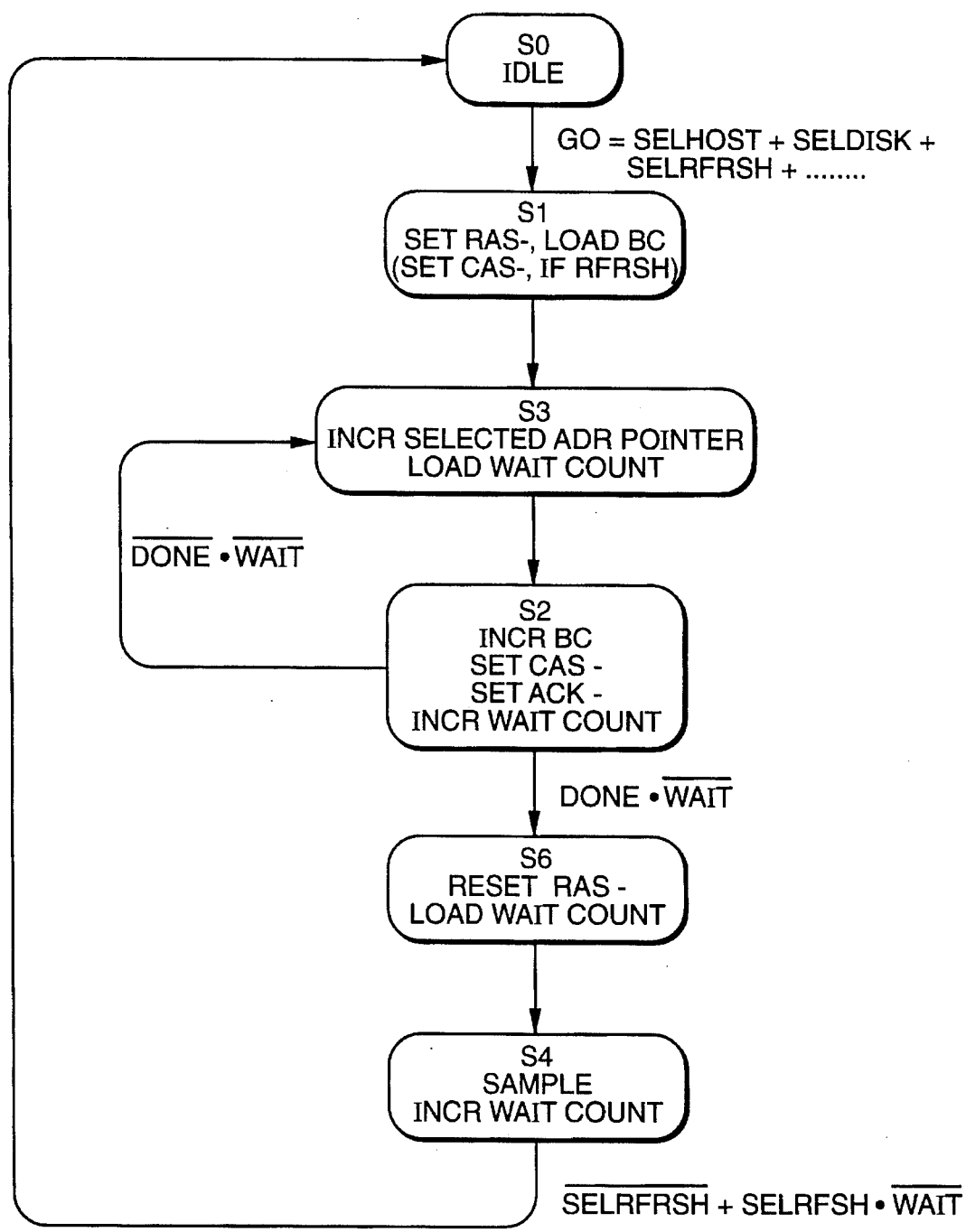
FIG._4

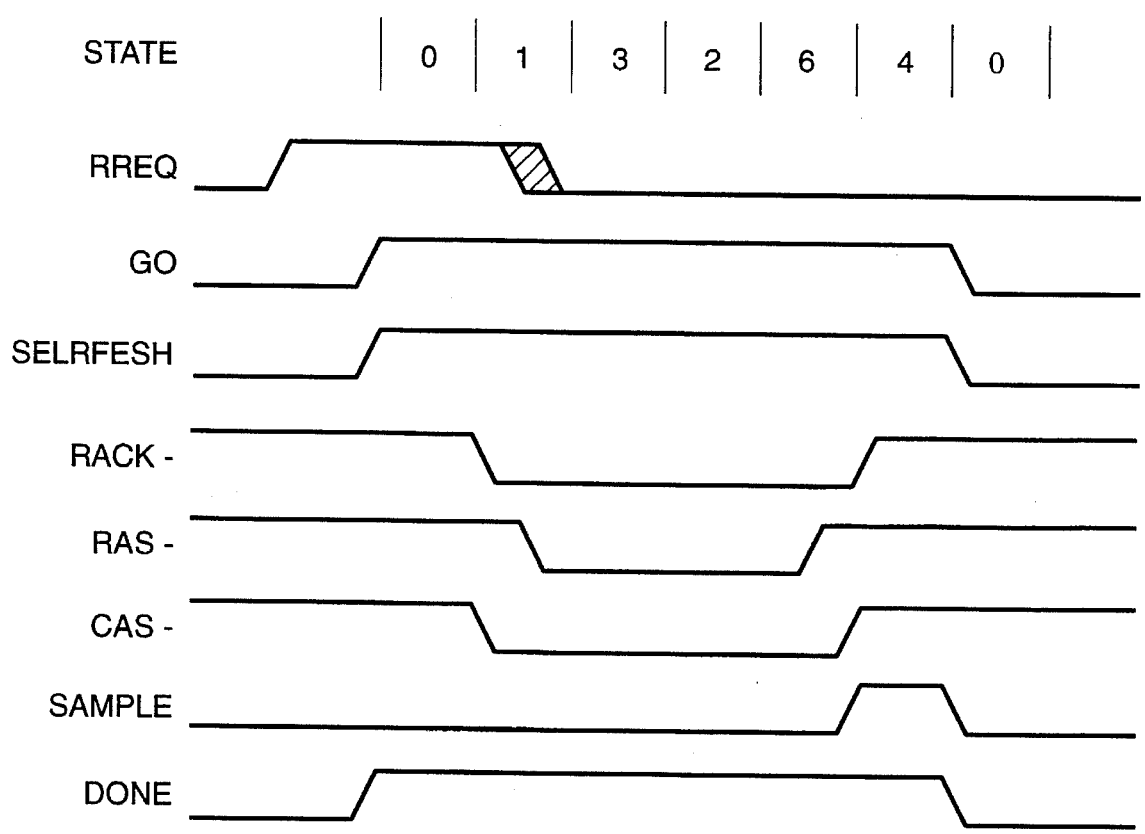
FIG._5

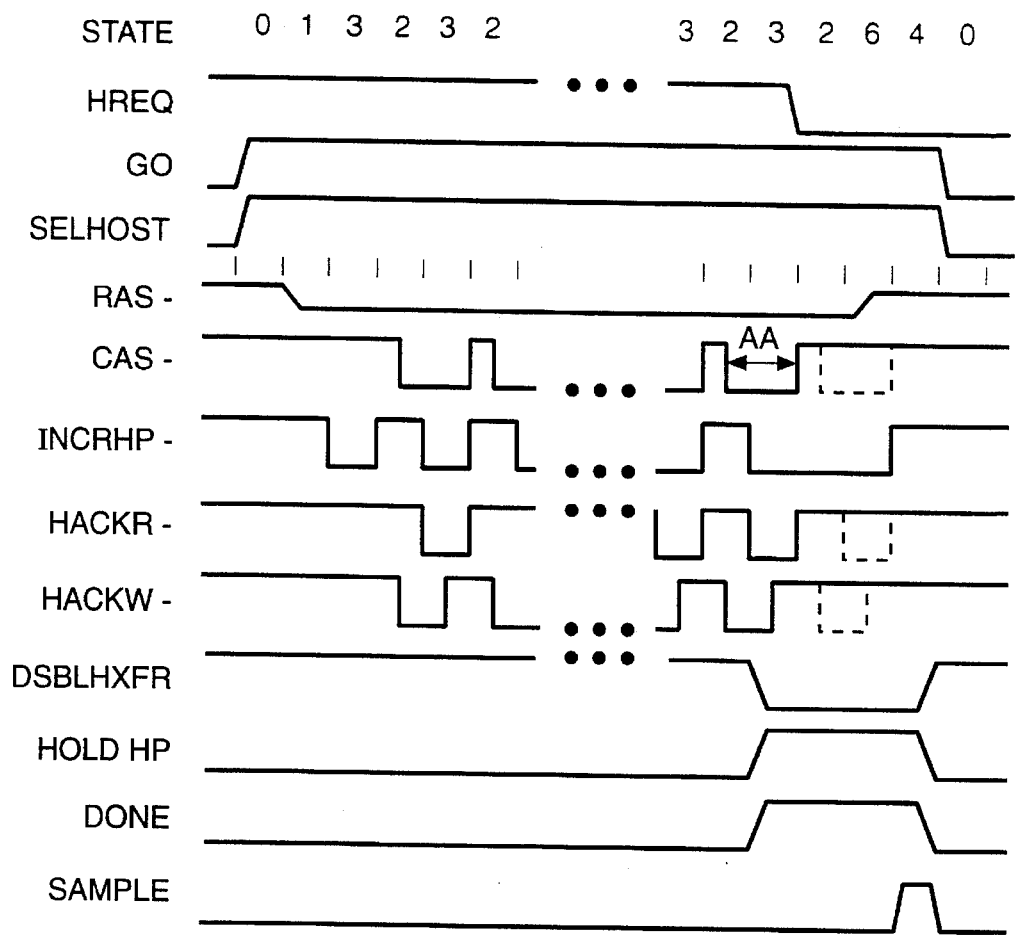
FIG._6
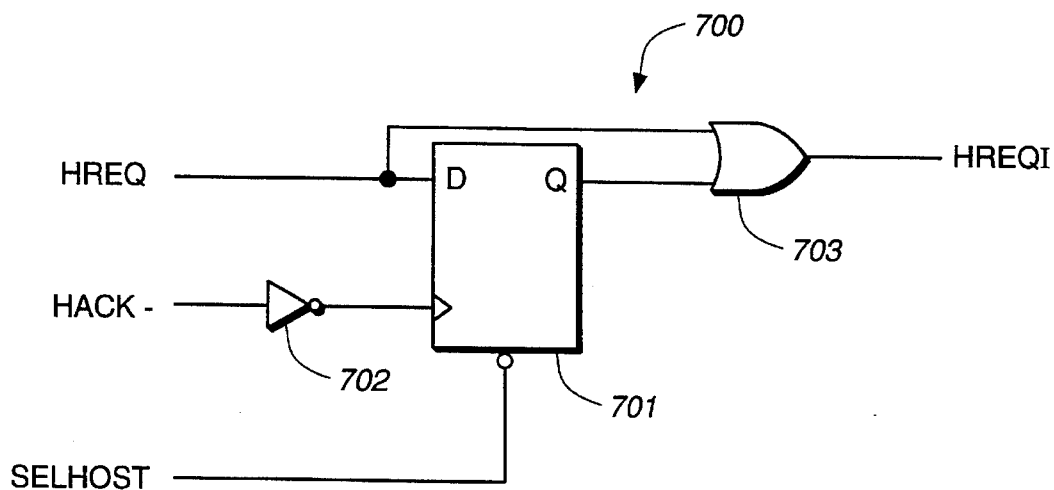
FIG._7A

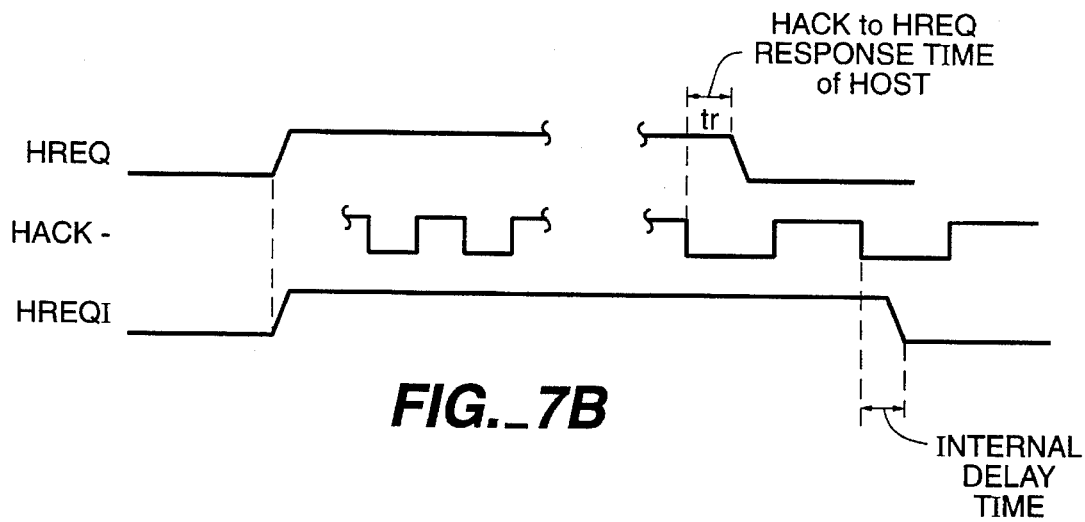
FIG._7B
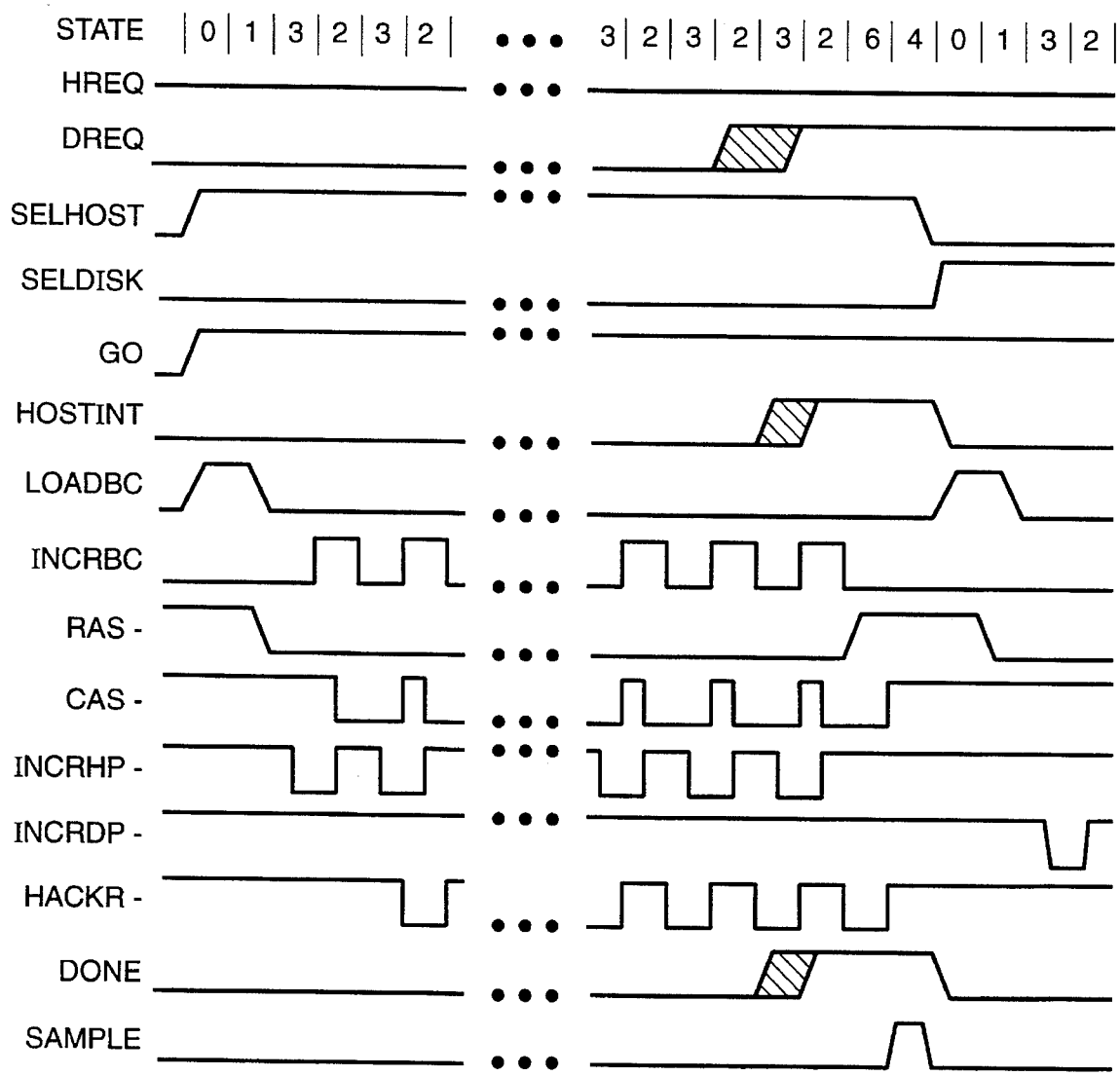
FIG._8

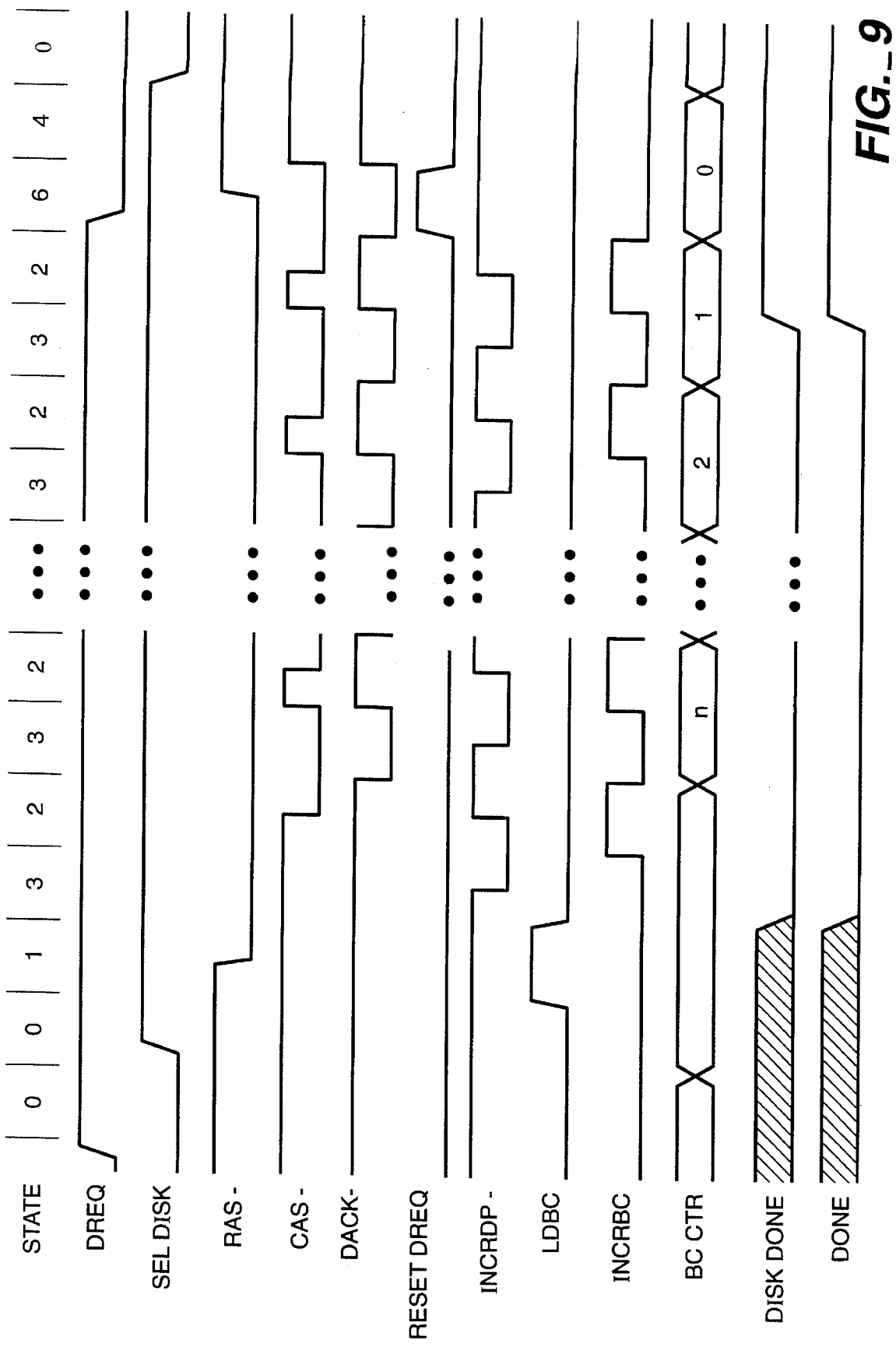
FIG._9

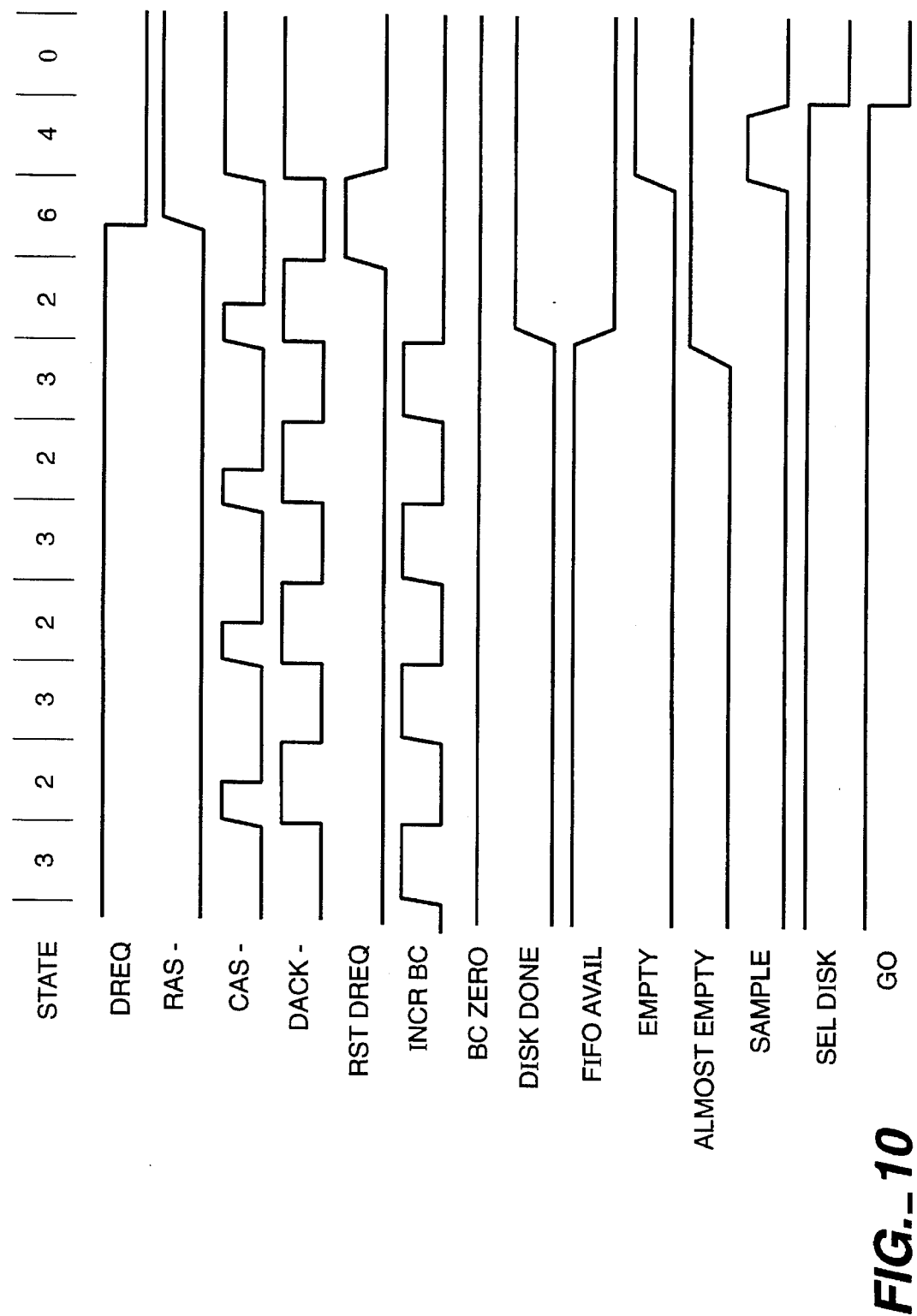
FIG._10

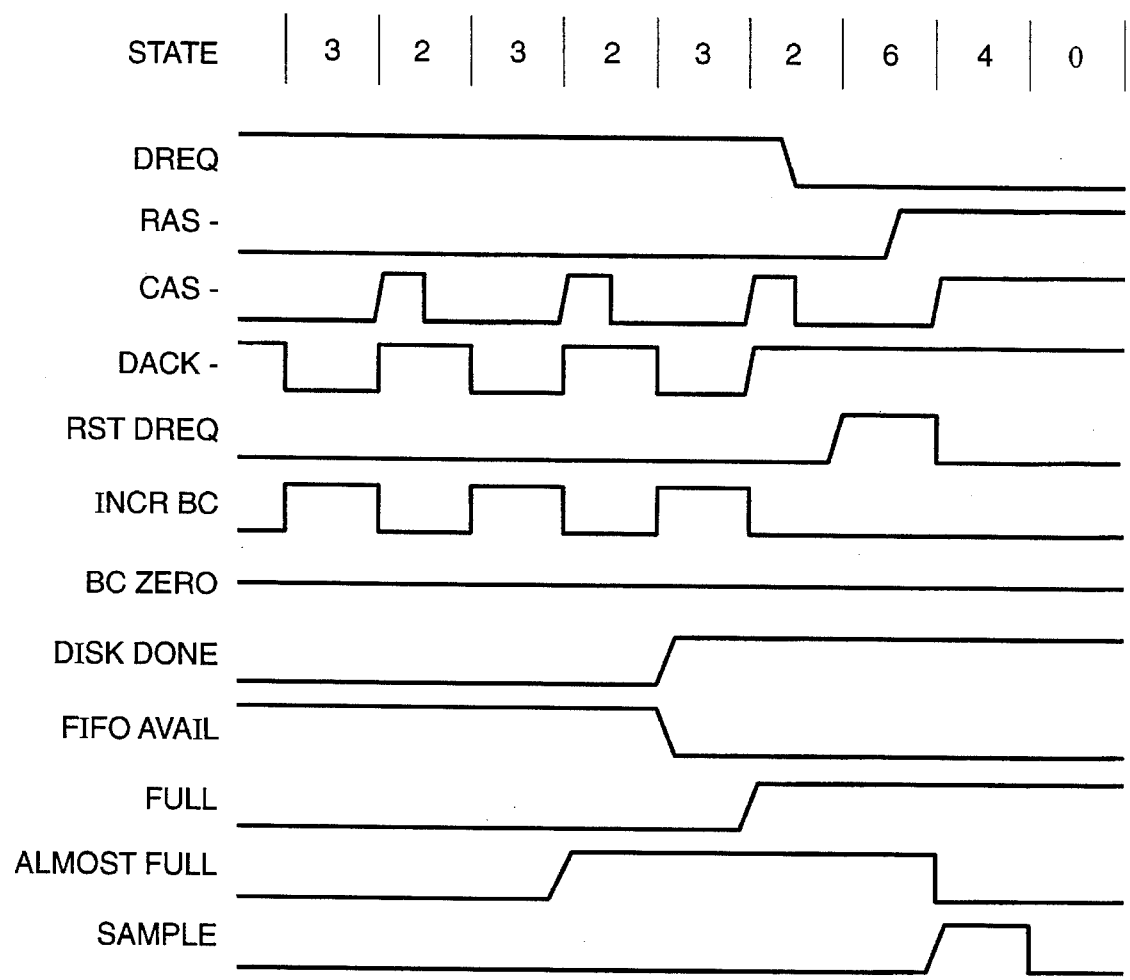
FIG._11

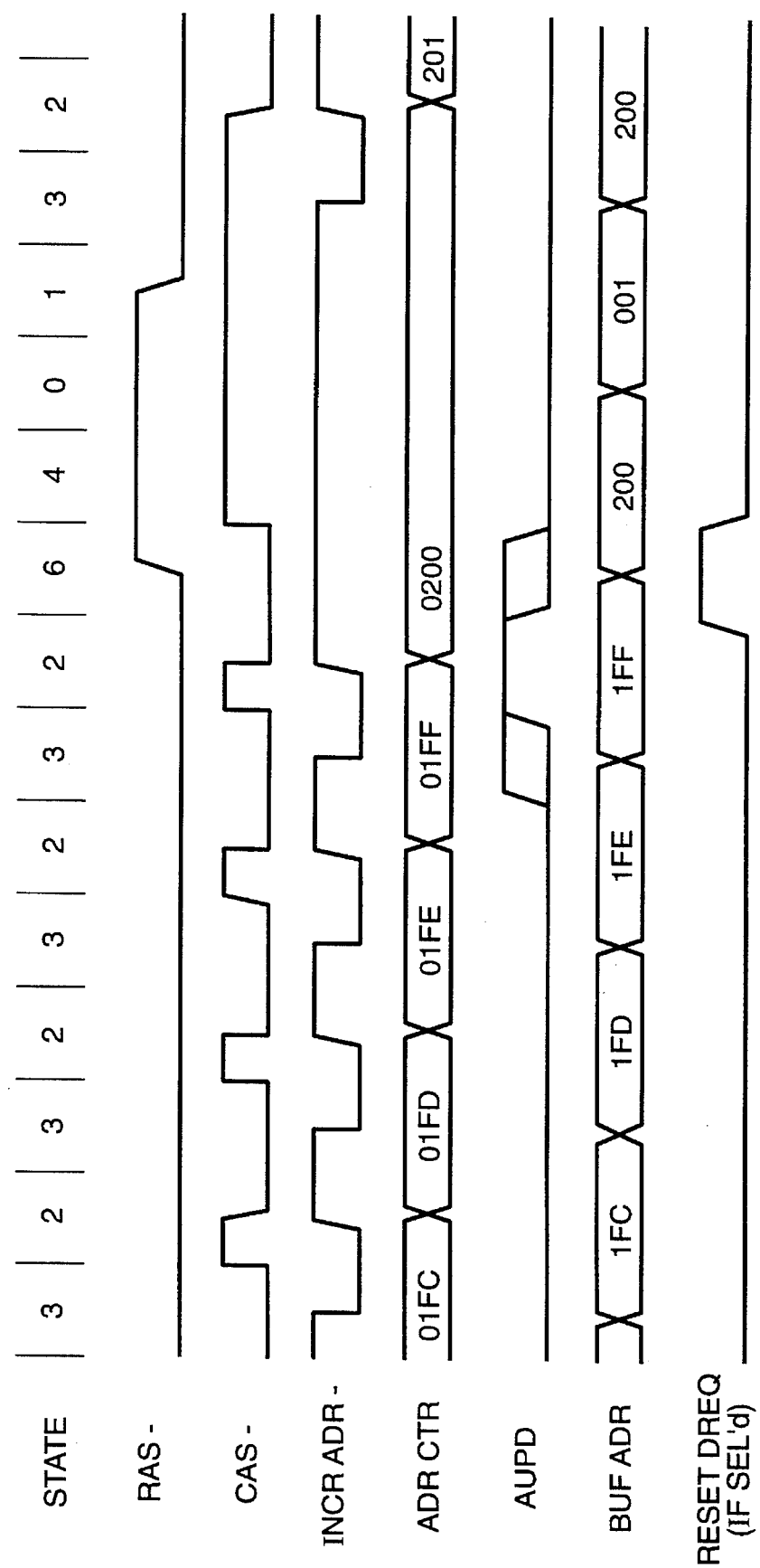
FIG._12

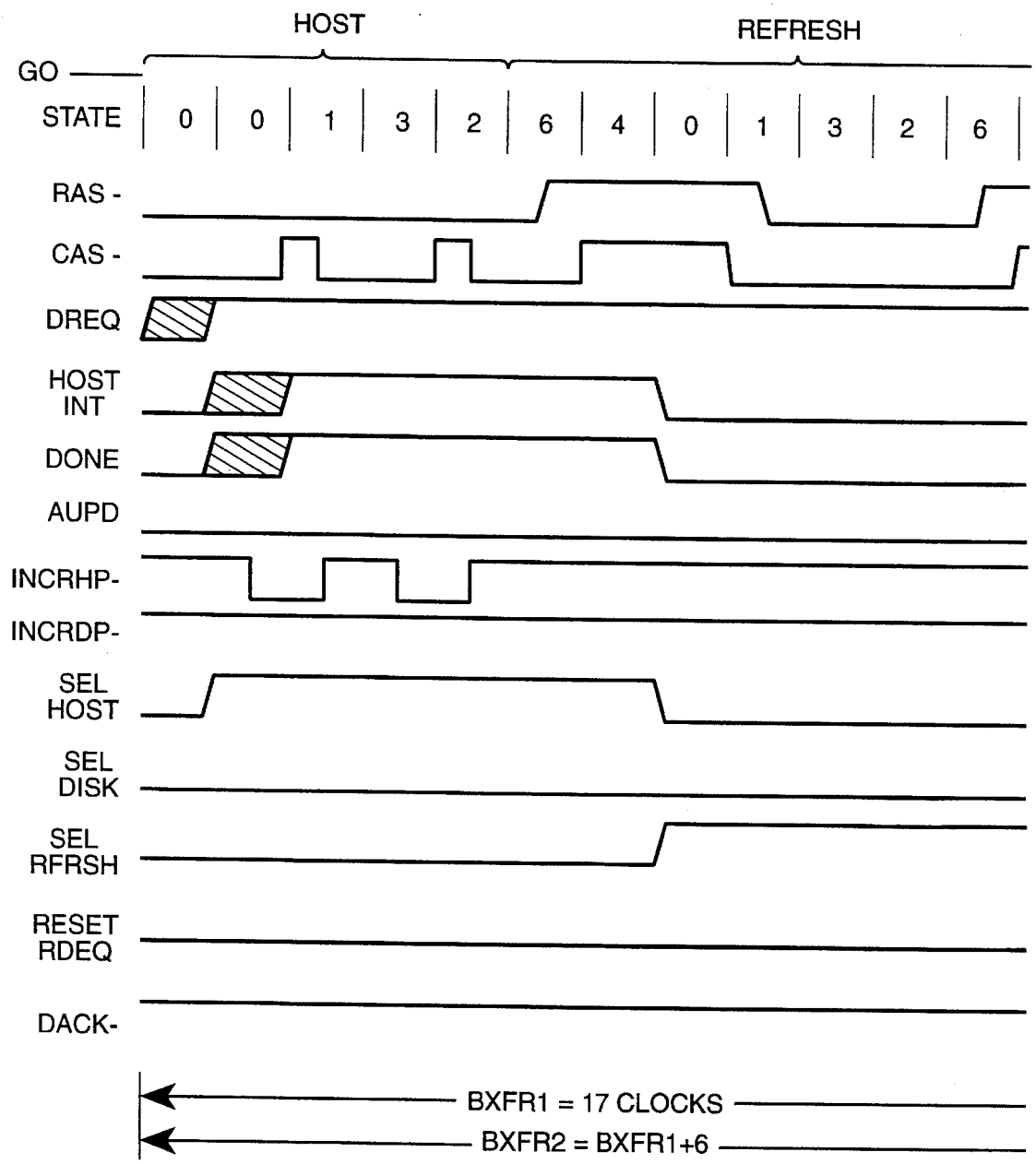
FIG._13A
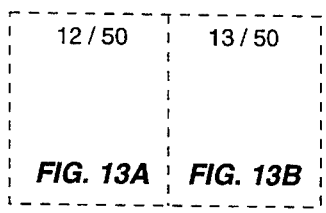
FIG._13

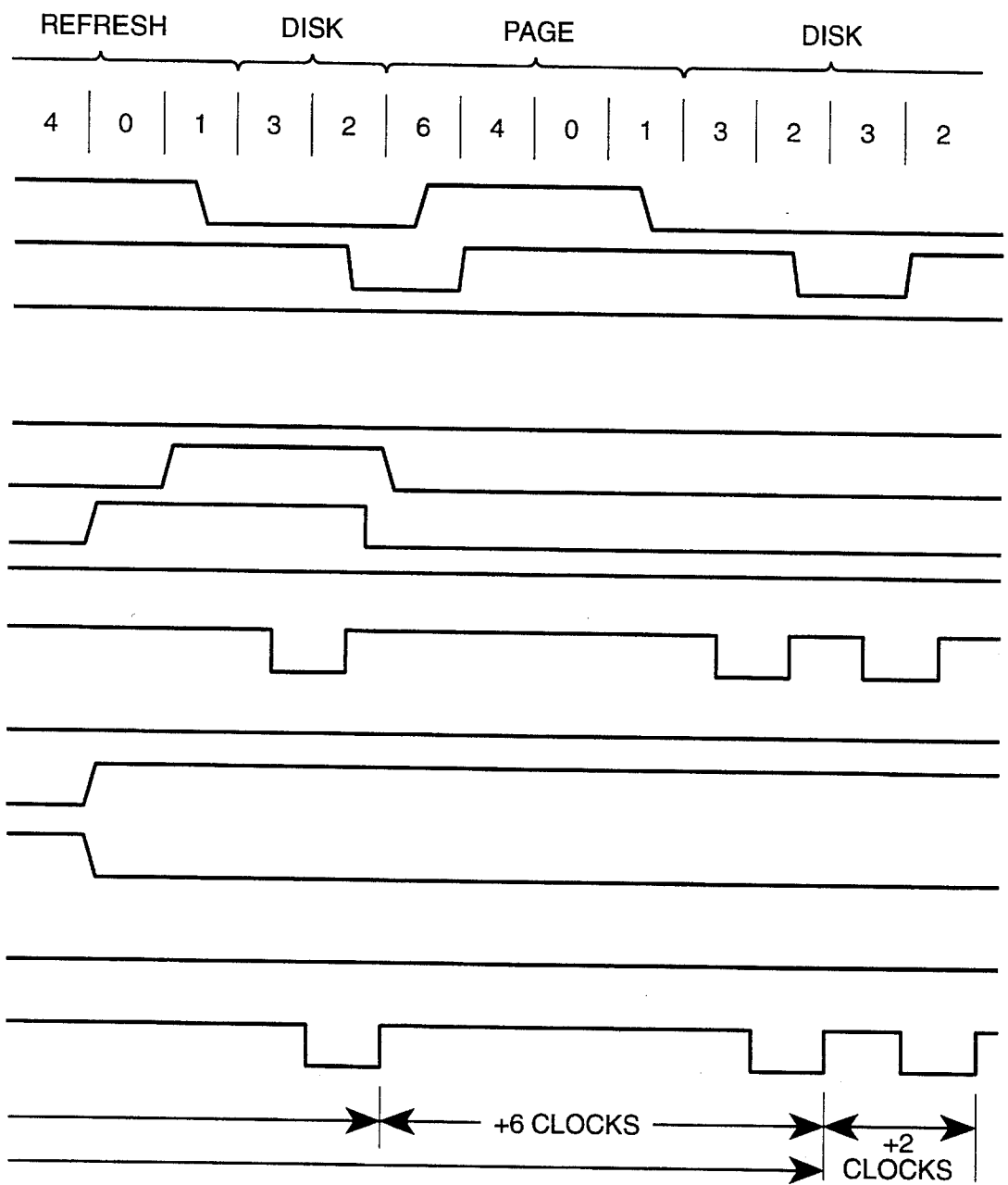
FIG._13B

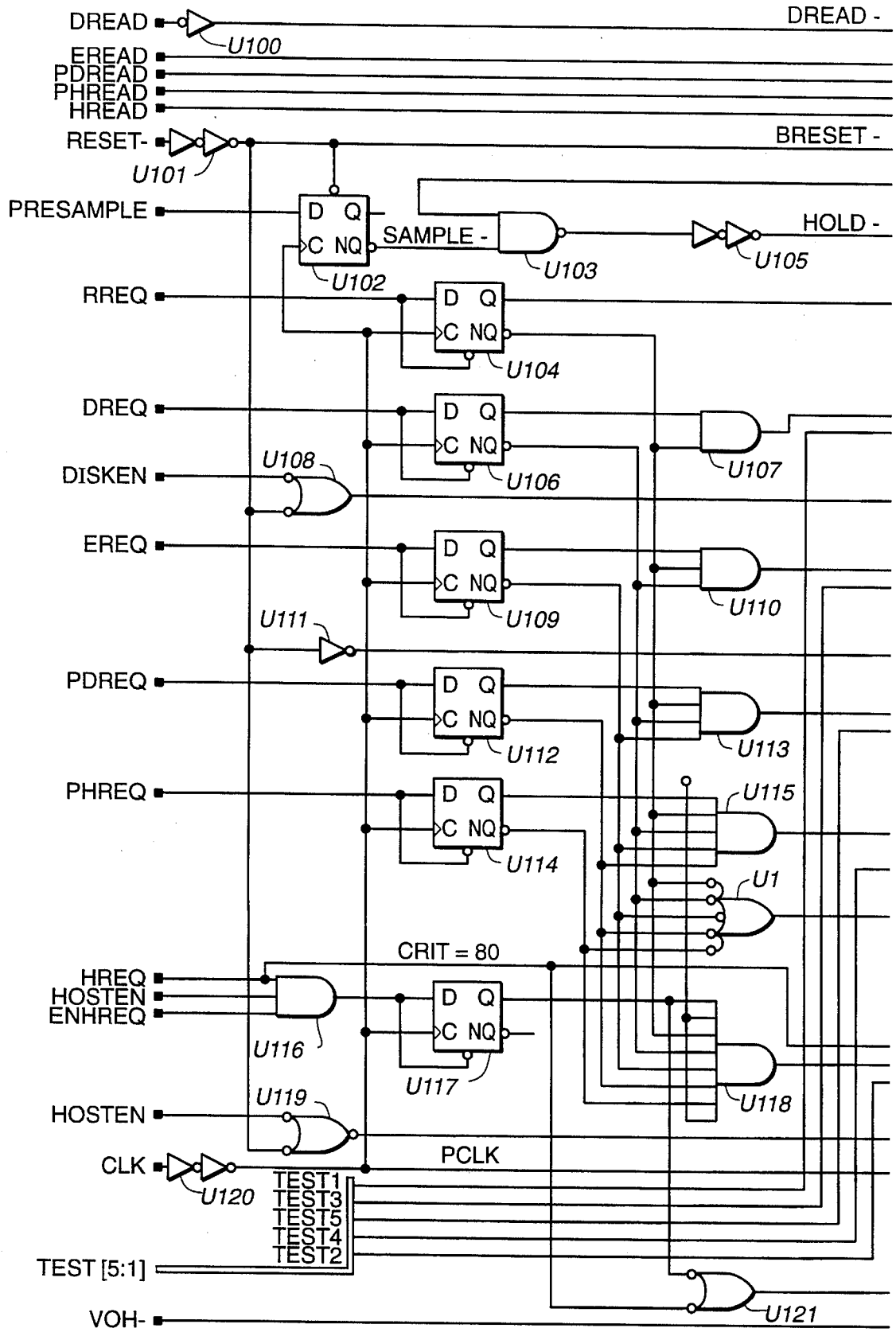
FIG._14A

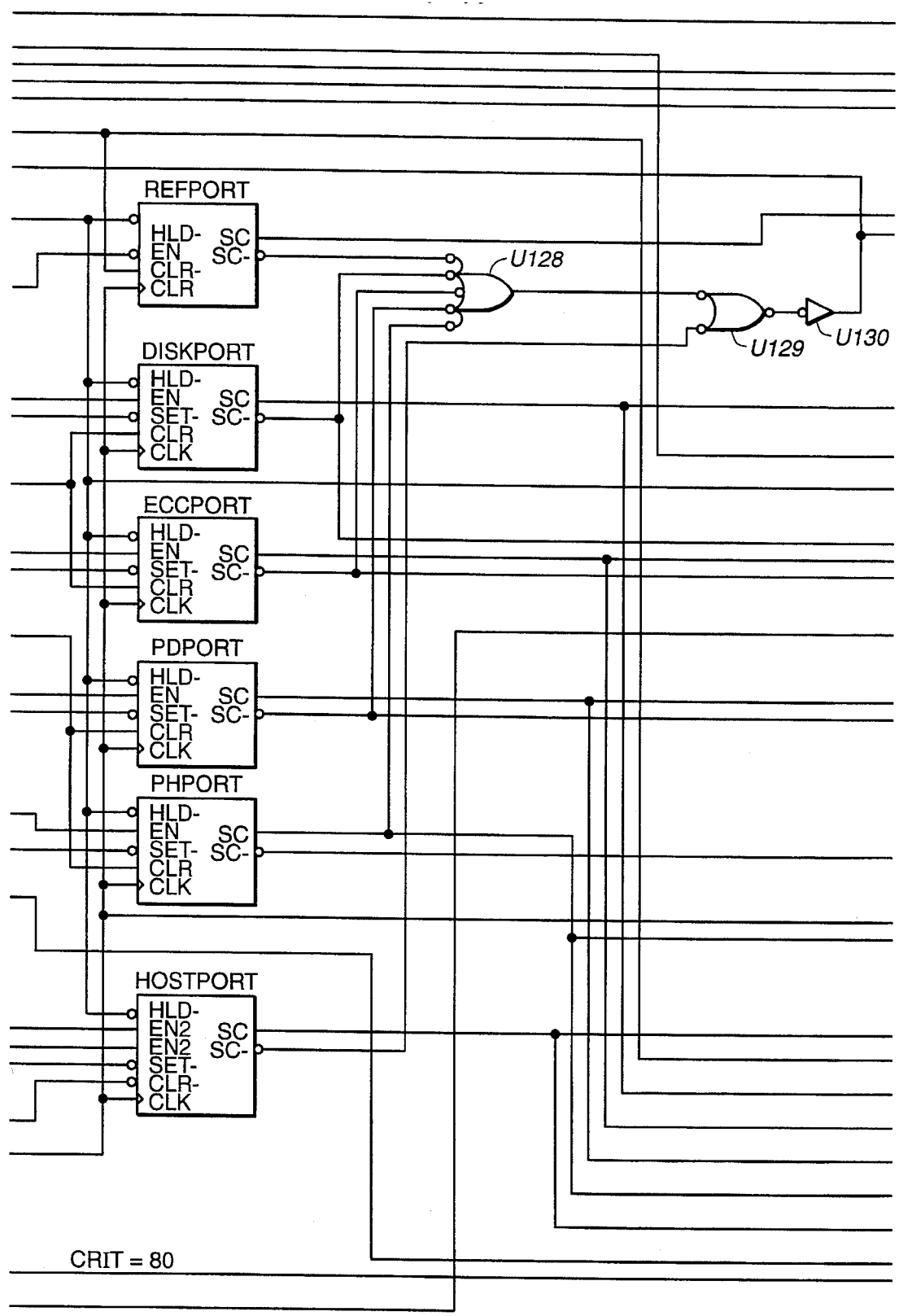
FIG._14B

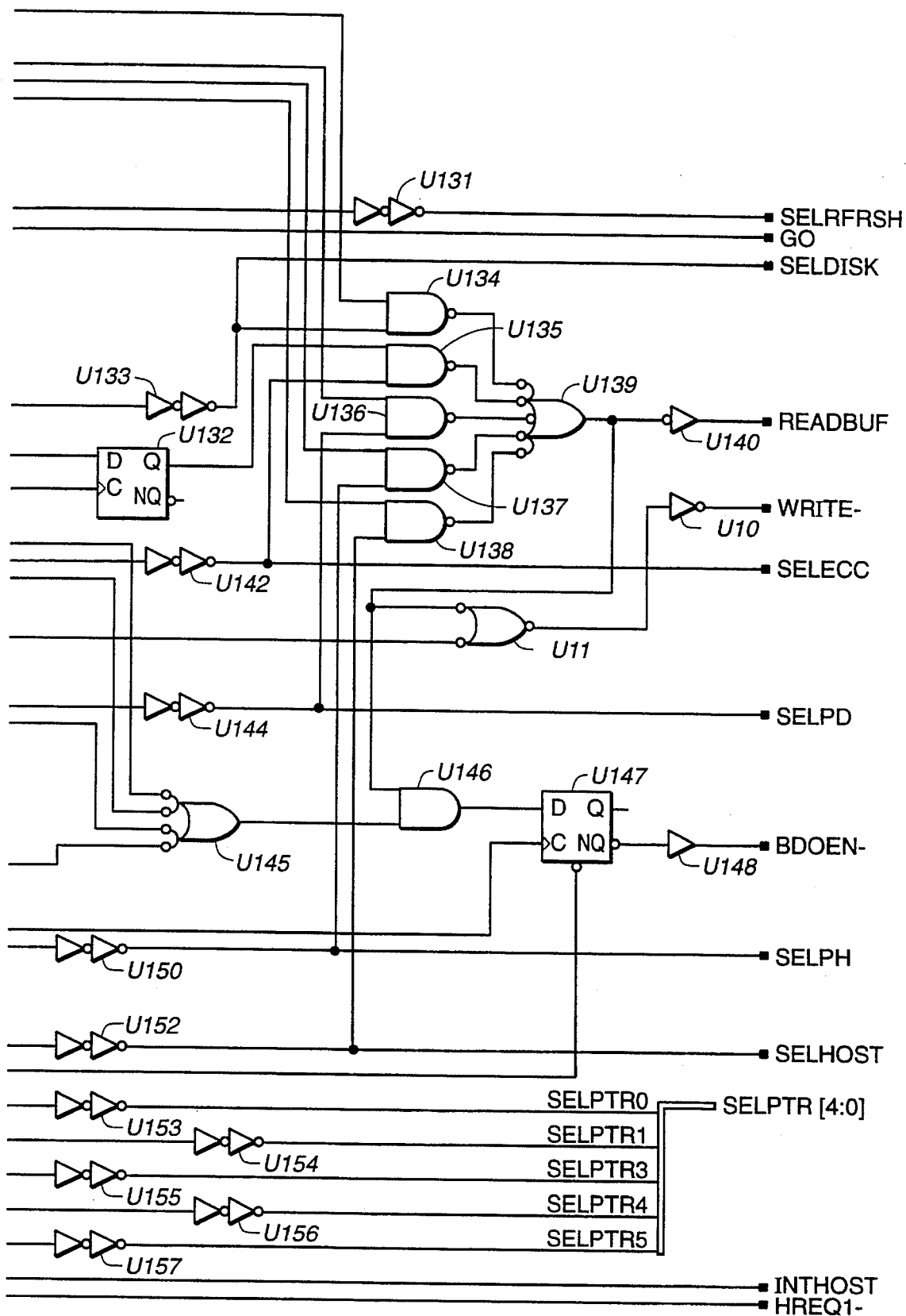
FIG._14C

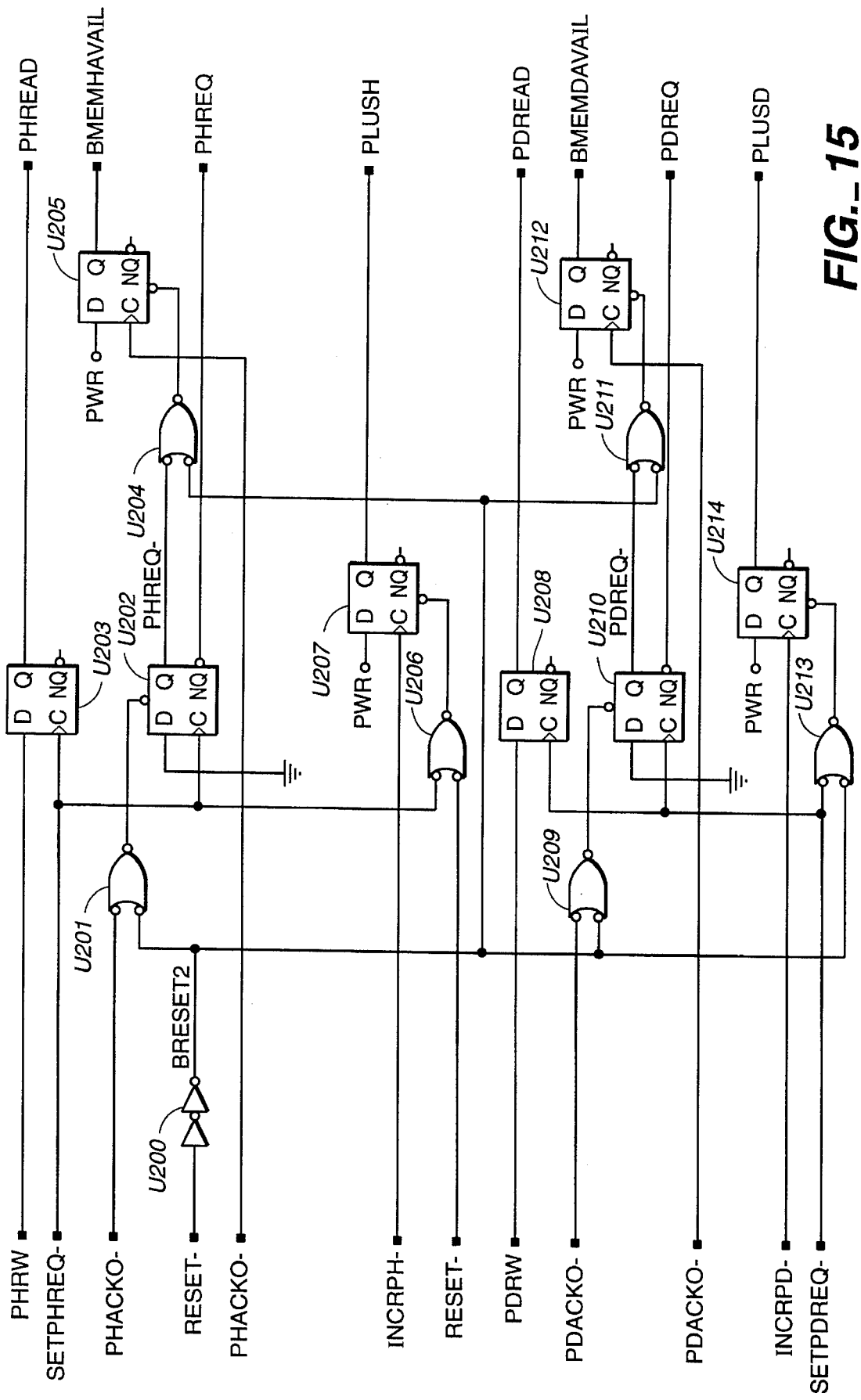
FIG._15

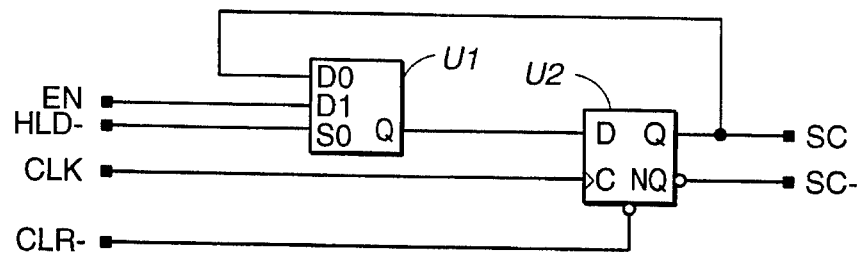
FIG._16
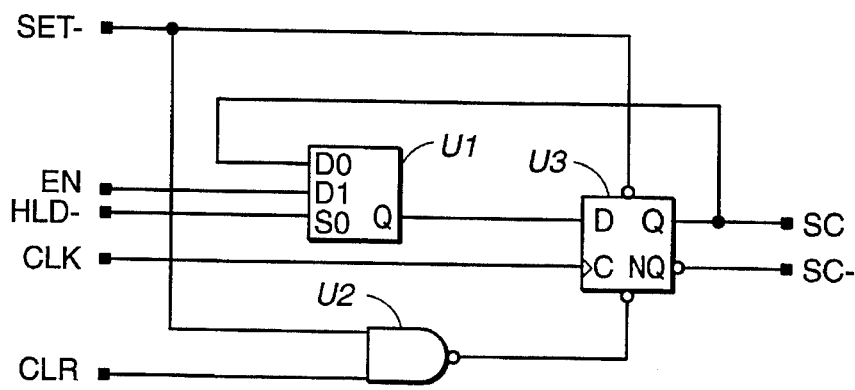
FIG._17
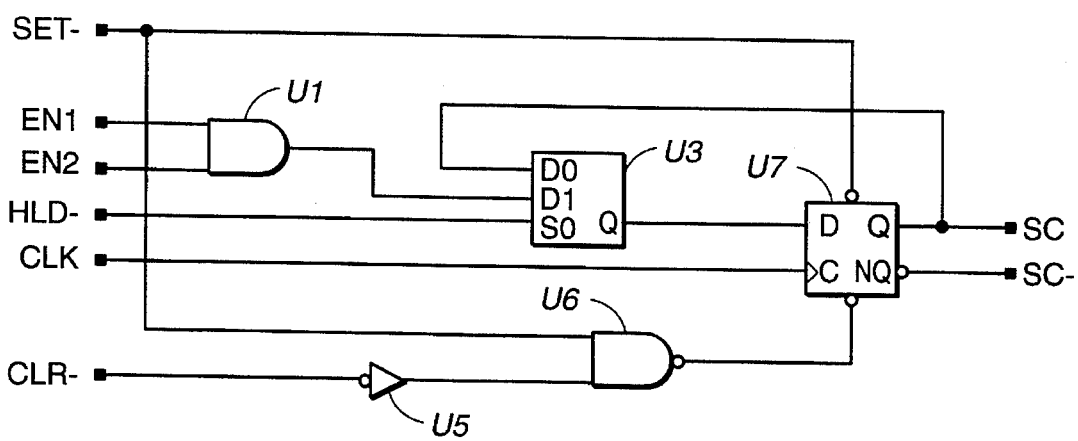
FIG._18

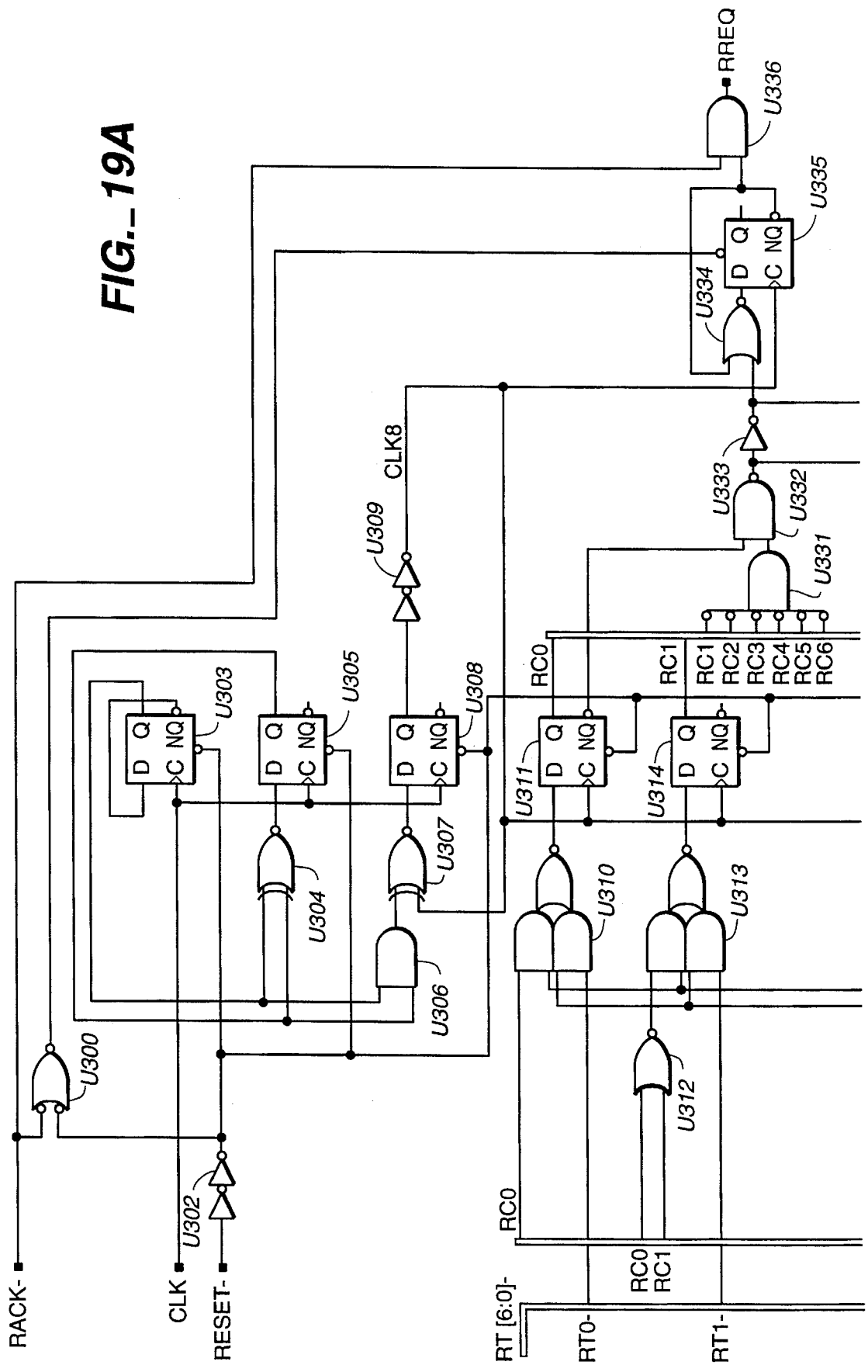
FIG._19A

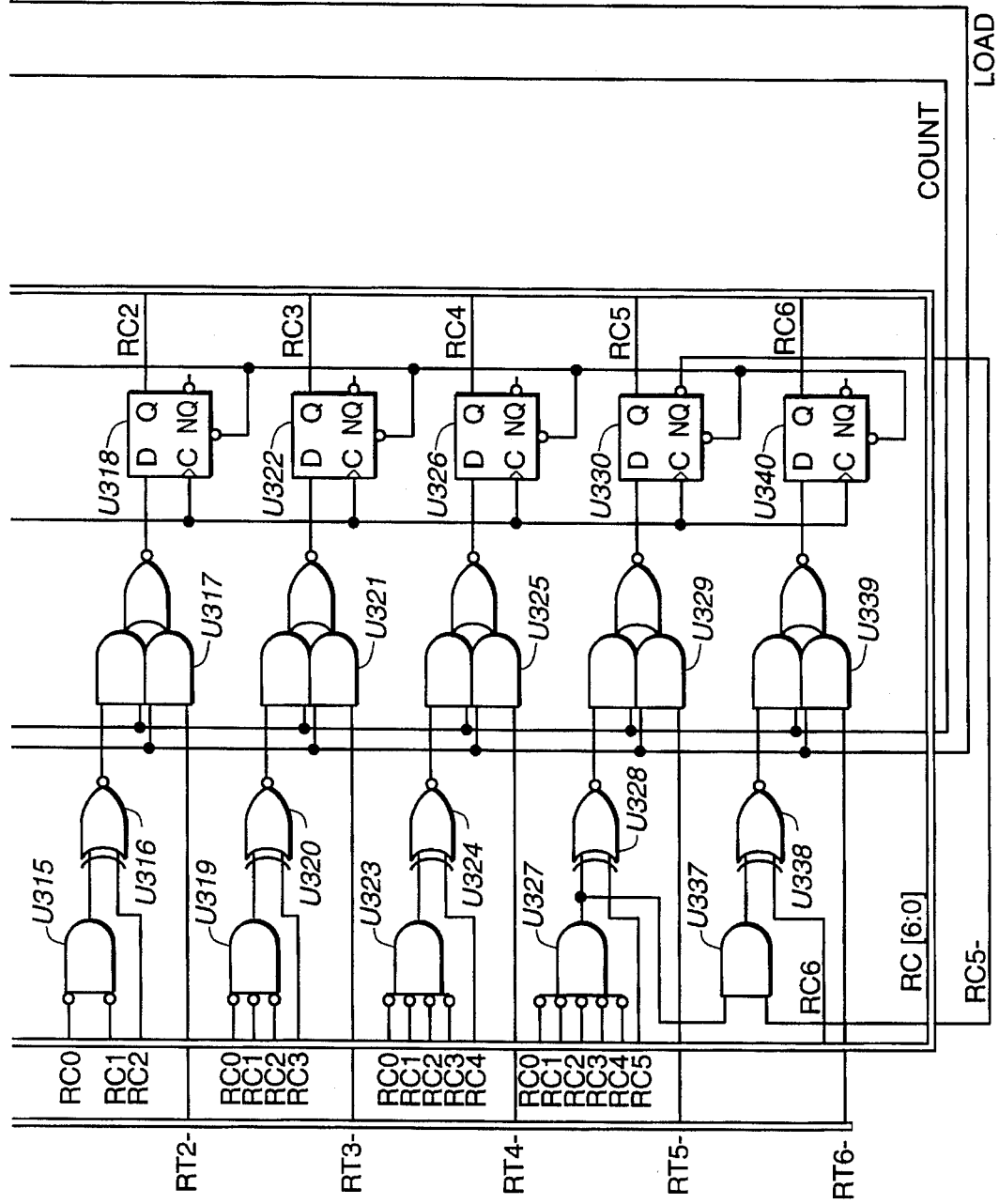
FIG._19
FIG._19B

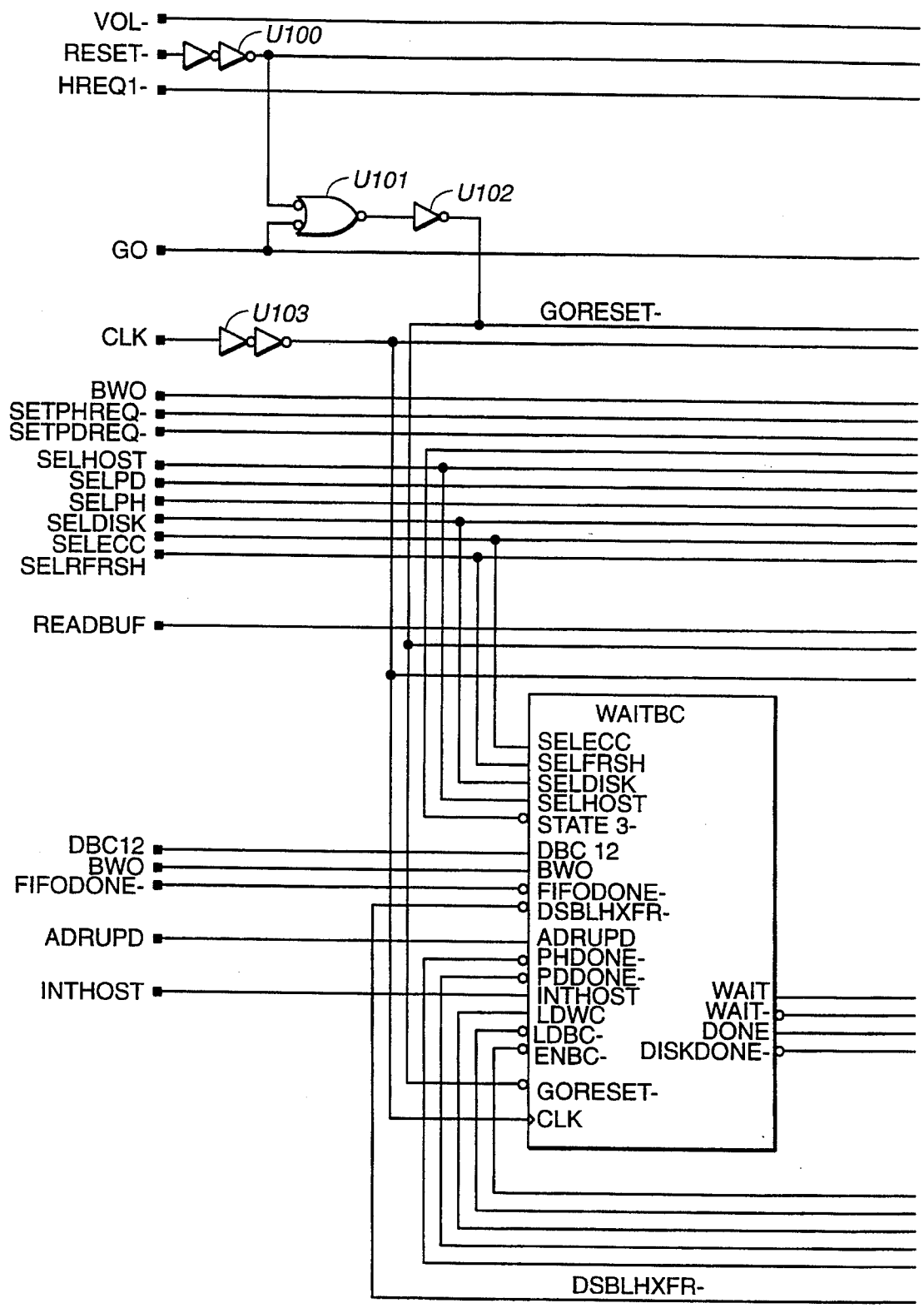
FIG._20A

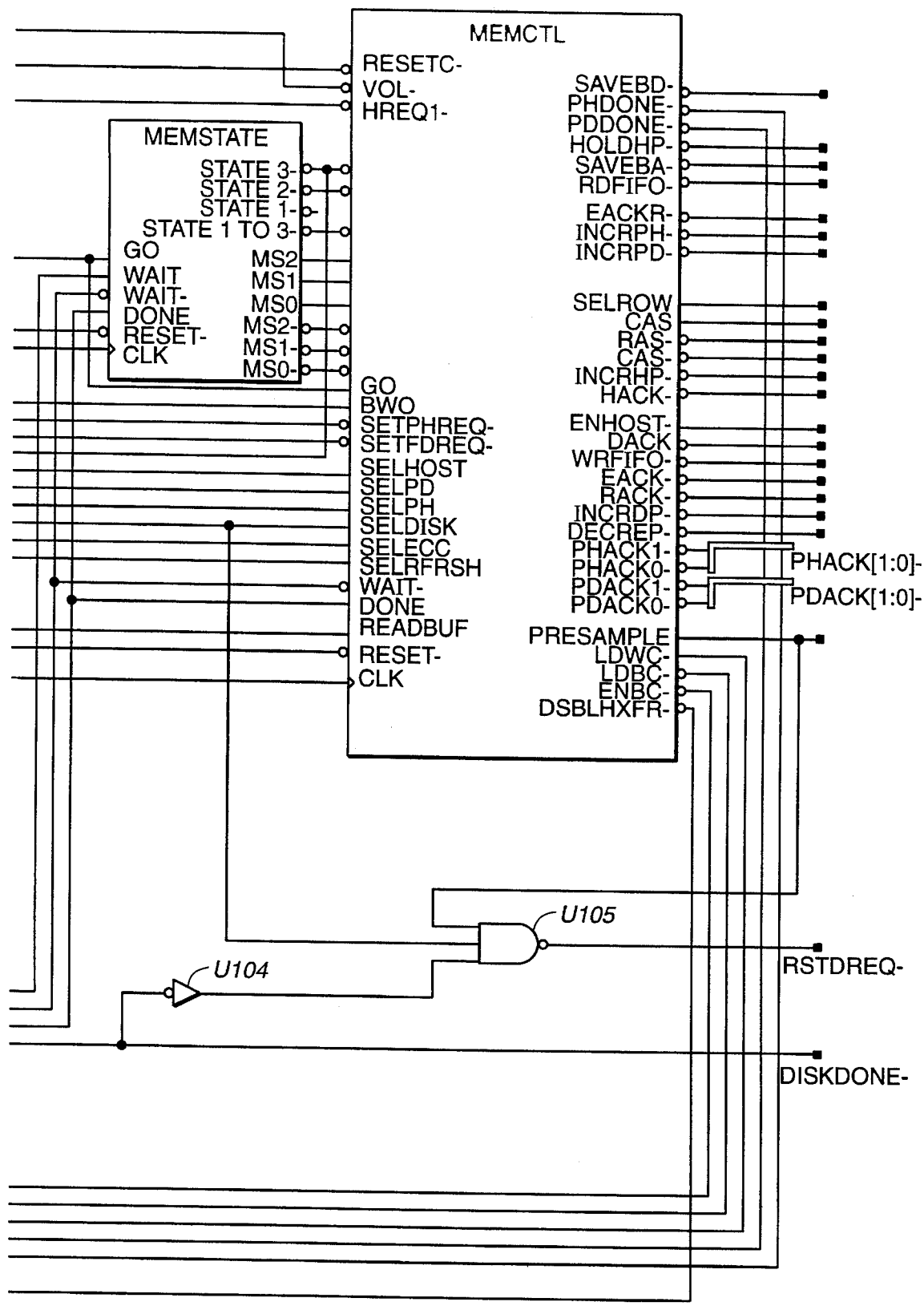
FIG._20B

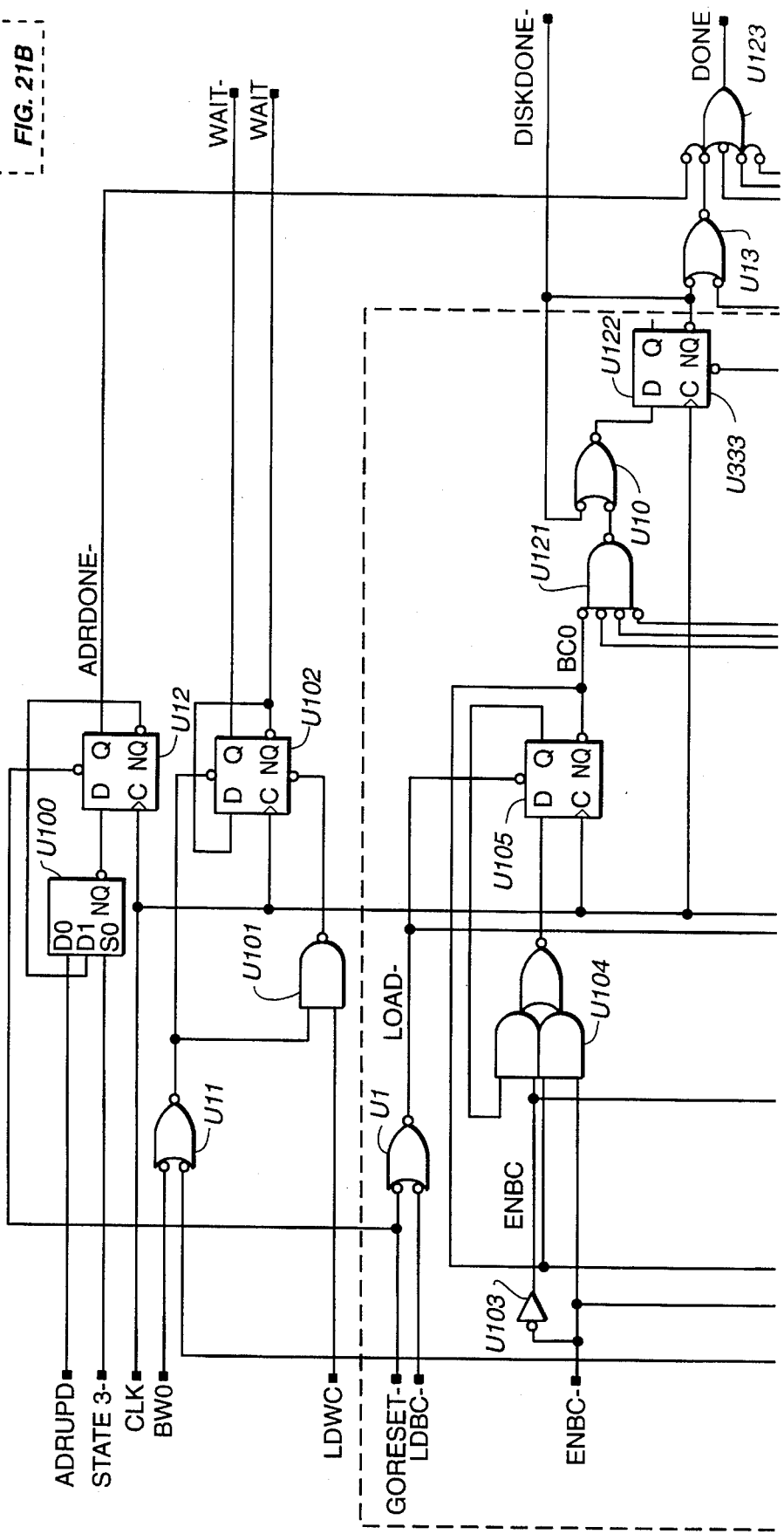

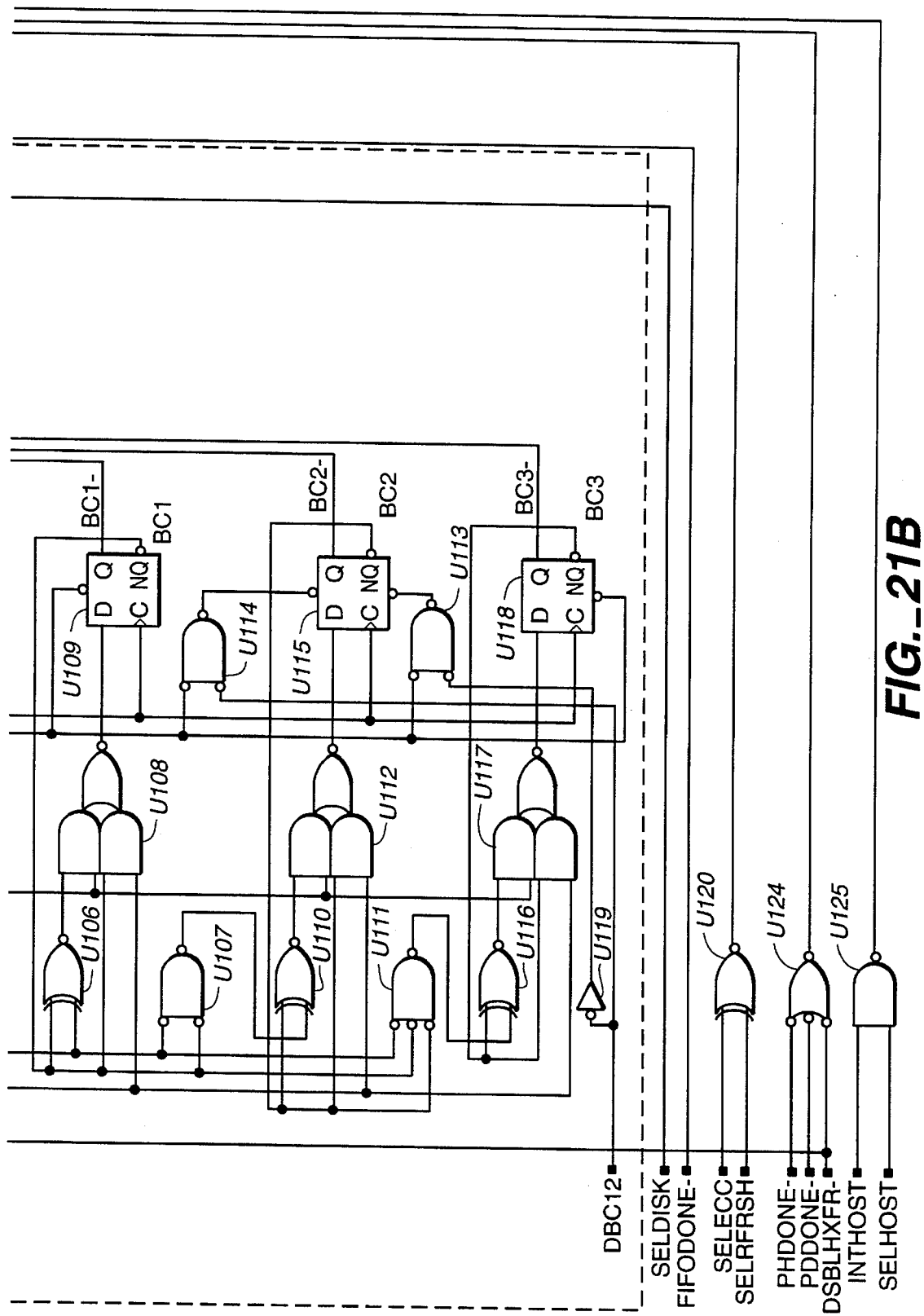
FIG._21B

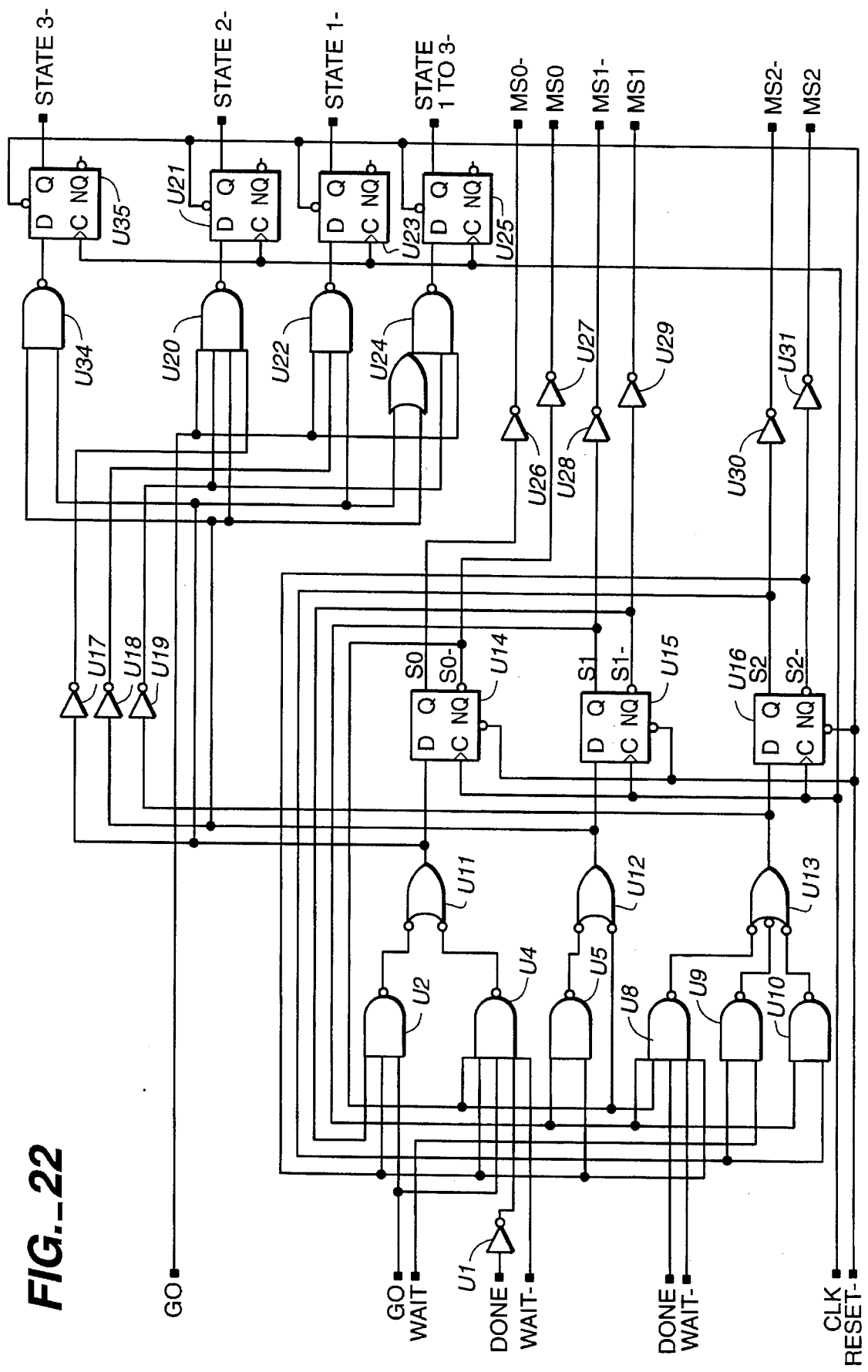
FIG._22

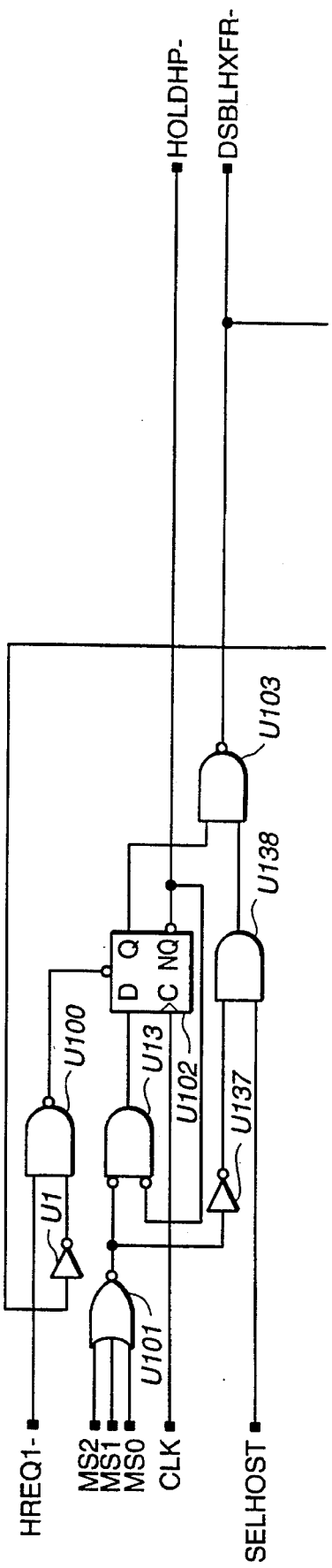
FIG._23A

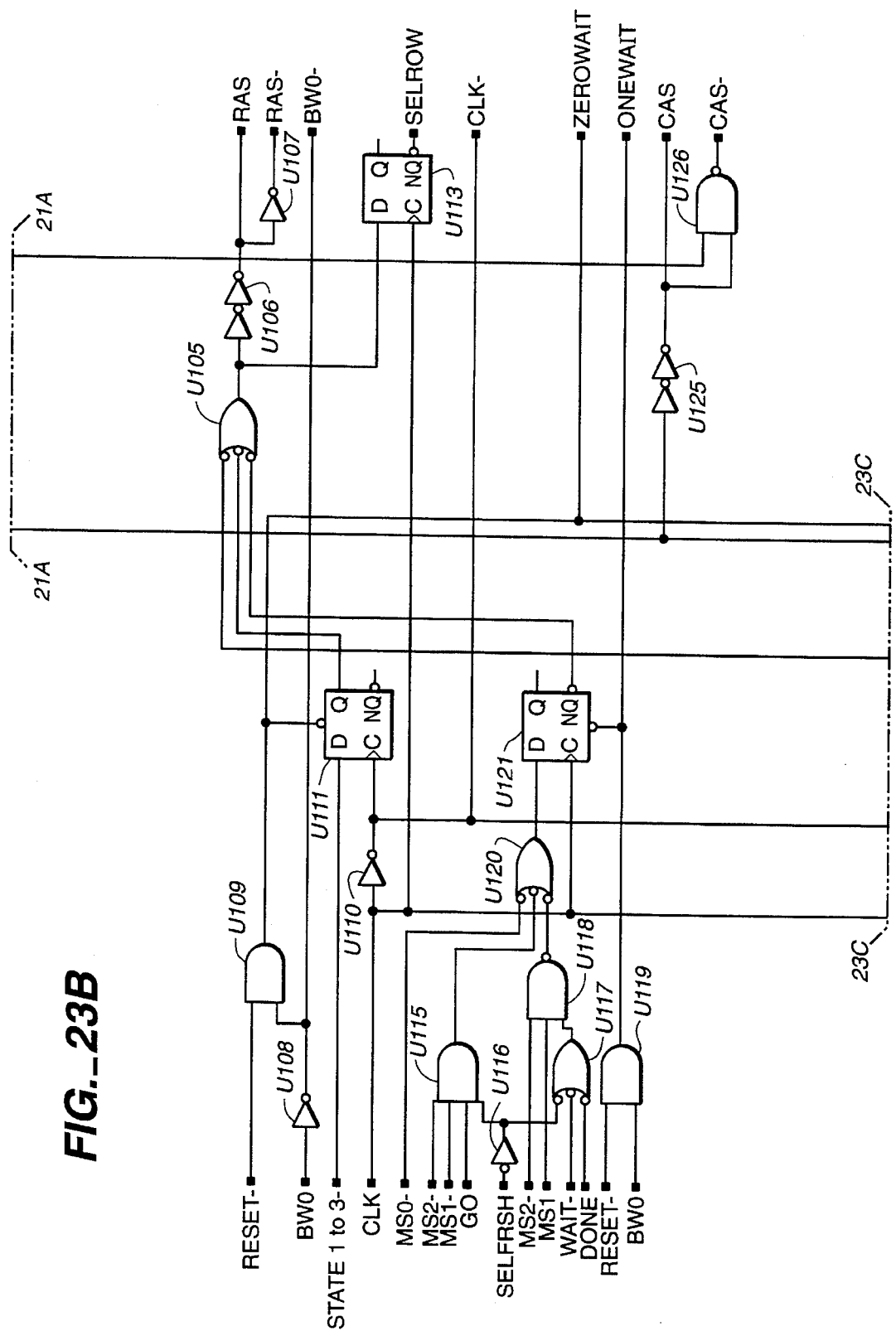
FIG._23B

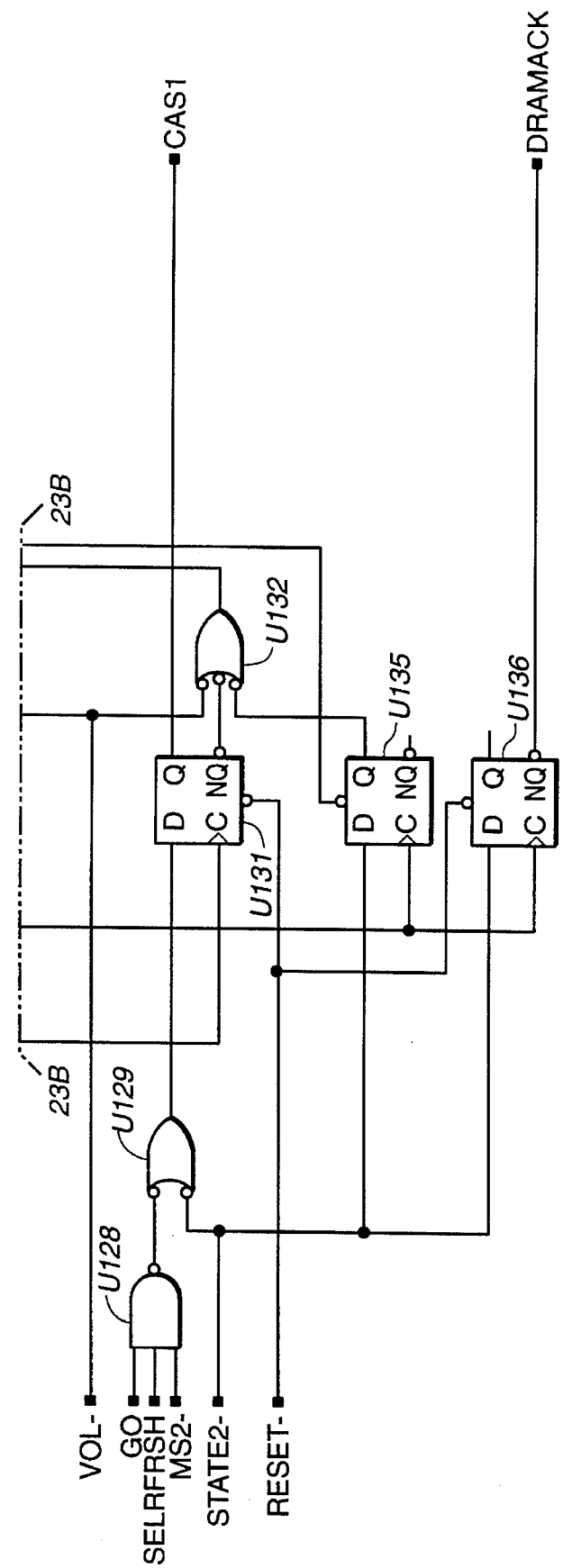
FIG._23C

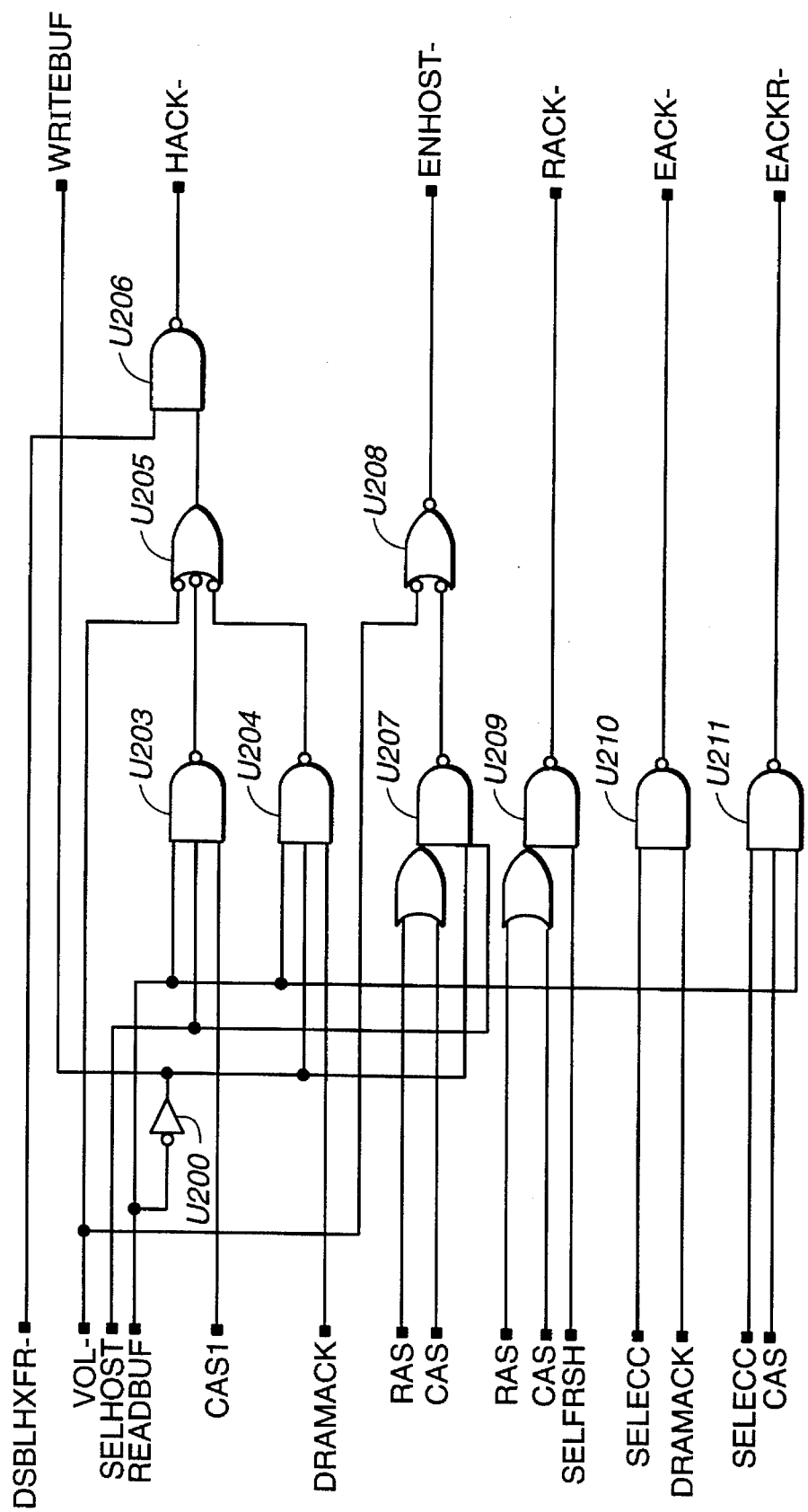
FIG._24

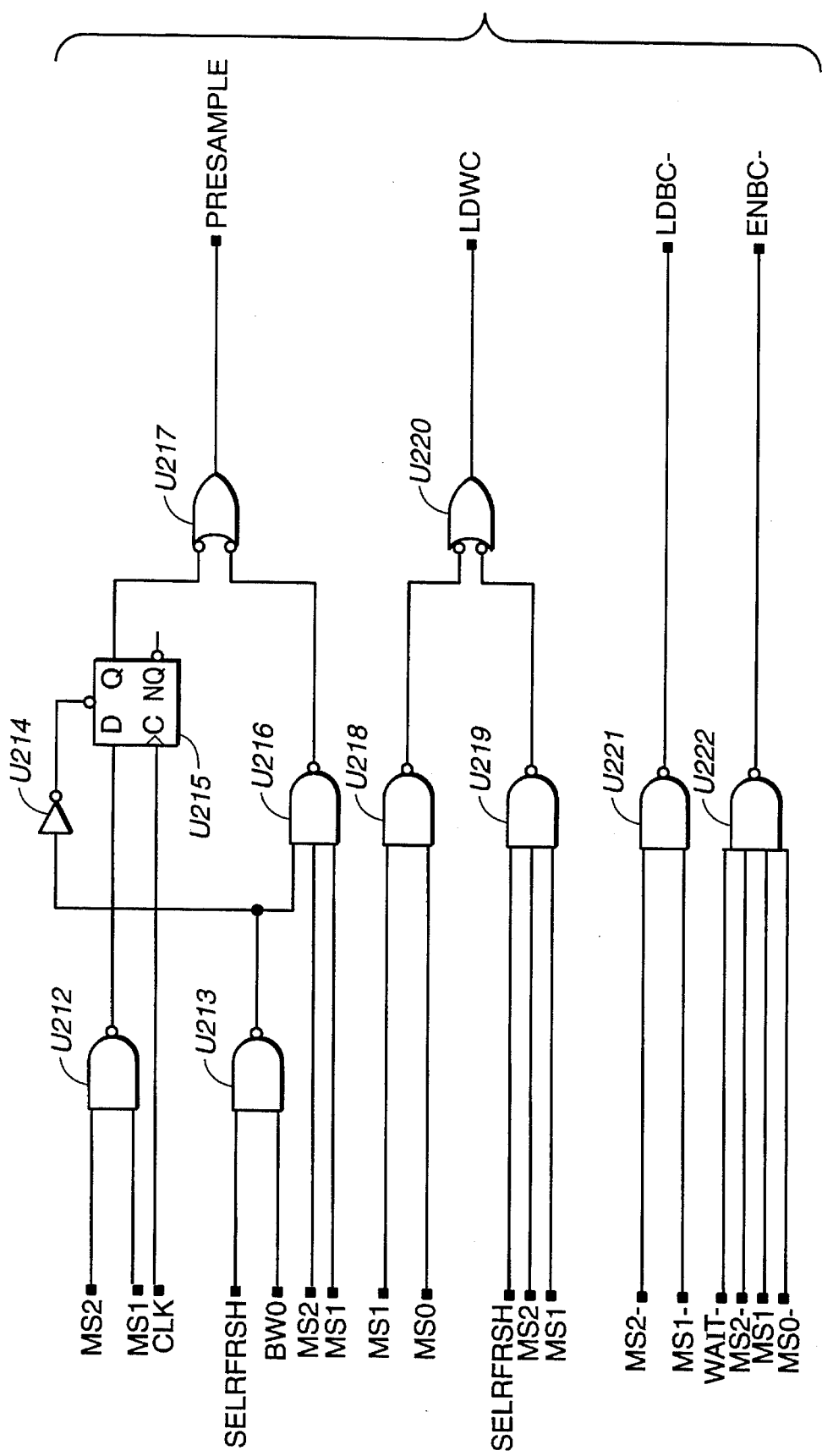
FIG._25

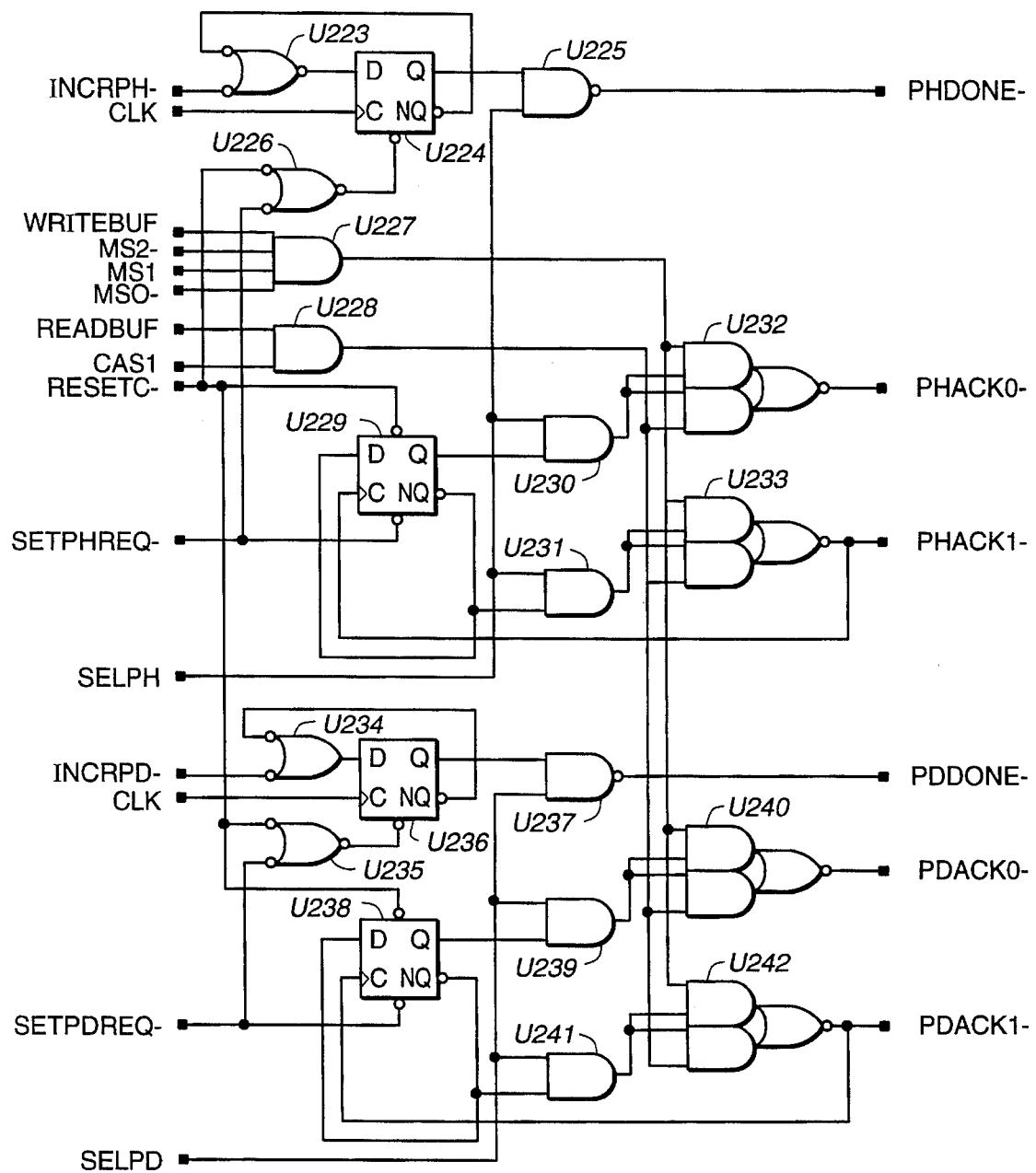
FIG._26

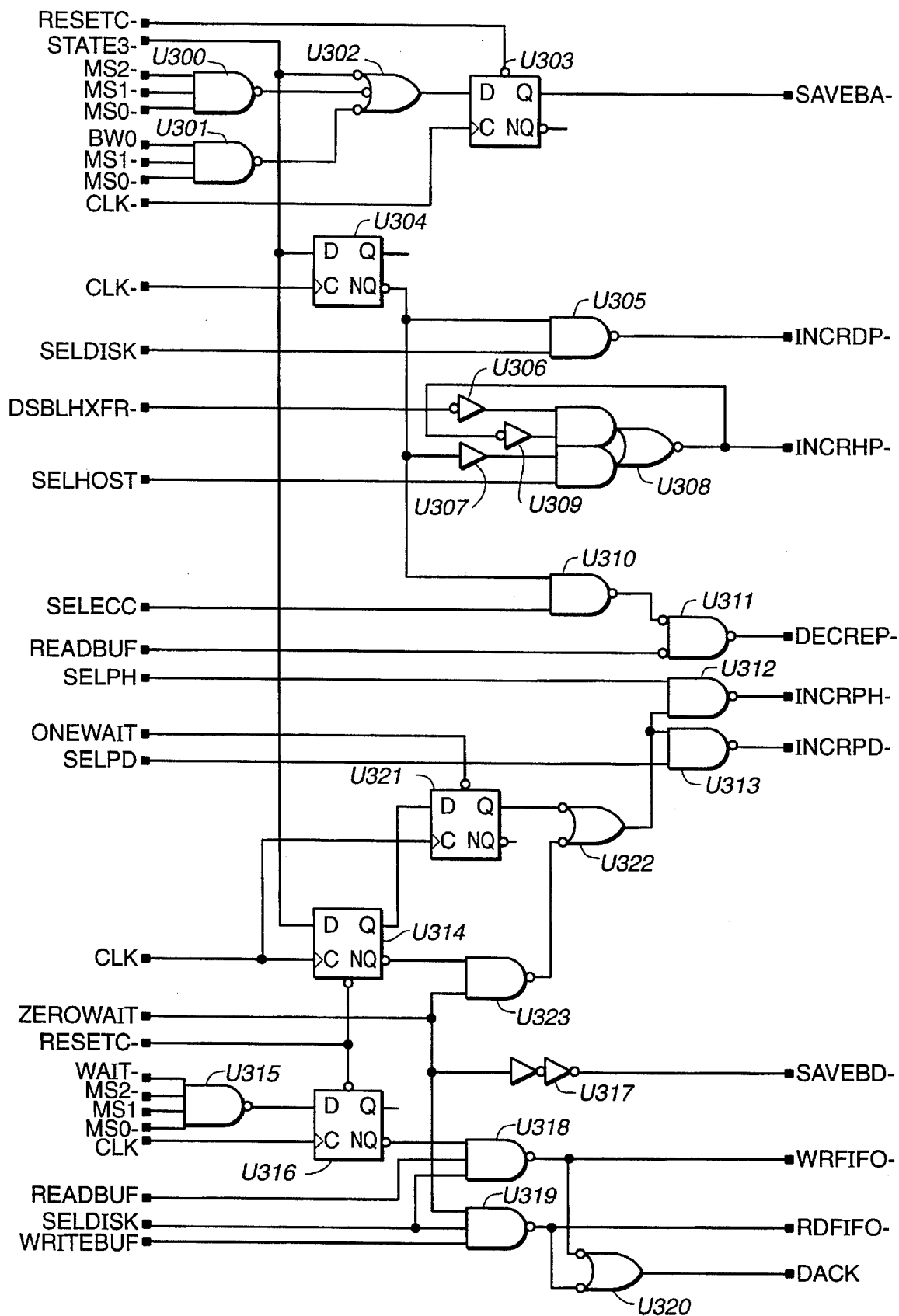
FIG._27

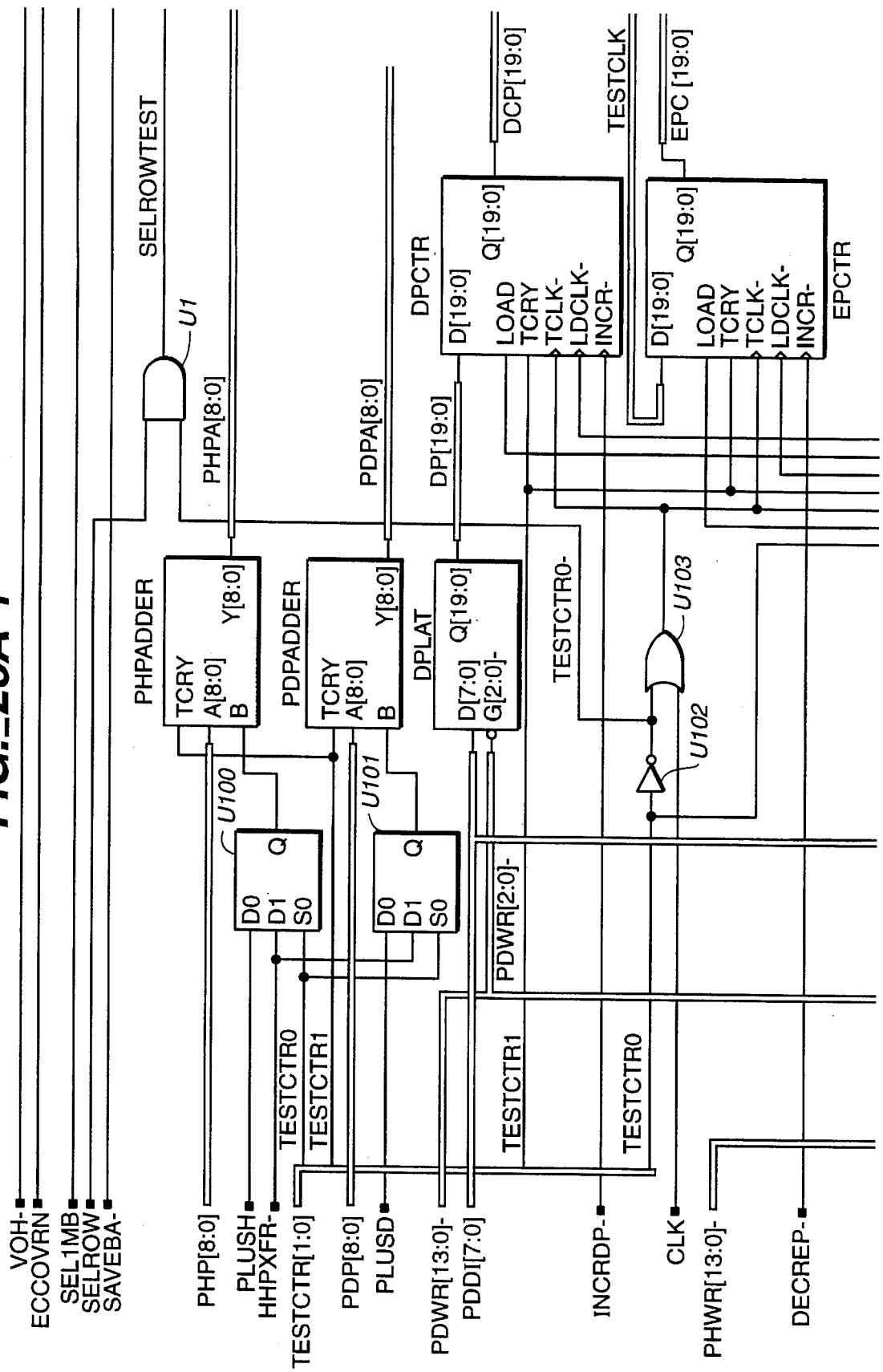
FIG._28A-1

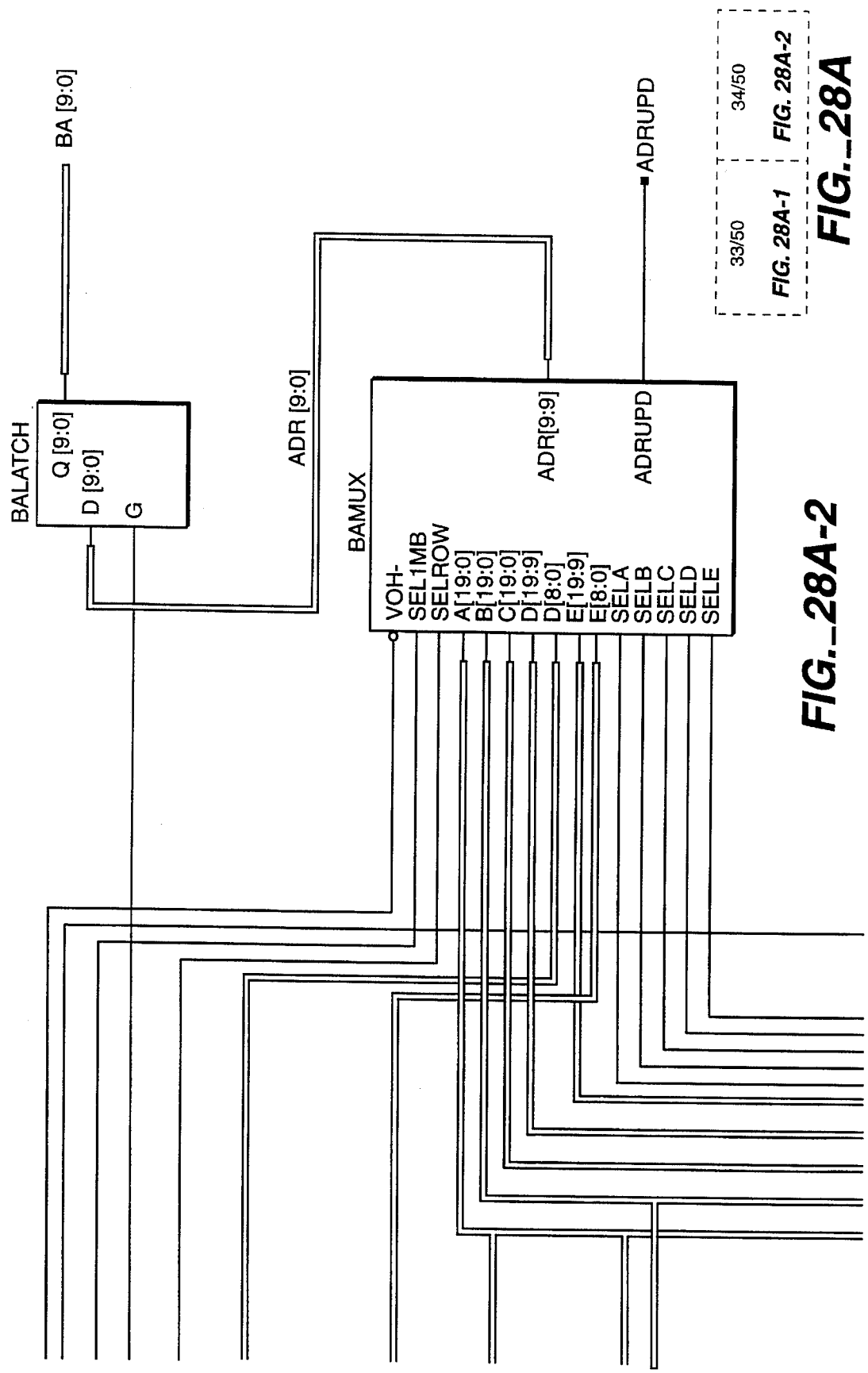

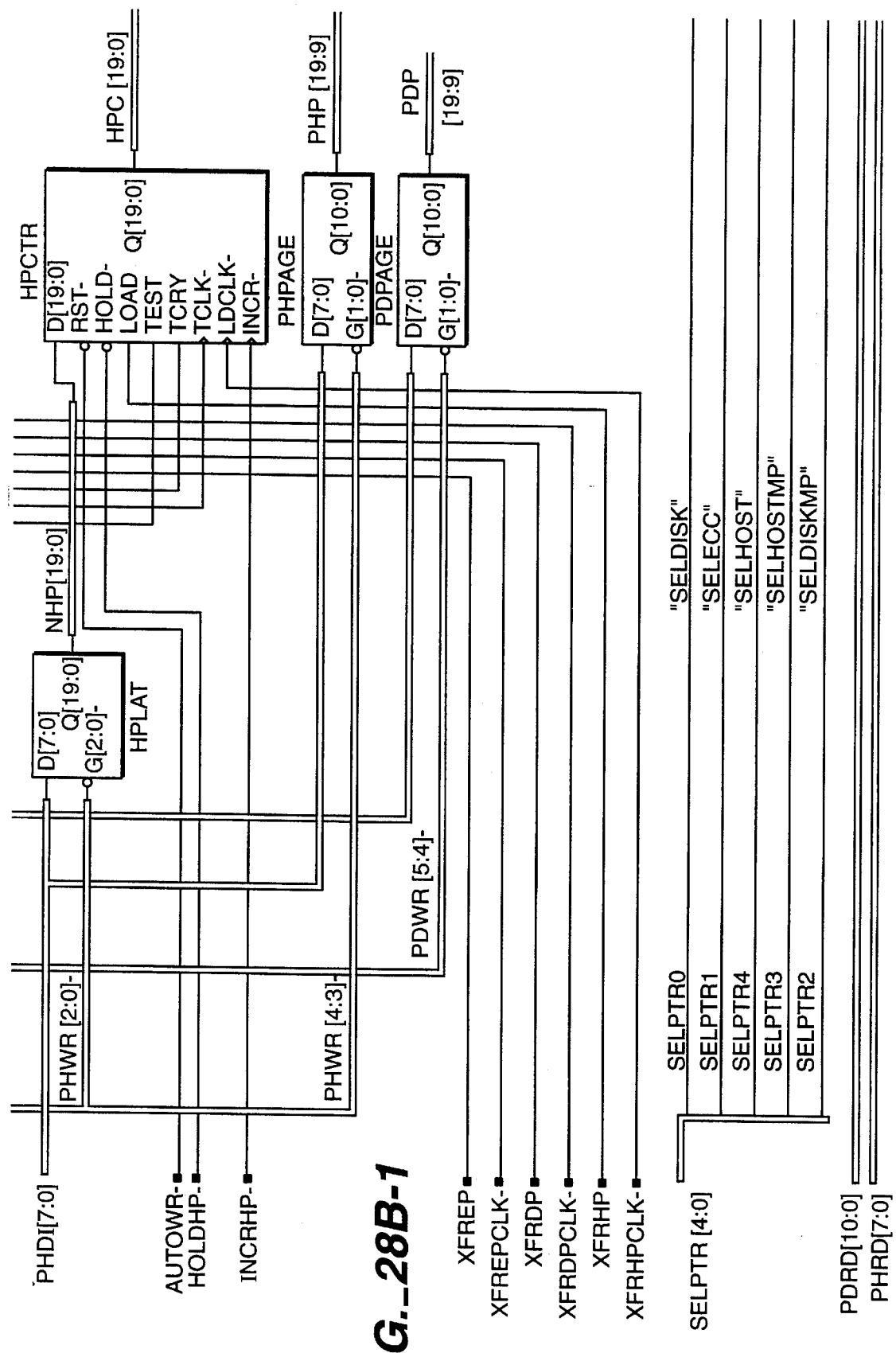
FIG._28B-1

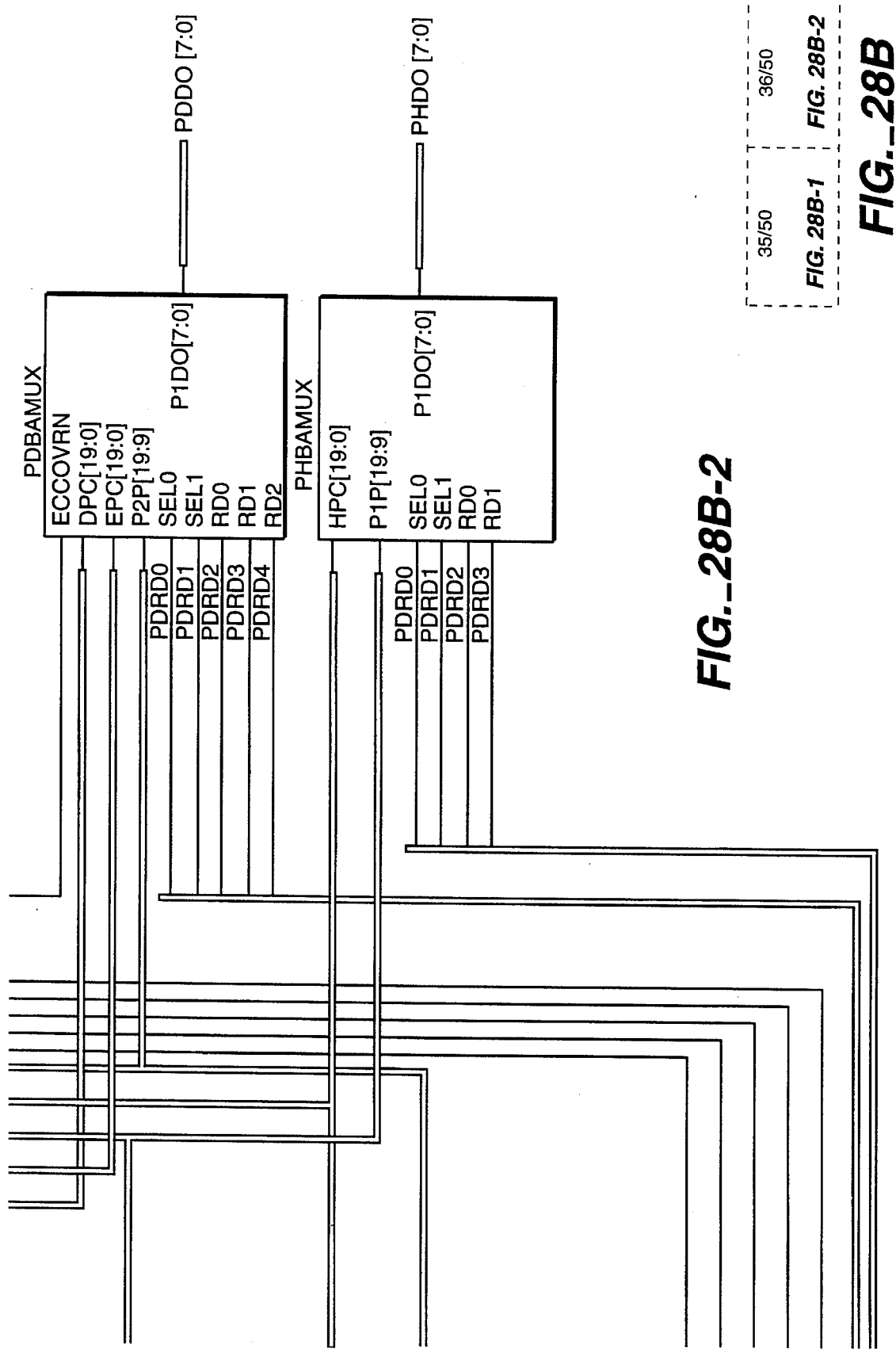
FIG._28B-2
FIG._28B

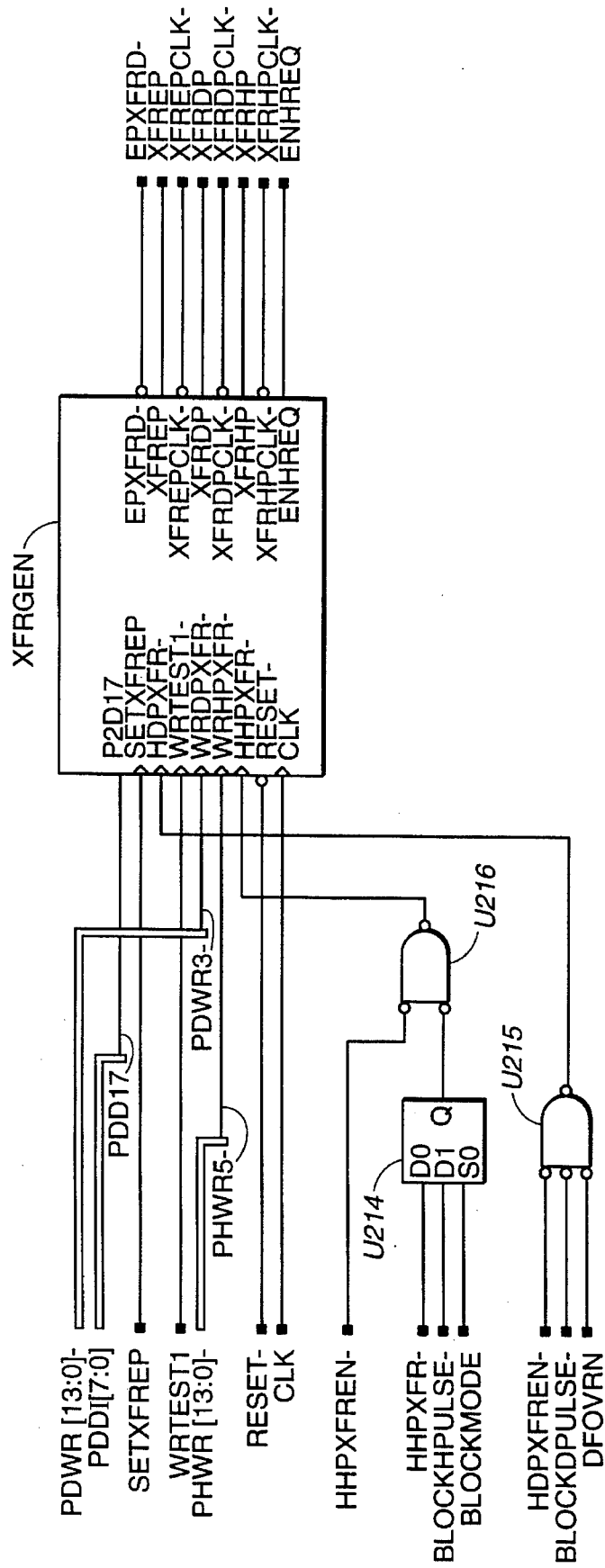
FIG._29

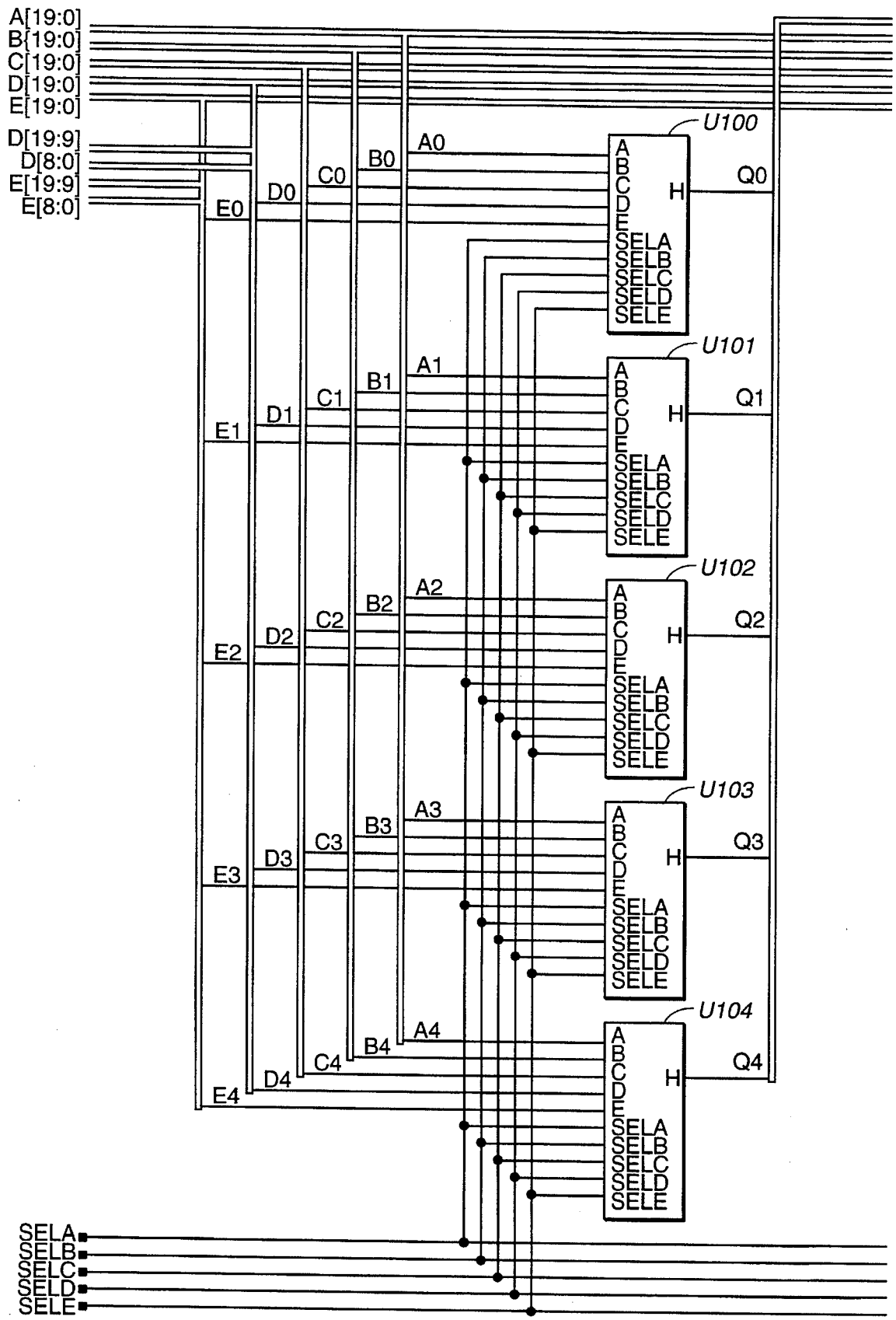
FIG._30A

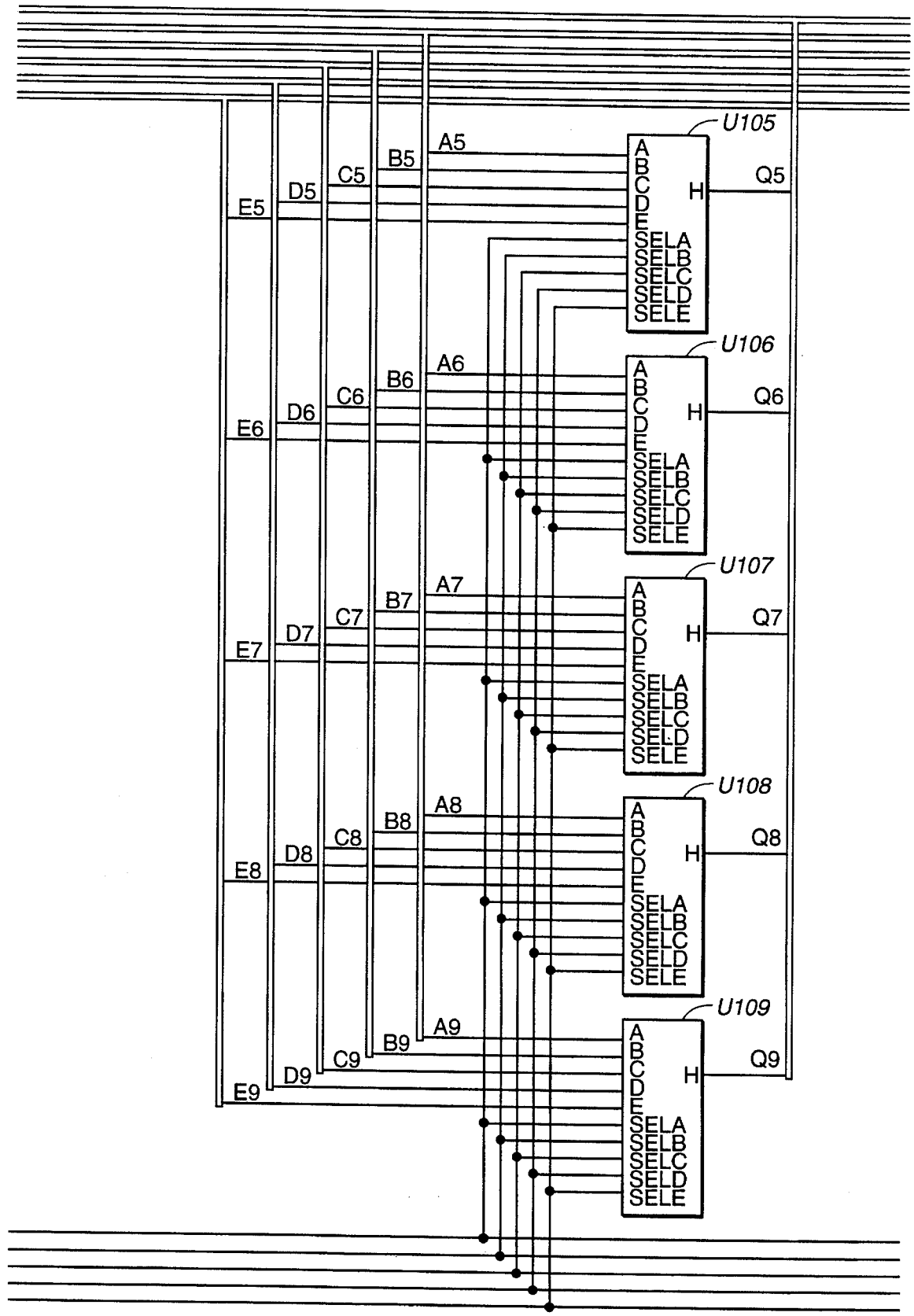
FIG._30B

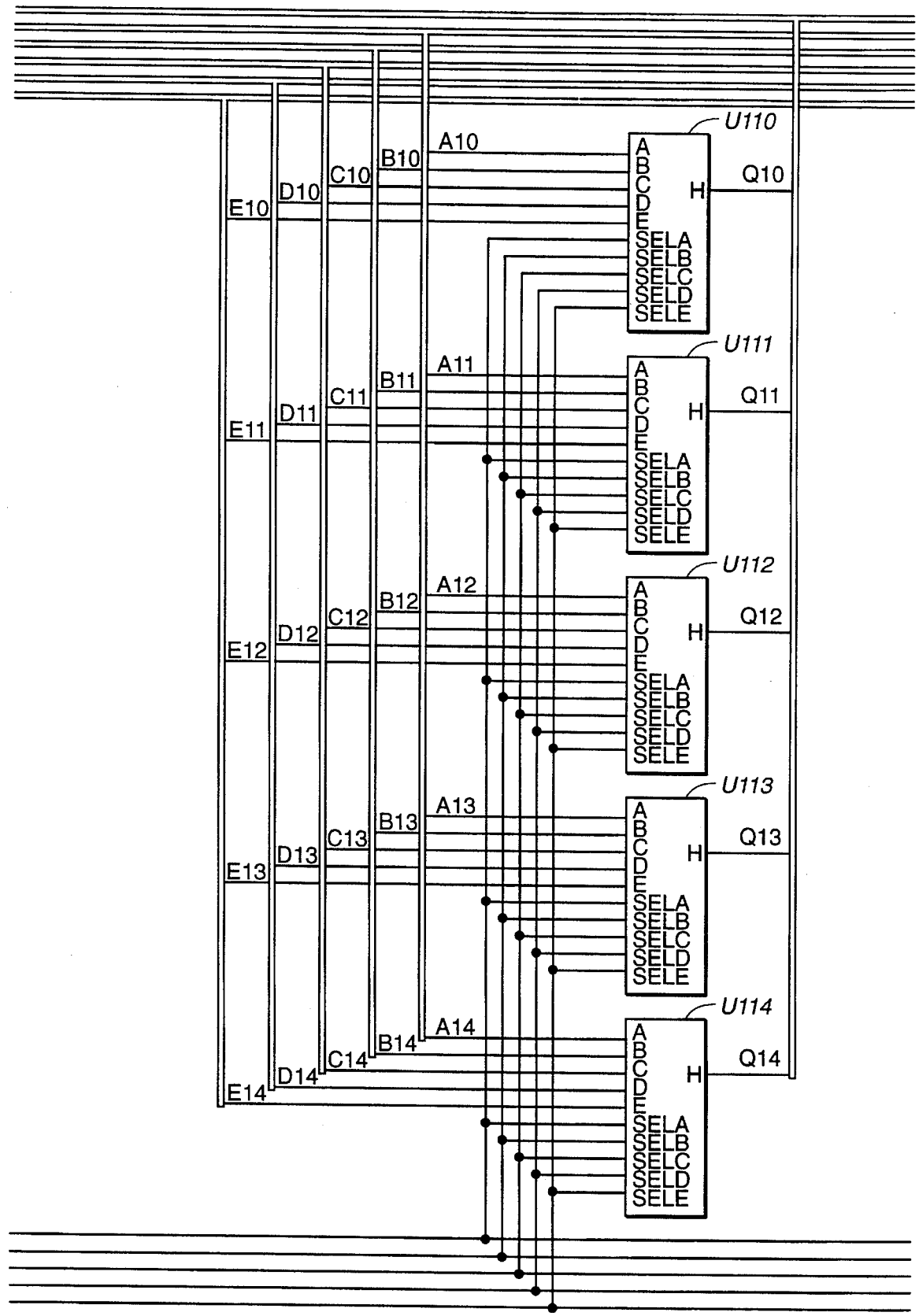
FIG._30C

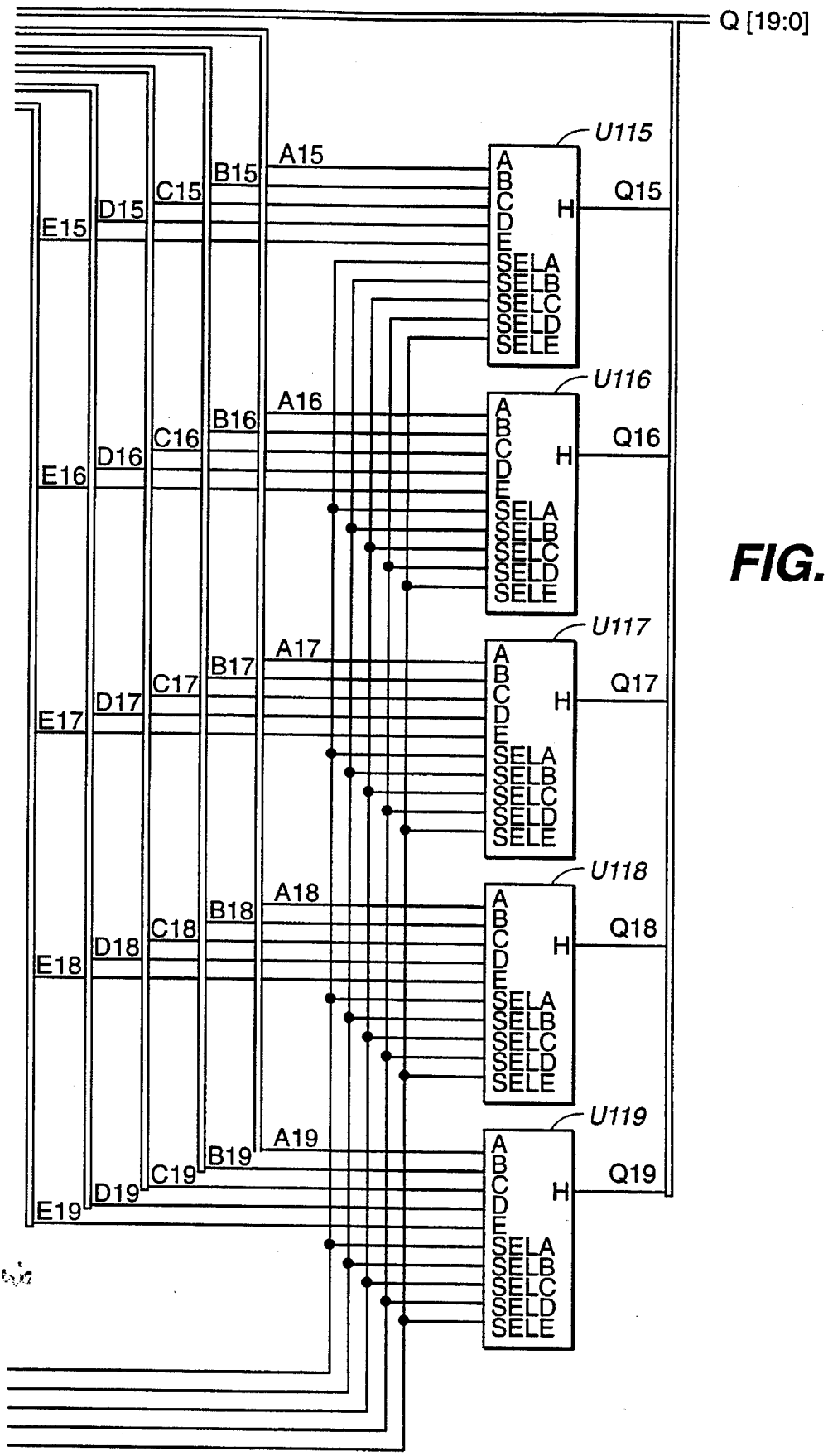
FIG._30D

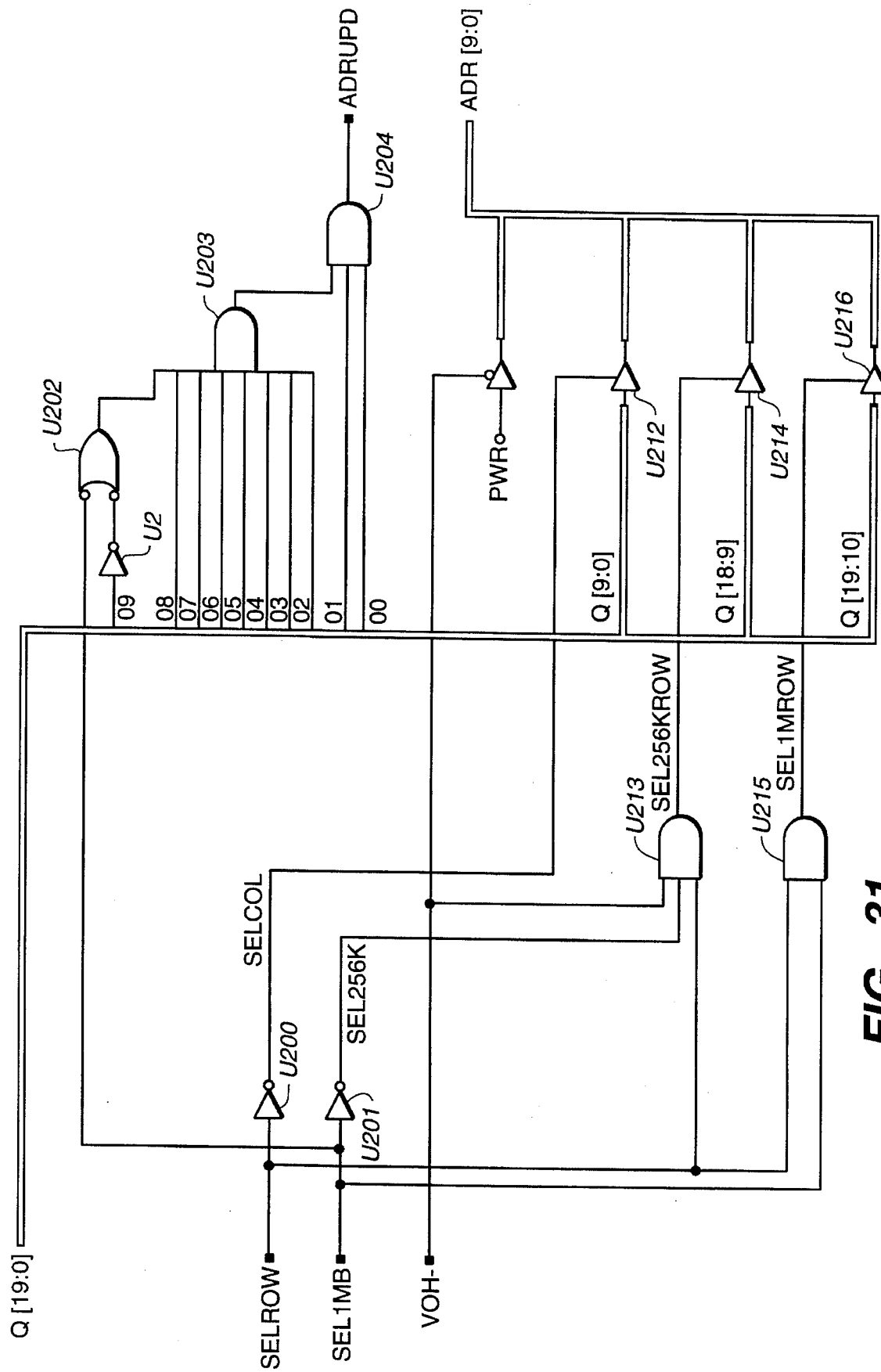
FIG._31

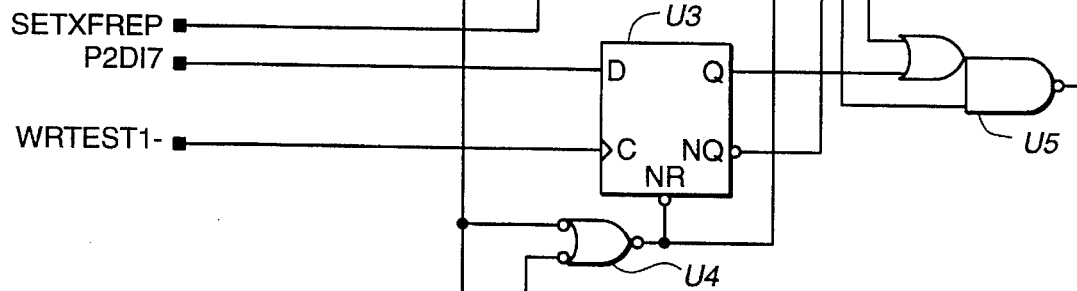
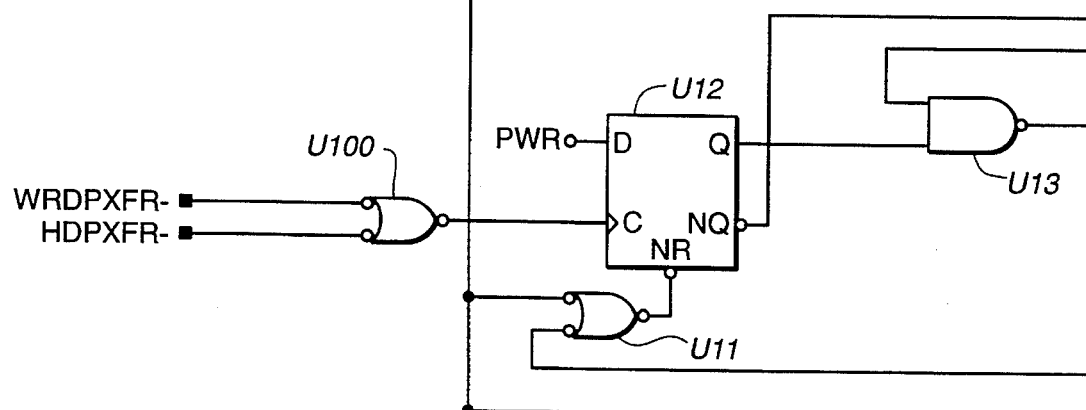
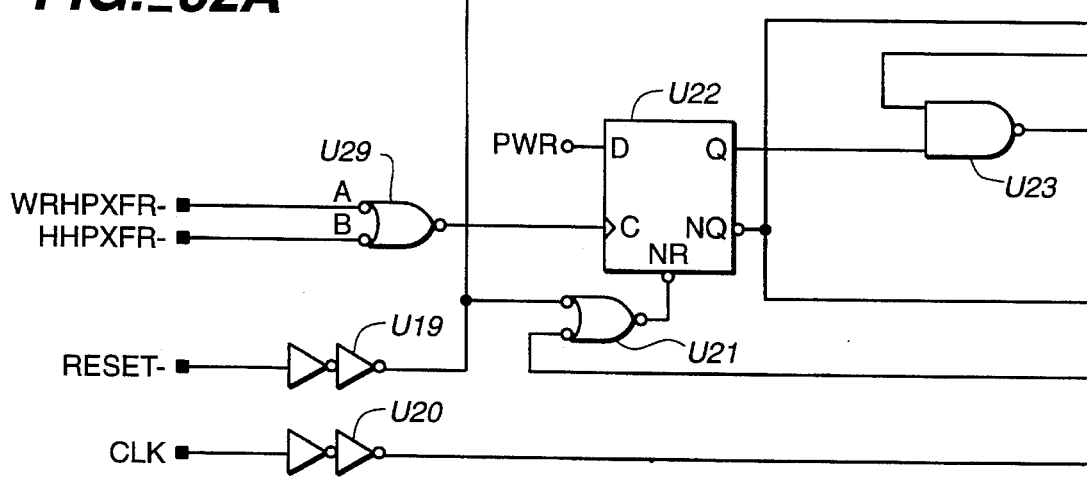
FIG._32
FIG._32A

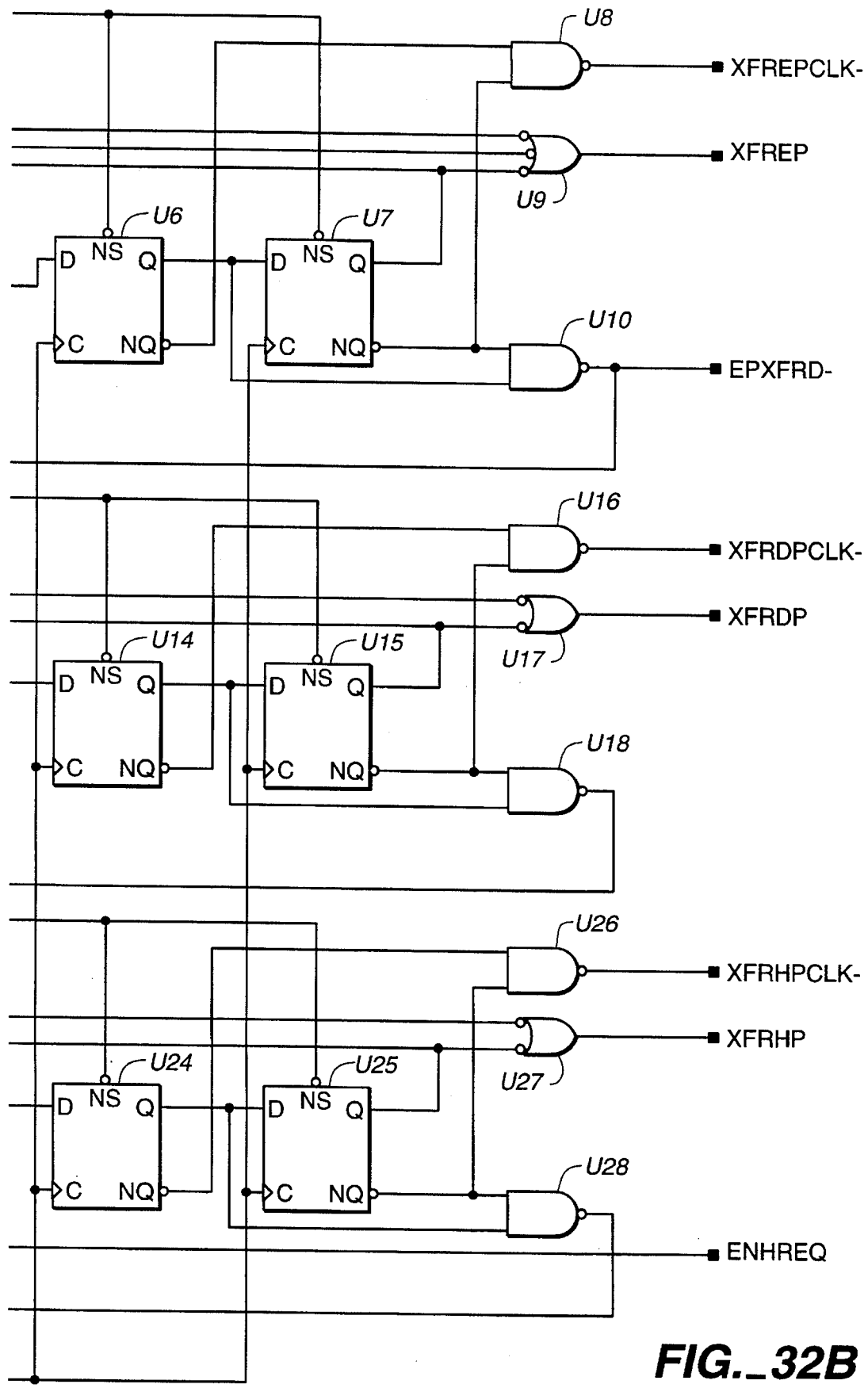
FIG._32B

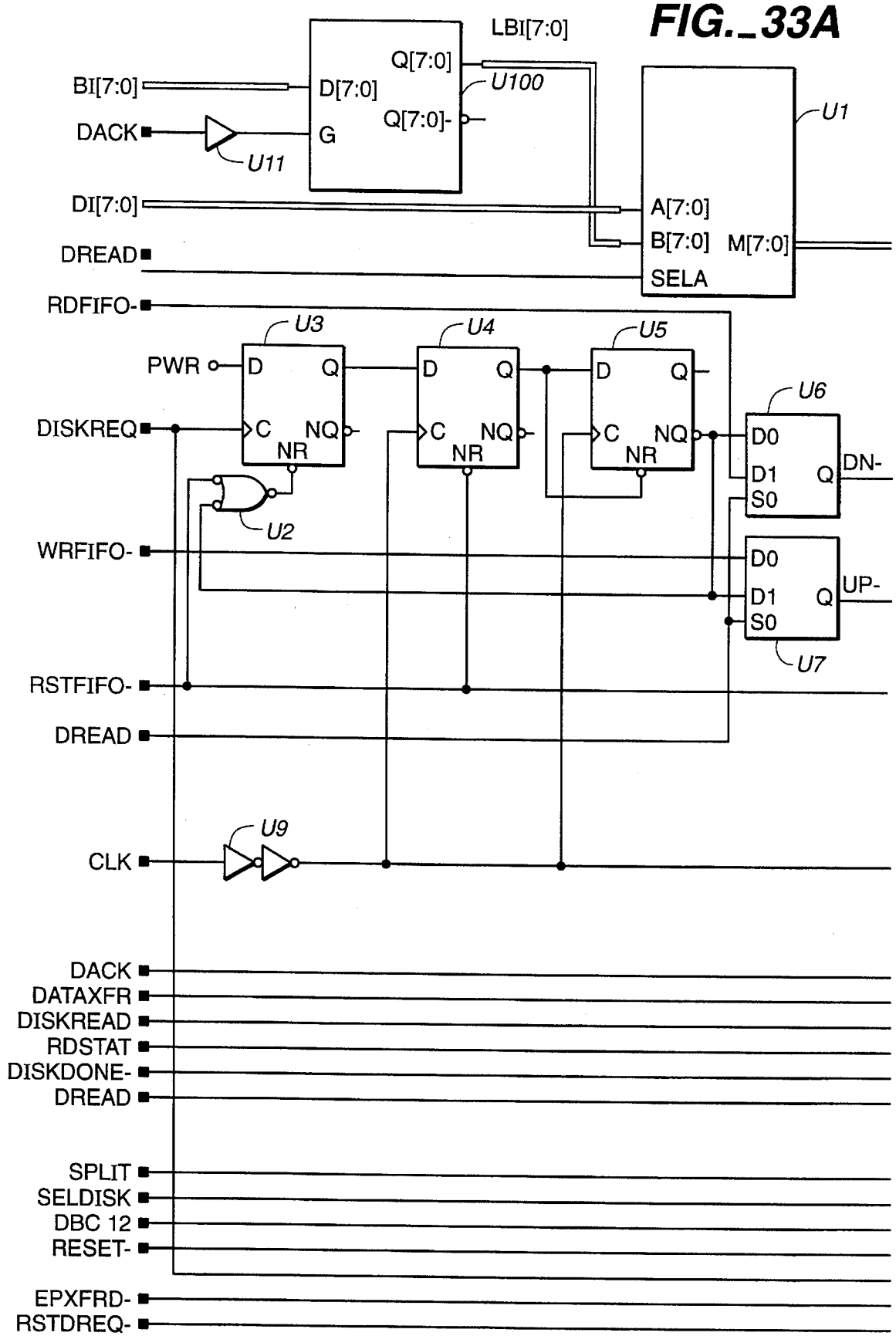
FIG._33A

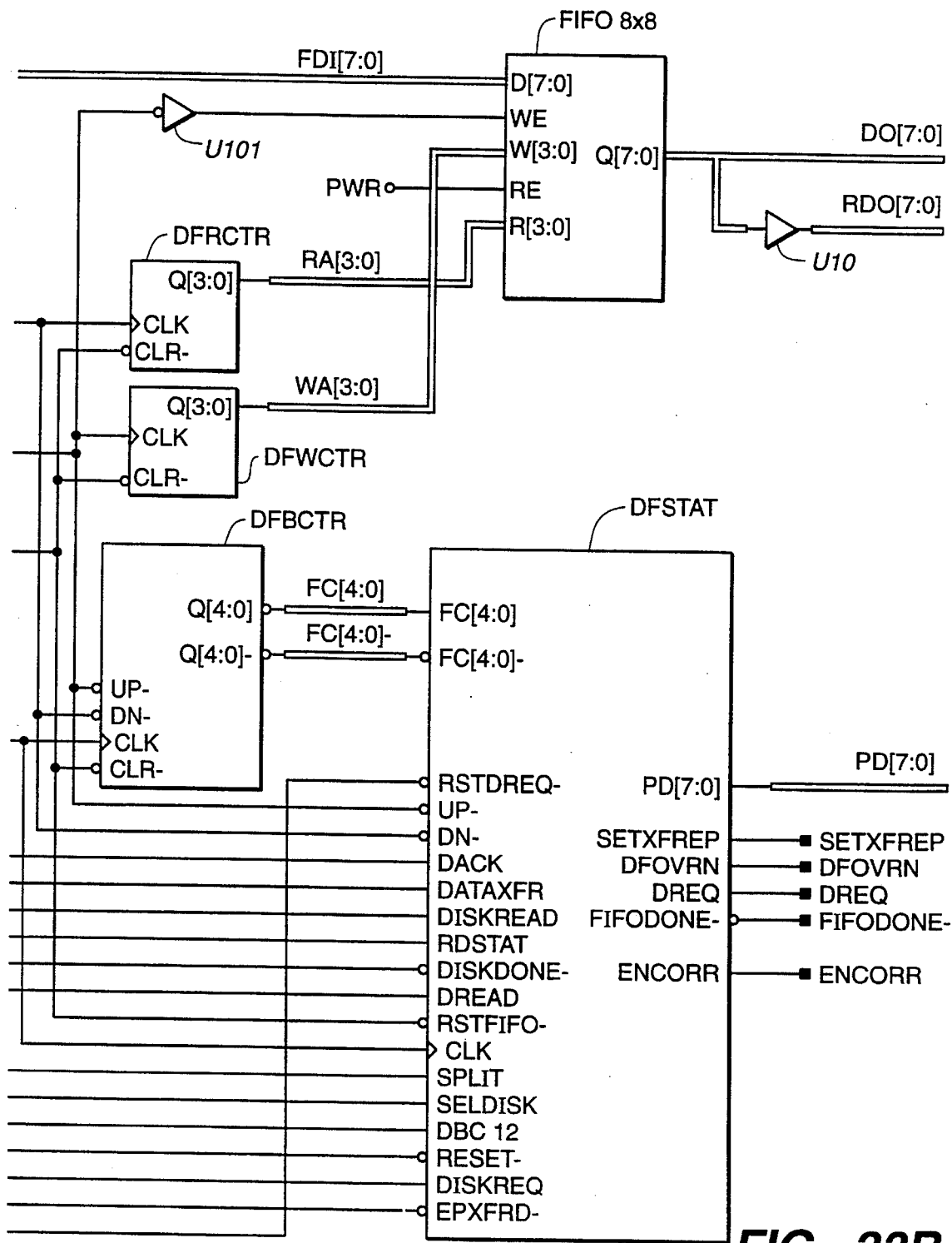
FIG._33B

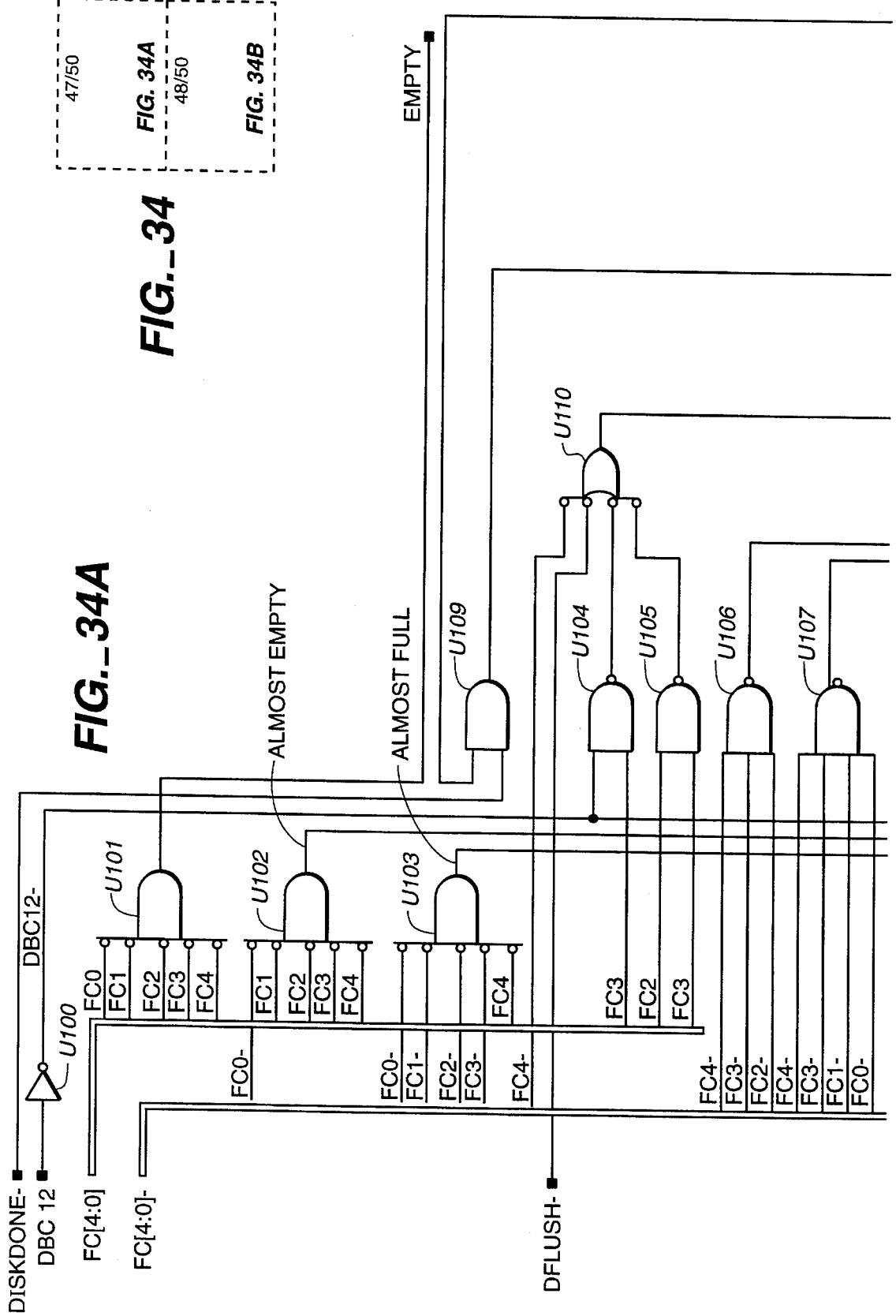

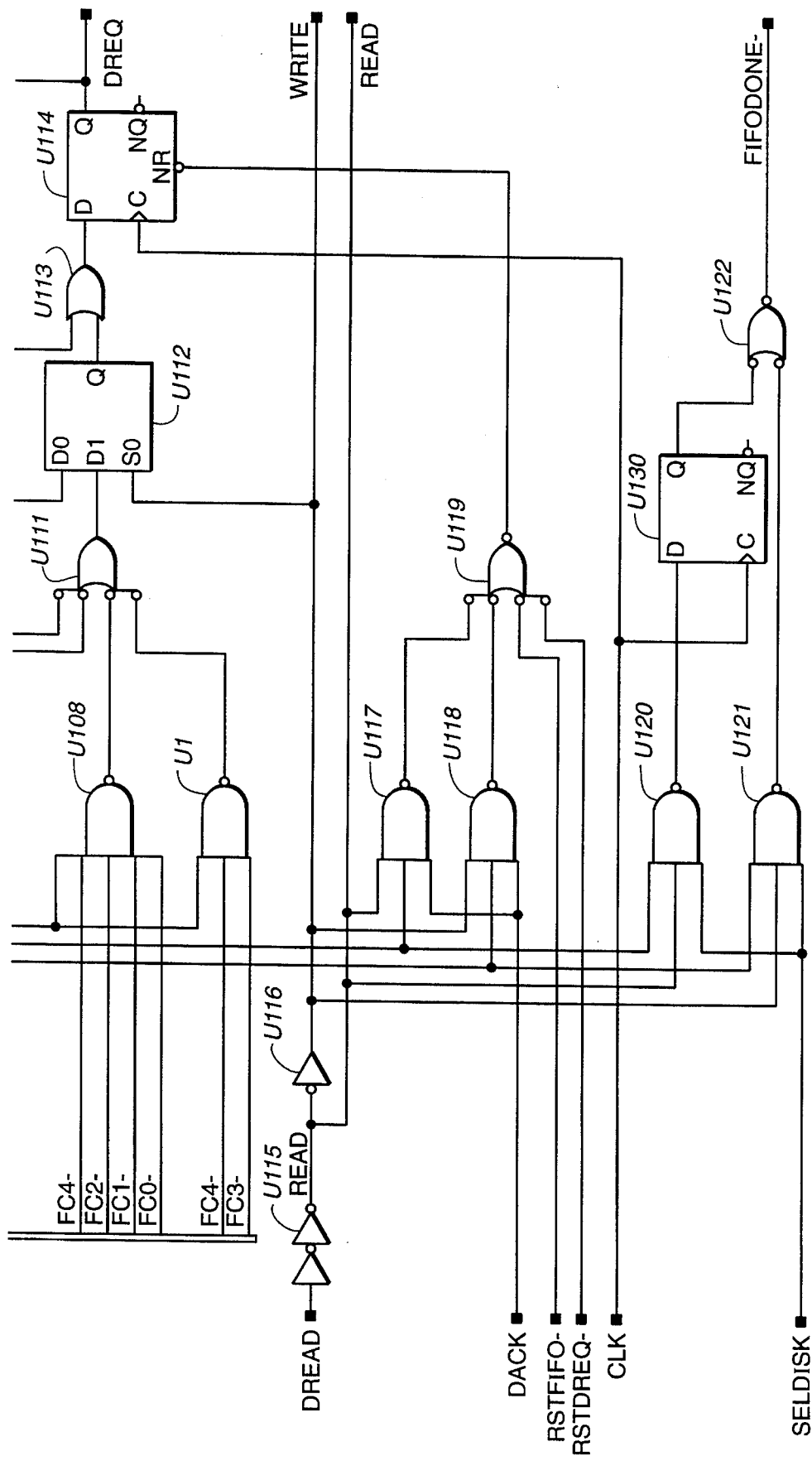

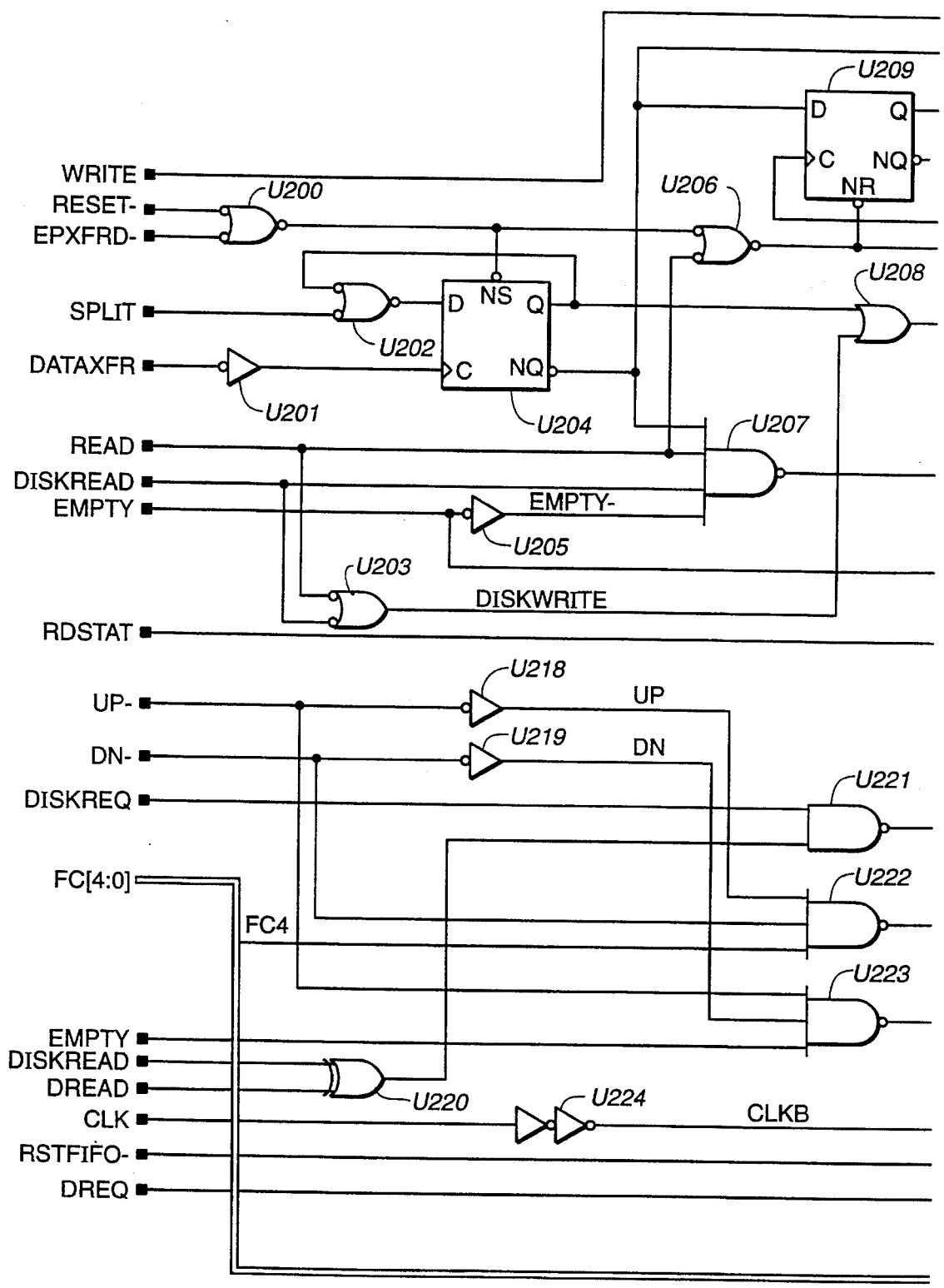
FIG._35A

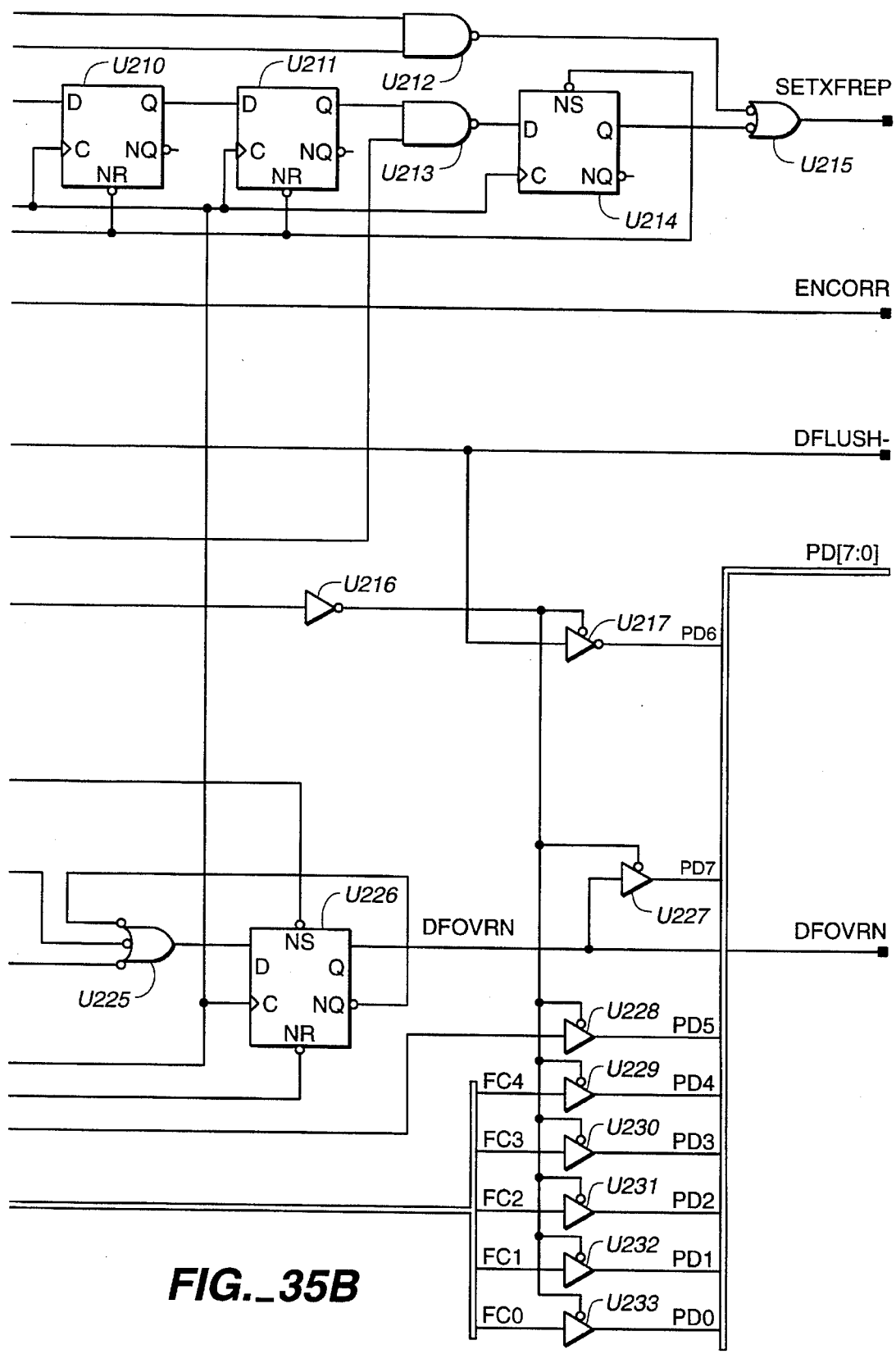
FIG._35B

PAGE MODE BUFFER CONTROLLER FOR TRANSFERRING NB BYTE PAGES BETWEEN A HOST AND BUFFER MEMORY WITHOUT INTERRUPTION EXCEPT FOR REFRESH

BACKGROUND OF THE INVENTION

1. Field of the Invention

This invention relates generally to buffer controllers used in integrated circuits on-board a hard disk drive and more specifically to a page mode buffer controller that controls transfer of data to and from a buffer memory in read and write operations to the disk drive.

2. Description of Related Art

Many different devices have been used to interconnect a hard disk drive to the data bus of a computer system. One of the basic problems in such an interface is that data from the disk drive read/write head is serial data while the computer data bus is typically a parallel data bus. Further, the speed of the computer data bus is significantly different from the characteristic speed of the serial data from the read/write head.

To address these problems a variety of solutions have been used. One solution is to include an integrated circuit on board the disk drive that converts the serial data to parallel data. The parallel data is then supplied to a host interface circuit that supplies the parallel data to the computer data bus.

Typically, the integrated circuit on the disk drive includes a first-in-first-out (FIFO) memory that receives data from the disk. When the FIFO memory is full or nearly full, the data in the FIFO memory is transferred using a buffer controller to a buffer memory. The speed at which data is transferred from the disk to the buffer memory limits the performance of disk drive.

One of the limiting factors in the transfer of data to and from a disk is the buffer bandwidth. The buffer bandwidth is the rate, usually expressed in Megabytes per second (MB/s), that data may be transferred into and out of the buffer memory. This rate is a function of the number of bytes transferred to buffer memory between other operations that must be performed by the buffer memory controller.

Typically, the buffer memory is dynamic random access memory (DRAM) and the DRAM must be periodically refreshed. Also, the transfer of data is typically impeded by error correction operations, host transfer operations, and disk transfer operations. Error correction is used to determine that the data retrieved from the disk is the same as the data stored on the disk. Host transfer operations are actions initiated in the transfer of data between the buffer memory and the host computer. Disk transfer operations are actions to initiate transfer of data between the buffer memory and the disk.

Typically, prior art buffer memory controllers transferred four bytes in every data transfer to and from the buffer memory. FIG. 1 is a timing diagram for the prior art four byte data transfer to buffer memory. Signal "GO" is set active to initiate the four byte data transfer in state 0. On the next clock cycle in state 1, a state machine drives the row address strobe signal RAS-active(low). In state 3, the buffer address is incremented. On the fourth clock cycle in state 2, the column address strobe signal CAS- is set active (low). The actions in states 3 and 2 are repeated three times. In state 6, row address strobe signal RAS- is reset and in state 4, column address strobe CAS- is reset. Hence, the transfer of each data byte requires two clock cycles and there are four overhead clock cycles used to start and stop the four byte transfer. Consequently, twelve clock cycles are required to transfer the four bytes of data.

The transfer of four bytes limits the instantaneous buffer bandwidth to:

$$( (4 \text{ Bytes}) / (12 \text{ Clock cycles}) )*(1 \text{ Clock Cycle}/(TB \text{ seconds}) )$$
$$= FB/3 \text{ MBytes/second}$$

where $$FB = 1/TB$$

and
TB=the period for one buffer clock cycle.

Thus, for a 40 MHz buffer clock, the instantaneous buffer bandwidth is 13.333 MBytes/second. The only way to enhance the bandwidth for the fixed four byte data transfer is to go a higher frequency clock. However, as clock speed increases, power consumption of CMOS circuits increases. Further, most systems have clock frequencies of 50 MHz or less. However, the clock speeds that may be used are limited by DRAM technology. Thus, the fixed four byte buffer memory data transfer limits the overall performance of the disk drive.

SUMMARY OF THE INVENTION

According to the principles of this invention, the performance of a disk drive is enhanced by a page mode buffer memory controller that transfers up to an Nb byte page of data between a buffer memory and a host for the disk drive without interruption. Typically, page size Nb is at least 512 bytes, but the actual page size is determined by the size of the buffer memory. This Nb byte page data transfer requires overhead clock cycles only at the start and the end of the data transfer. Hence, the page mode buffer memory controller of this invention transfers up to Nb bytes of data using the same number of overhead cycles that the prior art buffer memory controllers used to transfer only four bytes of data. Consequently, the overhead clock cycles are significantly reduced and the host bandwidth significantly enhanced over the host bandwidth of the prior art buffer memory controllers.

In one embodiment of this invention, the transfer of the Nb data bytes between the buffer memory and the host by the page mode buffer memory controller of this invention is interrupted when a refresh counter, included in the page mode buffer memory controller, issues a buffer memory refresh request. Initially, the refresh counter is loaded with a refresh time period. After the counter determines that the refresh time period has elapsed, the counter generates the refresh request and then automatically reloads the counter with the refresh time period. In this embodiment, the page mode buffer memory controller interrupts the data transfer between the host and the buffer memory in response to the refresh request.

The interruption, the refresh of the buffer memory, and the restarting of the data transfer introduces a predetermined number of overhead clock cycles, e.g., 10 overhead clock cycles, in the data transfer. However, the resulting host port bandwidth is still significantly enhanced over the prior art buffer memory controllers.

In addition to the refresh counter, the page mode buffer memory controller includes a buffer prioritizer that has a plurality of input ports. Preferably, these ports include at least a disk port, a host port, and a refresh port. Each port supplies a request signal to the buffer prioritizer when the port requires access to the buffer memory.

The buffer prioritizer processes the requests from the input ports according to a predetermined priority. For example, the refresh port has the highest priority and the host port has the lowest priority. Preferably, the disk port has a priority that is exceeded only by the priority of the refresh port. The buffer prioritizer polls the input ports and selects the request having the highest priority by generating a signal on that port's select line. When a port is selected, the buffer prioritizer holds the signals on the other port select lines in a fixed state.

The buffer prioritizer generates a signal GO in response to the signal on the port select line. Signal GO initiates operation of a memory sequencer in the page mode buffer memory controller. The memory sequencer also receives the signals on the port select lines so that the memory sequencer knows which port was selected by the buffer prioritizer.

The memory sequencer generates control signals for buffer memory as well as control signals for a buffer address generator and a disk byte counter. In addition, the memory sequencer generates acknowledge signals to the selected port, a host enable signal to the host port if the host port is selected, and a disk request reset signal to the disk port when the disk port is selected.

More specifically, the memory sequencer controls operations in a refresh cycle that refreshes the buffer memory, in a disk cycle that transfers data between a disk and the buffer memory, and in a host cycle that transfers data between the host and the buffer memory. In each cycle, the memory sequencer first generates signal to initialize the page mode buffer memory controller for the cycle. Next, the memory sequencer generates the control signals either to transfer a page of data between the buffer memory and the selected port, or to refresh the buffer memory if the refresh request is selected. Finally, the memory sequencer resets itself so that it is ready for the next signal GO from the buffer prioritizer.

Consequently, the only overhead clock cycles are in the initialization and termination of the data transfer.

An important aspect of this invention is that the memory sequencer continues to generate control signals for the transfer of data between the buffer memory and the selected port until the data transfer is done or the transfer is interrupted by a higher priority request. For example, the memory sequencer transfers up to the Nb byte page of data between the host port and the buffer memory unless a disk request or a refresh request is received by the buffer prioritizer. When the buffer prioritizer receives a higher priority request, the buffer prioritizer generate a host interrupt. In response to the host interrupt, the memory sequencer interrupts the host memory transfer and resets itself so that it is ready to begin the higher priority operation.

The locations in the buffer memory that are accessed in the data transfer are controlled by a buffer address generator. Initially, the buffer prioritizer provides the port select signal to buffer address generator. The buffer address generator uses the port select signal to select the starting address in the buffer memory for the data transfer. As each data byte is transferred, the memory sequencer increments the address in the buffer address generator.

The buffer address generator sends a signal to the memory sequencer when a page boundary in the buffer memory is encountered. In response to the page boundary signal, the memory sequencer interrupts the data transfer and updates the buffer address.

A disk first-in-first out (FIFO) circuit includes a FIFO memory that is used in the transfer of data between the disk and the buffer memory. In a read from the disk, data is loaded into the FIFO memory and when the FIFO memory contains Nd bytes of data, the disk FIFO circuit issues a disk request to the buffer prioritizer. In a write to the disk, the disk FIFO circuit detects the write command and the fact that the FIFO memory is empty. Consequently, the disk FIFO circuit generates the disk request.

In response to the disk request, the buffer prioritizer generates a signal on the disk port select line and signal GO. The memory sequencer in the initialization process loads a disk byte counter with the number of bytes in a disk transfer page, i.e, Nd bytes. The Nd bytes in the FIFO memory are then transferred to the buffer memory under the control of the memory sequencer. When the disk byte counter determines that the Nd bytes have been transferred, the disk byte counter generates a signal to the memory sequencer to indicate completion of the transfer. Consequently, the memory sequencer terminates the data transfer. Again the transfer of up to an Nd byte page of data reduces the overhead clock cycles in comparison to the prior art buffer memory controllers that only transferred four bytes of data between overhead cycles.

BRIEF DESCRIPTION OF THE DRAWINGS

FIG. 1 is a timing diagram for a four byte transfer to or from a buffer memory by a prior art buffer memory controller.

FIG. 2 is a block diagram of one integrated circuit that contains the page mode buffer memory controller of this invention.

FIG. 3 is a block diagram of the page mode buffer memory controller of this invention.

FIG. 4 is a state diagram for the state machine in the memory sequencer of the page mode buffer memory controller of this invention.

FIG. 5 is a timing diagram for the buffer memory refresh cycle of the page mode buffer memory controller of this invention.

FIG. 6 is a timing diagram for data transfer between a host port and a buffer memory by the page mode buffer memory controller of this invention.

FIG. 7A is a schematic diagram of one embodiment of a circuit for high speed processing of the deassertion of the host port request signal when all data has been transferred between the host port and the buffer memory.

FIG. 7B is a timing diagram illustrating the operation of the circuit of FIG. 7A.

FIG. 8 is a timing diagram when the host port is active and is interrupted by the page mode buffer memory controller of this invention in response to a request from another port.

FIG. 9 is a timing diagram for data transfer between a FIFO memory and buffer memory by the page mode buffer memory controller of this invention in a disk cycle.

FIG. 10 is a timing diagram that illustrates the interruption of a write to the buffer memory during a disk cycle When the FIFO memory is unavailable, FIG. 11 is a timing diagram that illustrates the interruption of a read to the buffer memory during a disk cycle when the FIFO memory is unavailable, FIG. 12 is a timing diagram which illustrates the interruption of the data transfer by page mode buffer memory controller of this invention when a page boundary of the buffer memory is encountered.

FIG. 13 is a key to FIGS. 13A and 13B, which are a timing diagram illustrating the number of clock cycles required to respond to a disk request when another request is active and a refresh request and a page boundary request are encountered which in turn defines the necessary size of the FIFO memory according to the principle of this invention, FIGS. 14A, 14B, 14C, and 15 are a schematic diagram of the buffer prioritizer of this invention.

FIG. 16 is a schematic diagram of module REFPORT in the buffer prioritizer of this invention.

FIG. 17 is a schematic diagram for each of modules DISKPORT, ECCPORT, PDPORT, and PHPORT of the buffer prioritizer of this invention.

FIG. 18 is a schematic diagram of module HOSTPORT of the buffer prioritizer of this invention.

FIG. 19 is a key to FIGS. 19A and 19B, which are a schematic diagram of the refresh timer of this invention.

FIGS. 20A and 20B are a block diagram of the memory sequencer of this invention that includes modules WAITBC, MEMSTAT, and MEMCTL.

FIG. 21 is a key to FIGS. 21A and 21B, which are a detailed schematic diagram of module WAITBC in the memory sequencer of this invention.

FIG. 22 is a detailed schematic diagram of module MEMSTAT in the memory sequencer of this invention.

FIGS. 23A to 23C, 24, 25, 26 and 27 are detailed schematic diagrams of module MEMCTL in the memory sequencer of this invention.

FIG. 28A, which is a key of FIGS. 28A-1 and 28A-2, FIG. 28B, which is a key for FIGS. 26B-1 and 28B-2, and FIG. 29 are a schematic diagram of the buffer address generator of this invention.

FIGS. 30A to 30D and 31 are a schematic diagram of the portion of module BAMUX of the buffer address generator of this invention that generates a signal on line ADRUPD.

FIG. 32 is, a key to FIGS. 32A and 32B, which are a more detailed schematic diagram of module XFRGEN of the buffer address generator of this invention.

FIGS. 33A and 33B are a schematic diagram of the disk FIFO circuit of this invention.

FIG. 34, which is a key to FIGS. 34A and 34B, and FIGS. 35A and 35B are a more detailed schematic diagram of the module DFSTAT in the DFIFO circuit of FIGS. 33A and 33B.

DETAILED DESCRIPTION

According to the principles of this invention, a disk drive includes a page mode buffer memory controller 200 (FIG. 2) that is used to control transfer of data from and to buffer memory 250. As explained more completely below, page mode buffer memory controller 200 transfers a page of Nb data bytes from buffer memory 250 to a host of the disk drive if the data transfer is not interrupted by another request to page mode buffer memory controller 200. The transfer of Nb data bytes requires only four overhead clock cycles, in this embodiment.

If page size Nb is 512 bytes, one hundred twenty-eight transfers of four data bytes would be required using the prior art buffer memory controller. The overhead for each of the prior art one hundred twenty-eight transfers was four clock cycles. Thus, page mode buffer memory controller 200 of this invention is significantly faster than the prior art systems because the data transfer overhead is significantly reduced.

In one embodiment, page mode buffer memory controller 200 is included in an integrated circuit that includes disk sequencer 210, servo sequencer 211, disk microprocessor interface circuit 223, microprocessor communications circuit 222, host microprocessor interface 221, and oscillator and reset circuit 270. Output lines from servo sequencer 211 and disk sequencer 210 form disk interface 212. Output lines from servo sequencer 211 and disk microprocessor interface 223 form disk microprocessor interface 225. Similarly, output lines from microprocessor communications circuit 222 and host microprocessor circuit form host microprocessor interface 224. The host microprocessor and the disk microprocessor may be either two distinct microprocessors or a single microprocessor that performs both functions.

The particular circuits included with buffer memory controller 200 of this invention on an integrated circuit are not an essential aspect of this invention. The important aspect is, as explained more completely below, that buffer memory controller 200 is provided with certain information and signals so that buffer memory controller 200 can use the novel page mode operations to transfer data between a disk and buffer memory 250 or between a host interface and buffer memory 250. In view of the following more detailed disclosure, those skilled in the art will be able to use page mode buffer memory controller 200 in a wide variety of disk drives to achieve enhanced data transfer rates over prior art systems.

In the embodiment illustrated in FIG. 2, page mode buffer memory controller 200 processes requests from a predetermined number of ports, e.g., a refresh port, a disk port, a host port, an error correction port, a host microprocessor port, and a disk microprocessor port. For ease of discussion, only the host port, disk port, and refresh port art are considered below. In view of the following description, those skilled in the art can extend the principles of this invention to the microprocessor ports as well as to an ECC port for error correction. Moreover, FIGS. 14A to 35B are detailed schematic drawings of a page mode buffer controller with six ports according to the principles of this invention.

In a data transfer between the disk port and buffer memory 250, the data transfer direction and the disk port are enabled by the disk microprocessor setting bits in a register that in turn enable the disk port and define the data transfer direction in buffer memory controller 200. In addition, the microprocessor loads a register with a pointer to the location in buffer memory 250 where the data transfer operation begins. Both the read and write operations for the disk port are initiated by a disk first-in-first-out (FIFO) circuit within buffer memory controller 200 issuing a disk request signal.

In a write to the disk, the disk FIFO circuit detects that a write is requested, but the FIFO memory is empty. Consequently, the disk FIFO circuit issues the disk request signal. In response to the disk request signal buffer control 200 starts to load data, i.e., prefetch data, into the FIFO memory.

In a read operation from the disk, disk sequencer 210 loads data into the FIFO memory in the disk FIFO circuit. When the FIFO memory contains a predetermined number of bytes, the disk FIFO circuit issues the disk request signal. An important aspect of this invention, as explained more completely below, is defining the predetermined number of bytes that are loaded in the FIFO memory before the disk request signal is generated. The predetermined number of bytes Nd defines the page size for data transfers to and from the disk FIFO memory.

In a data transfer between the host port and buffer memory 250, the data transfer direction and the host port are enabled by the host microprocessor setting bits in a register that in turn enable the host port and define the data transfer direction in buffer memory controller 200. The microprocessor also loads a register with a pointer to the location in buffer memory 250 for the data transfer. Buffer memory controller 200 begins transfer of data between the host port and buffer memory 250 upon receipt of a host request signal.

Data is transferred until the host port deasserts the host request signal or until buffer memory controller 200 interrupts the data transfer after receiving a request from another port. An important aspect of this invention, as described more completely below, is cleanly terminating the data transfer when the host port deasserts the host request signal.

Buffer memory 250 is typically either 256 Kbytes or 1 Mbyte dynamic random access memory (DRAM). A 256 Kbyte DRAM has a 512 byte page size while a 1 Mbyte DRAM has a 1024 byte page size. As is known to those skilled in the art, a DRAM must be periodically refreshed. Buffer memory controller 200 internally generates a refresh request to the refresh port based upon a refresh period that is stored in a refresh timer register.

Irrespective of the port, each data byte transferred by page mode buffer memory controller 200 requires a minimum of two clock cycles and the number of overhead bytes to initiate and terminate the data transfer is four clock cycles. Consequently, the maximum host bandwidth Fh for data transfer by page mode buffer memory controller 200 of this invention is:

$$Fh = \frac{(Nb)\text{Bytes}}{(4+2*Nb)\text{Clock cycle}} \times \frac{(1)\text{Clock cycle}}{(TB)\text{seconds}}$$
$$= \frac{Nb * Fb}{(4+2*Nb)} \text{ MBytes/second}$$

where
$Fb=1/Tb$.

For a 256 KByte buffer memory 250, page size Nb is 512 bytes. Hence, for a 40 MHz buffer clock, the maximum host bandwidth Fh is 19.85 MBytes/second. Consequently, page mode buffer memory controller 200 of this invention is up to about fifty percent faster than the prior art buffer memory controllers for a 256 Kbyte buffer memory.

Page size Nb increases as the size of buffer memory 250 increases. As page size Nb becomes larger, the four overhead clock cycles become less important and the host port bandwidth approaches the maximum instantaneous buffer bandwidth FB, as defined below. Consequently, page mode buffer memory controller 200 significantly abates the limitation on performance associated with prior art buffer memory controllers that transferred only four data bytes between overhead cycles.

A more detailed block diagram of one embodiment of page mode buffer memory controller 200 of this invention with three ports, a host port 301, a disk port 302, and a memory refresh port 303 is illustrated in FIG. 3. Page mode buffer memory controller 200 includes buffer prioritizer 305, memory sequencer 306, disk FIFO circuit 307, refresh counter 308, buffer address generator 309, and disk byte counter 310.

Buffer prioritizer 305 receives request signals on port input lines RREQ, HREQ, and DREQ and generates control output signals, as described more completely below, to memory sequencer 306, disk byte counter 310 and buffer address generator 309. In the following description, a line and the signal on the line have the same reference characters.

Refresh counter 308 repetitively loads itself with a refresh time period, that is stored in a register, for refreshing buffer DRAM 250. After refresh counter 308 is loaded, counter 308 counts down and generates a refresh request on line RREQ at the end of each refresh time period.

Memory sequencer 306 includes a state machine that generates control signals for buffer DRAM 250 as well as control signals for buffer address generator 309 and disk byte counter 310. In addition, memory sequencer 306 generates acknowledge signals to each port 301, 302, and 303, a host enable signal to host port 301, and a reset signal to disk port 302.

Buffer address generator 309, as its name suggests, generates the addresses for the locations in DRAM 250 that are used in the data transfer. Specifically, the disk pointer and the host pointer are selected as the buffer address from buffer address generator 309 when disk port 302 and host port 301, respectively, are selected by buffer prioritizer 305.

In this embodiment, the microprocessor controlling the data transfer preloads the initial buffer and disk pointer values in buffer address generator 309 during the initialization of page mode buffer memory controller 200 for the data transfer. Memory sequencer 306 increments the pointer after each byte of data is transferred. Disk byte counter 310 monitors the number of bytes transferred through disk FIFO circuit 307 and sends a "DISKDONE" signal to memory sequencer 306 after the number of bytes Nd in a disk access have been transferred.

Buffer prioritizer 305 processes the signals on host port input line HREQ from host interface 320, refresh port input line RREQ from refresh counter 308, and disk port input line DREQ from disk FIFO circuit 307. Each of ports 301, 302, 303 is assigned a priority and buffer prioritizer 305 processes the requests from ports 301, 302, 303 in the order of their priority.

When the highest priority request is selected, buffer prioritizer 305 sends a "GO" signal to memory sequencer 306 and indicates to memory sequencer 306 via port select signals (SELHOST, SELDISK, SELRFRSH) which port is selected. The signal driving line GO is preferably a latched signal and is a logic OR function of the signals on port select lines SELHOST, SELDISK, and SELRFRSH. Buffer prioritizer 305 also sends signals to buffer address generator 309 that identify the port selected when the selected port is other than refresh port 303.

In buffer prioritizer 305, refresh port 303 always has the highest priority and in this embodiment, host port 301 has the lowest priority so that disk port 302 has an intermediate priority. When page mode buffer memory controller 200 has more than three ports, the refresh port has the highest priority and is usually immediately followed by the disk port. If the priority of another port is moved above the disk port, the size of the FIFO memory in disk FIFO circuit 307 must be large enough to hold the data transferred from the disk until the disk request on line DREQ is processed by buffer prioritizer 305.

As the FIFO memory size increases, the silicon required for the integrated circuit containing buffer memory controller 200 also increases. Hence, the priority of the ports may affect the size of the integrated circuit containing page mode buffer memory controller 200. The effects of the size of the FIFO memory in disk FIFO circuit 307 on buffer memory controller 200 are described in more detail below.

The signal on host interrupt line HOSTINT from buffer prioritizer 305 to memory sequencer 306 is driven active whenever the signal on host port input line HREQ is selected and the signal on another port input line goes active.

When the signal on line GO is driven active, memory sequencer 306 generates control signals for DRAM 250. Memory sequencer 306 also generates control signals for the other components in page mode buffer memory controller 200. The control signals generated depend upon the port selected by buffer prioritizer 305 and the sequence of operations within memory sequencer 306. Specifically, in this embodiment a state machine is included in memory sequencer 306. A state diagram for the state machine is illustrated in FIG. 4. If the control signals generated in a particular state are different for different ports, the control signals generated in that state are determined by a decode of the state and the port select signal.

Briefly, memory sequencer 306 has six states S0, S1, S3, S2, S6, and S4 in this embodiment. (In the drawings other than FIG. 4, only the number in the reference numeral is used to represent the state.) The states are numbered so that in a branch between states only one bit in the bits representing the state changes. The general operations performed in each state are substantially the same for a read and a write to buffer memory 250. However, as explained more completely below, the operations in some states for a buffer memory refresh (refresh) are different. Thus, the general operations in each state are first described and then the specific actions for each mode of operation are explained more completely with timing diagrams.

For all modes of operation, state S0 is the idle state of memory sequencer 306. In state S1 for read and write operations, the row address strobe signal RAS- is set and disk byte counter 310 is loaded with the disk port page size Nd. The appropriate pointer for buffer memory 250 is also selected in buffer address generator 309. In state S1 for a refresh cycle, both row address strobe signal RAS- and column address strobe signal CAS- are set, as explained more completely below.

In state S3, the pointer selected in buffer address generator 309 is incremented and the wait count for buffer memory 250 is loaded. State S2 sets (1) column address strobe signal CAS- and (ii) an acknowledge signal to the selected port, and increments (i) the wait count and (ii) the value in disk byte counter 310.

Processing branches from state S2 to either state S3 or state S6 depending on whether signal DONE is active or inactive and whether signal WAIT is active or inactive. As explained more completely below, signal DONE is used to stop data transfer either when all the data has been transferred or when the data transfer is interrupted. Prior to considering the general operations in states S6 and S4 of the state machine, the conditions used to control the branching in the state machine from state S2, i.e., the stopping of data transfer, are considered briefly.

Specifically, in this embodiment a signal "DONE" is:

DONE=SELDISK ●DISKDONE+SELHOST●HREQ +SELRFRSH+SELHOST●HOSTINT+AUPD where
SELDISK=the signal generated by buffer prioritizer 305 when disk port 302 is selected;
SELHOST=the signal generated by buffer prioritizer 305 when host port 301 is selected;
SELRFRSH=the signal generated by buffer prioritizer 305 when refresh port 303 is selected;
DISKDONE=the signal generated when the value of disk byte counter 310 equals zero, or when the FIFO memory in disk FIFO circuit 307 is unavailable;
HREQ=the complement signal of the signal on host port input line HREQ;
HOSTINT=the signal generated by buffer prioritizer 305 when the host port 301 has been selected and another port issues a request on its input line to buffer prioritizer 305; and
AUPD=the signal generated by buffer address generator 309 to indicate that a page boundary of buffer memory 250 has been reached.

The signal that causes memory sequencer 306 to branch from state S2 to state S3 is a signal "DONE ● WAIT" while the signal that causes a branch from state S2 to state S6 is "DONE ●WAIT". Signal WAIT goes active upon completion of the wait states for buffer memory 250. The symbol "●" in the previous two signals and in the expression for the signal "DONE" above represents a logic AND function and the symbol "+" represents a logic OR function.

In a refresh cycle, the state machine in memory sequencer 306 goes through one cycle because signal SELRFRSH drives signal DONE active, as explained more completely below. Here, a "cycle" refers to the operations performed by the state machine memory sequencer 306 when buffer prioritizer 305 selects the request from that port for processing.

In a host cycle, the state machine in memory sequencer 306 loops through states S3 and S2 until (i) the host deasserts the signal on line HREQ or (ii) another port asserts a request. In this embodiment, host 320 monitors the number of data bytes that are transferred between buffer memory 250 and host 320 and deasserts the host request signal on host port input line HREQ when the data transfer is complete. Thus, signal HREQ goes active and signal SELHOST is active and so signal DONE goes active. As explained more completely below, a series of operations are required when signal HREQ is deasserted to prevent the high speed operation of page mode buffer prioritizer 200 from generating spurious signals that would place page mode buffer memory controller 200 in an undefined state or overwrite data in buffer memory 250.

As explained above, host port 301 has the lowest priority. Consequently, when another port issues a request, buffer prioritizer 305 generates a signal on line HOSTINT to memory sequencer 306 to interrupt the data transfer. Since signal HOSTINT is active and signal SELHOST is active, signal DONE is driven active. Thus, the state machine branches from state S2 to state S6, after buffer prioritizer 305 generates signal HOSTINT.

In a disk cycle, the data transfer is interrupted, i.e., the state machine branches from state S2 to state S6, when with either disk byte counter 303 expires, i.e., counts the number of bytes Nd loaded in state S1, or the disk FIFO memory is unavailable. Either of these results drives signal DISKDONE active and since signal SELDISK is active, signal DONE goes active. To minimize overhead, signal DREQ is reset and the data transfer between disk FIFO circuit 307 and buffer memory 250 is not resumed at the point where the transfer was interrupted. Disk byte counter 310 is reloaded when the required Nd bytes are available in the disk FIFO memory.

Finally, both the host cycle and the disk cycle are interrupted and processing transfers from state S2 to state S6 in the state machine when a page boundary in buffer memory 250 is reached. Specifically, the lower n bits of the buffer memory address are decoded and the signal on line AUPD from buffer address generator 309 to memory sequencer 306 goes active, which in turn drives the signal DONE active.

Since processing in the state machine of memory sequencer 306 cycles between states S3 and S2 until the data transfer is either complete or interrupted, no additional overhead bytes are encountered for data transfers longer than four bytes unlike the prior art buffer memory controllers. Accordingly, the data transfer to or from buffer memory 250 proceeds with each data byte every two clock cycles plus the number of wait states for buffer memory 250 without encountering the overhead for stopping and restarting the data transfer. Prior art systems simply cycled between states S3 and S2 four times to transfer the four data bytes and then terminated the data transfer. Thus, the uninterrupted transfer of data enhances the buffer bandwidth of page mode buffer memory controller 200 of the invention over the prior art buffer memory controllers.

Returning to the general operations of the state machine in memory sequencer 306, in state S6, the row address strobe signal RAS- is reset and buffer memory 250 wait count is loaded and in state S4, a signal SAMPLE is generated in buffer prioritizer 305 to reinitiate polling of all input ports and the wait count is incremented. In one embodiment, a signal PRESAMPLE is generated during state S6, and signal PRESAMPLE is clocked so that signal SAMPLE is available to buffer prioritizer 305 in state S4. Hence, the generation of signal SAMPLE is included in state S4.

The timing sequence generated by memory sequencer 306 for the refresh cycle is illustrated in FIG. 5. Row "STATE" at the top of FIG. 5 represents the various states of the state machine in memory sequencer 306 during the refresh cycle.

Initially, refresh counter 308 is loaded with a period for buffer memory refresh cycles that the host microprocessor placed in a refresh period register. When refresh counter 308 times out, e.g., counts down to zero in this embodiment, the signal on refresh request line RREQ from refresh counter 308 to buffer prioritizer 305 goes active.

In response to the active signal on refresh port input line RREQ, buffer prioritizer 305 drives a signal on a select refresh line SELRFRSH active, which in turn drives the signal on line GO high. This assumes that memory sequencer 306 is idle when the buffer memory refresh request is generated. If buffer prioritizer 305 has selected host port 301 when the buffer memory refresh request is received from port 303, the host port data transfer is interrupted, as explained more completely below. If disk port 302 is selected, the refresh request is delayed until the disk port access is completed. The disk port access is completed when (i) disk byte counter 310 expires, (ii) the FIFO memory in disk FIFO circuit 307 becomes unavailable, or (iii) a DRAM page boundary is reached, i.e., signal AUPD is asserted. Each of these conditions causes memory sequencer 306 to reset signal DREQ when passing through state S6.

Irrespective of the operation being performed by memory sequencer 306 when the refresh request is first asserted, the state machine is idle in state SO when the buffer memory refresh request is processed by memory sequencer 306. Hence, as shown in FIG. 5, signal RREQ goes active at some unknown time and is active when the state machine is in state SO. (The names on the left side of FIG. 5 represent the lines that carry the signals illustrated. For convenience, the reference characters for a line and the reference characters for the signal on the line are taken as the same herein).

As indicated above, in response to the active signal on line RREQ, buffer prioritizer 305 drives the signal on line SELRFRSH active which in turn drives signal GO active. When the signal on line SELRFRSH goes active, a hold signal in buffer prioritizer 305 goes active to hold the signals on the various select lines from buffer prioritizer 305 in their current states.

The active signal on line GO causes the state machine to branch from state SO to state S1. In state S1 with the signal on line SELRFRSH active, the row address strobe signal RAS- and the column address strobe signal CAS- to buffer memory 250 are set active by the state machine in memory sequencer 306. More importantly, in this embodiment, column address strobe signal CAS- is driven active before row address strobe signal RAS- is driven active. As is known to those skilled in the art, the necessary sequencing of signals CAS- and RAS- is defined by the DRAM used as buffer memory 250. Thus, this sequence of operations is illustrative only of a preferred buffer memory refresh cycle and is not intended to limit the invention to this particular embodiment.

In addition in state S1, disk byte counter 310 may be loaded. However, since disk byte counter 310 is not used in the refresh cycle and is reinitialized in any subsequent cycle, this operation is unimportant. The signal on acknowledge refresh request line RACK- to refresh port 303 is also driven active in state S1. In this embodiment, the active signal on line RACK- resets the refresh request signal on line RREQ. However, in general, signal RREQ need only be reset upon completion of state S4 so that the signal seen by buffer prioritizer 305 on line RREQ is inactive.

Upon completion of state S1, memory sequencer 306 proceeds through states S3 and S2. As explained above, the operations in state S3 are unimportant.

In state S2, the state machine checks to ascertain whether the signal on line DONE is active. The signal on line DONE is active whenever the signal on line SELRFRSH is active. Consequently, the state machine in memory sequencer 306 always branches from state S2 to state S6 in the refresh cycle.

In state S6, the active signals on lines RAS- and CAS- are reset, a signal PRESAMPLE is generated and the buffer memory wait count is loaded if enabled. Upon completion of the operations in state S6, memory sequencer goes to state S4 where signal PRESAMPLE is used to generate a signal SAMPLE in buffer prioritizer 305. Signal SAMPLE drives signal HOLD inactive so that buffer prioritizer 305 again begins to poll the various ports for a request. The state machine returns to idle state S0, if no wait states are required. If wait states are required, memory sequencer 306 stays at state S4 for two clock cycles to allow sufficient row address strobe refresh time, as one skilled in the art can see is required. These wait states are required only at the end of the refresh cycle.

In the host cycle, the host microprocessor in host 320 loads a pointer for the location in buffer memory 250 to read or write data, enables the host port, specifies the data transfer direction, and drives the signal on line HREQ active (FIG. 6). Again, in FIG. 6 the numbers in the top row of the figure represent the various states (FIG. 4) of the state machine in memory sequencer 306.

As buffer prioritizer 305 polls the ports, the active signal on line HREQ is detected and the signal on lines GO and SELHOST are driven active if no other port has issued a request. When the signal on line SELHOST goes active, a hold signal in buffer prioritizer 305 goes active to hold the signals on the various select lines from buffer prioritizer 305 in their current states.

In response to the active signals on lines GO and SELHOST, the state machine in memory sequencer 306 leaves idle state S0 and branches to state S1. In state S1, the row address strobe signal RAS- is set active (FIG. 6) by memory sequencer 306. Signal SELHOST to buffer address generator 309 selects the host pointer that was loaded in buffer address generator 309 upon initialization of the data transfer between host port 301 and buffer memory 250 by the host microprocessor. Memory sequencer 306 sends a signal SEL-ROW to buffer address generator 309 to select the appropriate row address bits for the size of the DRAM in buffer memory 250.

Upon completion of the operations in state S1, the state machine branches to state S3. In state S3, signal INCRHP- to buffer address generator 309 is driven active by memory sequencer 306. Also, if disk buffer memory 250 has wait states, the wait state count is loaded. In this embodiment, buffer memory 250 has "0" wait states and so the time delay associated with the wait states is not considered further. However, in view of this disclosure, the operations necessary to implement buffer memory wait states will be apparent to those skilled in the art. Since processing in state S3 is completed, the state machine branches to state S2.

In state S2, memory sequencer 306 sets column address strobe signal CAS- active. As illustrated in FIG. 6, the column address strobe signal CAS- is active for one and one-half clock cycles. In one embodiment, to generate the one and one-half clock cycle column address strobe signal CAS-, two signals are used. A first signal goes active at the start of stage S2 and remains active for two clock cycles. A second signal goes active on the half clock cycle in stage S2 and also remains active for two clock cycles. The column address strobe signal CAS- is the logic AND function of these two signals. As is known to those skilled in the art, the active signal on line CAS- places data on the bus between buffer memory 250 and the host port.

Also, in state S2 the host port acknowledge signal, in this case either HACKR- or HACKW- depending on whether the operation is a read or a write, is set active for one clock cycle by memory sequencer 306. Host acknowledge read signal HACKR- is active during the last complete clock cycle of the one and one-half clock cycles when column address strobe signal CAS- is active. Host acknowledge write signal HACKW- goes active when column address strobe signal CAS- goes active and is active for one clock cycle.

The transfer of data between buffer memory and host port 301 while signal CAS- is active is well known to those skilled in the art. In the figures, a data bus (not shown) connects buffer memory 250 to host 320. The data is transferred over this data bus.

In this embodiment, since there are no wait states, signal WAIT is active. Similarly, signal DONE is not active because signal HREQ is inactive. Accordingly, processing continues to cycle between states S3 and state S2. When host system 320 determines that the last byte of data is being set, the host request signal on host port input line HREQ is driven low (FIG. 6). Thus, column address signal CAS- in interval AA either transmits or receives the last data byte between buffer memory 250 and host 320.

However, memory sequencer 306 does not know when the signal on line HREQ will be disasserted. Further, since buffer memory controller 200 is in page mode operation, the operations are extremely high speed. If column address strobe signal CAS- and host acknowledge signal HACK- continue to cycle, as shown by the dotted lines in FIG. 6, memory sequencer 306, in a write operation to memory 250, may overwrite valid data.

To prevent any erroneous operations, memory sequencer 306 must hold column address strobe signal CAS- inactive when signal HREQ is deasserted. Similarly, buffer address generator 309 must not be incremented and another acknowledge signal must not be sent to host port 301 by memory sequencer 306.

When signal HREQ is deasserted with signal SELHOST active, signal DONE is driven active. When signal DONE is active and signal HREQ is inactive, signal DSBLHXFR on the disable host transfer line is driven active by memory sequencer 306. Similarly, signal HOLDHP on hold host pointer line also is driven active, and the next active edge on line INCRHP- is delayed until signal HOLDHP places the host pointer in a hold mode.

Signal DSBLHXFR disables column address strobe signal CAS- and host acknowledge signal HACKR- (HACKW-) so that these signals remain inactive in stage S2 after signal HREQ goes inactive. At the end of stage S2 since signal DONE is active, processing branches to state S6. In state S6, as previously described, signal PRESAMPLE is generated, and row address strobe signal RAS- is reset. In state S4, signal SAMPLE goes active in buffer prioritizer 305 and the signals on lines GO and SELHOST go inactive. Also in state S4, the delay on the next active edge on line INCRHP- is released, so that the active edge on line INCRHP- occurs while the host pointer for buffer memory 250 is held in the hold mode by the active signal on line HOLDHP. The disable signal for the column address strobe and the host acknowledge signals and the holding of the pointer position in buffer address generator 309 are an important aspect of this invention.

For high speed buffer clocks, e.g. clocks with a period approaching the speed of the technology used to implement buffer memory controller 200, signal HREQ must be driven inactive by the host very rapidly after signal HACK- goes active for the last data byte. Consequently, the layout of the integrated circuit containing page mode buffer controller 200 becomes critical for such high speed applications because layout induced time delays may prevent proper termination of the host port request. Accordingly, in one embodiment, signal HREQ is driven inactive on the next to the last byte in the data transfer between host port 301 and buffer memory 250. The inactive signal on host port input line RREQ is qualified when signal HACK- goes active for the last byte.

A circuit 700 for eliminating the timing limitations for high speed buffer clocks when signal HREQ is driven inactive is illustrated in FIG. 7A. Port input line HREQ is connected to input terminal D of a D-type flip-flop 701. Line HACK- drives an input terminal of invertor 702. The output terminal of invertor 702 is connected to the clock terminal of flip-flop 701 and line SELHOST is connected to the reset terminal of flip-flop 701. Output terminal Q of flip-flop 701 drives a first input terminal of OR gate 703 and line HREQ drives a second input terminal of OR gate 703. The output terminal of OR gate 703 drives line HREQI.

FIG. 7B illustrates the operation of circuit 700. When the host drives the signal on line HREQ active, the signal on line HREQI also is driven active. The host drives the signal on line HREQ inactive on the next to last time signal HACK- is driven active (low), i.e., for the next to last data transfer. The host has at least time $t_r$ to deassert signal HREQ.

When signal HACK- goes active for transfer of the last data byte, the low signal on line HREQ is clocked through flip-flop 701 to line HREQI and so the signal on line HREQI is driven low. The only delay seen by buffer prioritizer 305 is the small internal time delay of buffer memory controller 200. Moreover, the signal on line HREQI is equivalent to the signal HREQ in FIG. 6. Circuit 700 does require a modification to the host interface circuit so that signal HREQ is driven inactive upon transfer of the next to last data byte. However, such a change is clearly within the capability of one skilled in the art.

Another possible way in which the host cycle may be interrupted is for another port to assert a request to buffer prioritizer 305. For the purposes of illustration, assume that disk port 303 asserts an active signal on line DREQ while the signal on line HREQ is active (FIG. 8).

Initially, in response to the high signal on line HREQ, buffer prioritizer 305 drives the signal on line SELHOST active which in turn drives the signal on line GO active. Accordingly, the high signal on line GO causes the state machine in memory sequencer 306 to go to state S1. In state S1, the signal on row address strobe line RAS- is driven active and a load pulse is generated on line LOADBC to load disk byte counter 310.

In state S3, the state machine in memory sequencer 306 generates a signal to buffer address generator 309 on line INCRHP- that goes active to increment the address for buffer memory 250. After the host read acknowledge signal HACKR- is set active, the state machine transfers to state S2. In FIG. 8, the host write acknowledge signal HACKW- is not shown. However, the relationship of signal HACKW- to signal CAS- is identical to the relationship described above.

In state S2, the signal on line CAS- is set active to transfer a byte of data and the signal on line INCRHP- is driven inactive. Since signal HREQ is active, signal DONE is inactive and so the state machine branches to state S3. In state S3 in the next memory cycle, the signal on line INCRHP- is again driven active and processing transfers to state S2 which sets the signal on the column address strobe line CAS- active to transfer the next byte of data, the signal on line INCRHP- inactive, and the signal on line HACKR- inactive.

This sequence of cycling between states S3 and S2 continues until disk FIFO circuit 307 generates the disk request on line DREQ to buffer prioritizer 305. Since the arrival time of signal DREQ is not known, signal DREQ is shown in FIG. 8 as arriving sometime in states S2 and S3. When buffer prioritizer 305 detects the disk request on line DREQ, the signal on host interrupt line HOSTINT is driven active in the next cycle.

When the signal on line HOSTINT goes active and the state machine in memory sequencer 306 reaches state S2, the signal on line DONE is active because both the signals on line SELHOST and on line HOSTINT are active. Therefore, processing transfers to state S6 where the signal on line RAS- is reset. After the signal on row address strobe line RAS- is reset, the signal on column address strobe line CAS- is driven inactive on the next clock cycle. The state machine then branches from state S6 to state S4.

In state S4, the signal on line SAMPLE in buffer prioritizer 305 goes high so that buffer prioritizer 305 may sample the ports. Since disk FIFO circuit 307 has set the signal on line DREQ high, when buffer prioritizer 305 samples the ports, prioritizer 305 drives the signal on line SELDISK high which in turn starts the disk cycle which is discussed more completely below.

In a disk cycle, the disk microprocessor must first enable disk port 302 and load an address into buffer address generator 309 that is a pointer to buffer memory 250 for either retrieving or writing data in buffer memory 250. If the operation is a write to the disk, disk FIFO circuit 307 detects that a write has been requested and that the FIFO memory in disk FIFO circuit 307 is empty, and in response asserts a disk request signal on line DREQ to buffer prioritizer 305. Alternatively, for a read operation if disk sequencer 210 has started to load data into the FIFO memory in disk FIFO circuit 307, disk FIFO circuit 307 asserts the disk request signal on line DREQ when the FIFO memory reaches a predetermined level, i.e., a fixed number of bytes, in the FIFO memory.

In response to the active signal on line DREQ, buffer prioritizer 305 generates an active signal on line SELDISK (FIG. 9) which in turn drives the signal on line GO active. When the signal on line SELDISK goes active, a hold signal in buffer prioritizer 305 goes active to hold the signals on the various select lines from buffer prioritizer 305 in their current states. In response to the active signal on line GO, the state machine in memory sequencer 306 branches from state S0 to state S1.

In state S1, the signal on line RAS- (FIG. 9) is driven active on the half cycle by memory sequencer 306. Also, a pulse is generated by memory sequencer 306 on line LDBC to disk byte counter 310. The pulse loads disk byte counter 310 with the predetermined number of bytes Nd that are transferred from or to buffer memory 250 in a disk cycle.

In this embodiment, the predetermined number of bytes Nd that are loaded in disk counter 310 is the same as the predetermined number of bytes that are used in the FIFO memory of disk FIFO circuit 307 to generate the signal on line DREQ. After these operations are completed in state S1, the state machine branches to state S3.

In state S3, signal INCRDP- to buffer address generator 309 increments the disk pointer address for buffer memory 250. After buffer address generator 309 is incremented, the state machine transfers to state S2.

As previously described, in state S2, column address strobe signal CAS- goes active on the half cycle and remains active through the next buffer clock cycle. In state S2, the signal on line INCRDP- is driven inactive. The signal on line INCRBC increments disk byte counter 310. At this time, the signal on line DISKDONE is inactive. Since the signal on line DISKDONE is inactive, the signal DONE is also inactive. Consequently, processing branches from state S2 back to state S3.

In state S3, the signal on line INCRDP- is again driven active to increment the buffer address generator pointer. Also, a decode of state S3 and the active signal on line CAS- is used to generate an active signal on line DACK- to disk FIFO circuit 307 that acknowledges either transfer or receipt of the data byte.

Note that in FIG. 9 only a signal DACK- is illustrated. As for the host cycle described above, in the disk cycle, signal DACK- actually represents a read acknowledge and a write acknowledge, where the write acknowledge signal starts in state S2 on the half cycle and the read acknowledge is active only during state S3. The difference between the acknowledge signals in the read and write operations is caused by the different times when the data on the bus between buffer memory 250 and the FIFO memory in disk FIFO circuit 307 are valid, as is well-known to those skilled in the art.

The cycling between states S3 and S2 continues for Nd bytes of data. When the next to last byte is processed, disk byte counter 310, which is represented by row BCCTR in FIG. 9, has a value of one. This value is decoded and clocked in a flip-flop. The output signal from the flip-flop activates the signal on line DISKDONE which in turn drives signal DONE active.

As previously described, in state S2 when the signal on line DONE is active, processing branches from stage S2 to stage S6. In stage S6, the signal on line RAS- is reset on the half cycle and the signal on line RESET DREQ goes active. In this embodiment, signal DREQ is a latched signal that is set when a threshold for the FIFO memory is crossed, as described above. Latched signal DREQ is reset only when memory sequencer 306 exits states S2 and S3. Processing branches to state S4, where signal SAMPLE is generated and subsequently to idle state S0.

In the disk cycle, the data transfer is interrupted if the FIFO memory becomes unavailable. A timing diagram for interruption of the disk cycle during a write to buffer memory 250 is illustrated in FIG. 10. The signals on lines DREQ, SELDISK, and GO are active (high) and the signal on the row address strobe line RAS- is low, i.e., active. The signals on lines INCRBC, INCRDP-, CAS-, and DACK- are driven active and inactive as the state machine in memory sequencer 306 cycles between states S3 and S2, as described above.

When the FIFO memory reaches a predetermined number of bytes, e.g., one byte, the signal on FIFO almost empty line "ALMOST EMPTY" is driven high by disk FIFO circuit 307. If no additional bytes are loaded into the FIFO memory, the signal on FIFO empty line "FIFO EMPTY" is driven high after the transfer of the next byte. The high signal on line ALMOST EMPTY drives the signal on line FIFO AVAIL inactive.

When the signal on line FIFO AVAIL goes inactive, the signal on line DISKDONE is driven high. Consequently, in state S2 where the signal on line DISKDONE is high and the signal on line SELDISK is high, signal DONE goes high. Accordingly, the state machine in memory sequencer 306 transfers from state S2 to state S6 and in state S6 resets the signal on line RAS-. On the next clock cycle, the signal on line CAS- also goes inactive.

Also in state S6, the signal on the reset disk request line RSTDREQ goes high to disk FIFO circuit 307, which in turn drives the signal on line DREQ low. Therefore, the signal on line SELDISK also goes low as does the signal on line GO. When processing transfers from state S6 to state S4, the signal on line SAMPLE goes high and processing returns to state S0, the idle state wherein buffer prioritizer 305 polls the various ports to ascertain the next request. Disk FIFO circuit 307 does not reassert the signal on line DREQ until the predetermined number of data bytes are loaded in the FIFO memory.

The operations in a read abort when the FIFO becomes unavailable are essentially the same as those just described except in this case the signals on lines FIFO ALMOST FULL and FIFO FULL drive the signal on line DISKDONE active which in turns drives the signal on line DONE active. The timing diagram for this sequence is illustrated in FIG. 11.

As pointed out previously above, both a host cycle and a disk cycle are interrupted at a page boundary of buffer memory 250. The timing diagram for a page boundary interrupt is illustrated in FIG. 12. The signal on line AUPD is a decode of the lower n bits of the selected address and is synchronized with the buffer clock signal. When the signal on line AUPD goes active, the signal drives the signal on line DONE active. Therefore, the state machine in memory sequencer 306 proceeds through states S6, and S4 to state S0.

The signal on line AUPD may go active either in state S3 or state S2 depending upon the clock speed. The only requirement is that the signal on line AUPD be active at state S2 so that in the incrementing from address 01FF to 0200, for example, at the page boundary, the signal on line DONE is driven high, i.e., active. Also, the buffer address that is actually seen by buffer DRAM 250 is delayed from the address counter by memory sequencer 306 to hide the counter response time and to increase the clock speed. Notice that the page boundary update introduces four extra clock cycles into the data transfer.

In this embodiment, data transfers to host 320 are 512 byte (1024 byte for 1M DRAM) page mode accesses with interrupts from the other ports taking away bandwidth. To illustrate the host bandwidth Fh, several different factors must be considered. To facilitate the bandwidth description, the variables defined in TABLE 1 are used.

TABLE I

DEFINITION OF TERMS

| | |
|---|---|
| FB = MAXIMUM INSTANTANEOUS BUFFER BANDWIDTH | D = DISK TRANSFER |
| | mS = MILLISECONDS |
| Fh = HOST BANDWIDTH (MB/S) | uS = MICROSECONDS |
| Fdb = DISK BANDWIDTH (MB/S) | nS = NANOSECONDS |
| Fb = BUFFER CLOCK FREQUENCY (MHZ or MC/S) | Mb = MEGABITS |
| | MB = MEGABYTES |
| Fd = DISK NRZ RATE (MB/S) | B = BYTES |
| Fr = REFRESH RATE (MR/S) | C = CLOCKS |
| Frb = REFRESH RATE (MB/S) | W = WAIT STATES |
| Fref = REFRESH RATE (REFRESHES/TIME) | Nb = NUMBER OF BYTES IN DRAM PAGE |
| Tr = REFRESH PERIOD (S) | Nd = NUMBER OF BYTES IN DISK ACCESS |
| Td = DISK BYTE PERIOD (S) | |
| P = PAGE UPDATE | |

In the calculations of the maximum instantaneous buffer bandwidth above, the assumption was made that one data byte was transferred every two clock cycles. Implicit in this assumption was the fact that no wait states were used for buffer memory 250. A more general definition includes wait states. Hence, the maximum instantaneous buffer bandwidth FB is transfer of one byte every (2+W) clock cycles where the number of wait states is W.

$$FB = \frac{1 \text{ Byte}}{(2+W)\text{Clocks}} \times Fb \frac{M \text{ Clocks}}{S} = \frac{Fb}{2+W} \text{ MB/S}$$

As shown in FIG. 12 above, the data transfer is interrupted in both the host and disk cycles when a DRAM page boundary is encountered. There is a page update every Nb bytes where Nb is the page size of buffer memory 250. There are eight total clock cycles of overhead associated with the update, i.e., four bytes of overhead for the transfer prior to the page boundary and four bytes of overhead for the transfer following the page boundary update. Thus, there are four extra clock cycles introduced by the page boundary update. The total number of clock cycles for a page P is ((2+W) * Nb+8) where each page P has Nb bytes.

The ratio of the number of clock cycles (clocks) added by the page boundary update to the number of clock cycles for a page times the maximum instantaneous bandwidth FB give the bandwidth used by a page boundary update. Thus, $$Fp = \frac{\text{Number of Clocks for update}}{\text{TotalNumber of clocks per page}} \times FB \frac{\text{Mbytes}}{S}$$

$$= \frac{1 \text{ Page}}{((2+W)Nb+8 \text{ Clocks}} \times \frac{4 \text{ Clocks}}{1 \text{ Page}} \times$$

$$\frac{1 \text{ Byte}}{(2+W)\text{Clocks}} \times Fb \frac{M\text{Clocks}}{\text{Second}}$$

$$= \frac{4 \text{ Clocks}}{((2+W)Nb+8)\text{Clocks}} \times \frac{1 \text{ Byte}}{(2+W)\text{Clocks}} \times Fb \frac{M\text{Clocks}}{\text{Second}}$$

$$= \frac{4*Fb}{((2+W)Nb+8)*(2+W)} \text{ MBytes/second.}$$

The bandwidth used for the DRAM refresh is 1 Refresh R per refresh period Tr multiplied by 10 clock cycles per Refresh (see FIG. 5) multiplied by 1 byte per (2+W) clock cycles which gives refresh bandwidth Frb in MB/S equivalence:

$$Frb = \frac{1 \text{ Refresh}}{(Tr)\text{Seconds}} \times \frac{(10+W)\text{Clocks}}{1 \text{ Refresh}} \times \frac{1 \text{ Byte}}{(2+W)\text{Clocks}}$$

$$= \frac{(10+W)Fr}{2+W} \text{ MB/S}$$

where $$Fr = \frac{1}{Tr}.$$

Bandwidth Fdb, used in a disk cycle, is one disk access D every disk byte period Td times the number of bytes Nd in a disk access, which gives disk accesses per second. The disk accesses per second are multiplied by the number of clock cycles (clocks) per disk access to obtain clocks per second. The number of clocks per second is multiplied by the number of bytes transferred per clock to obtain bandwidth Fdb in megabytes per second.

$$Fdb = \frac{1 \text{ Disk Access}}{(Td) \times (Nd)\text{Seconds}} \times$$

$$\frac{((2+W)Nd+8)\text{Clocks}}{1 \text{ Disk Access}} \times \frac{1 \text{Byte}}{(2+W)\text{Clocks}}$$

$$= \frac{((2+W)Nd+8)Fd}{Nd(2+W)} \text{ MB/S}$$

$$= Fd + \frac{8Fd}{(Nd)(2+W)} \text{ MBytes/second}$$

Host bandwidth Fh is the maximum instantaneous buffer bandwidth FB minus the page, refresh, and disk access bandwidths:

$$Fh = FB - Fp - Frb - Fdb$$

To demonstrate the actual host port bandwidth using page mode buffer memory controller 200, the above definitions are used in several examples:

$Fb$ = 40 MHZ
$Fr$ = 512R/8mS = 0.064 MR/S
$Fd$ = 6 MB/S (48 MHZ drive)
$Nb$ = 512 Bytes (256KB DRAM)
$Nd$ = 8 Bytes
0 Wait state Buffer Cycles $FB$ = 40/2 = 20 MB/S
$Fp$ = 2(40)/((2 + 0)512 + 8) = 80/1032 = 0.078 MB/S
$Frb$ = (5)(0.064) = 0.32 MB/S
$Fdb$ = (((2 + 0)(8) + 8)(6))/((2)(8)) = (24)(6)/16 = 9 MB/S
$Fh$ = $FB$ − $Fp$ − $Frb$ − $Fdb$ = 20 − 0.078 − 0.32 − 9 = 10.602 MB/S Fb = 40 MHZ
0 Wait DRAM Buffer Cycles
Fr = 0.32 MB/S (512 R/8 mS)
FB = 40/2 = 20 MB/s

| DISK RATE Fd (MB/s) | Fdb (Nd = 8) | Fh (Nb = 512) (256 KB DRAM) (Fp = 0.078 MB/S) | Fh(Nb = 1024) (1 MB DRAM) (Fp = 0.039 MB/S) |
|---|---|---|---|
| 2 | 3.00 | 16.60 | 16.64 |
| 3 | 4.50 | 15.10 | 15.14 |
| 4 | 6.00 | 13.60 | 13.64 |
| 5 | 7.55 | 12.05 | 12.09 |
| 6 | 9.00 | 10.60 | 10.64 |

| DISK RATE Fd (MB/s) | Fdb (Nd = 12) | Fh (Nb = 512) (256 KB DRAM) (Fp = 0.078 MB/S) | Fh(Nb = 1024) (1 MB DRAM) (Fp = 0.039 MB/S) |
|---|---|---|---|
| 2 | 2.67 | 16.93 | 16.97 |
| 3 | 4.00 | 15.60 | 15.64 |
| 4 | 5.33 | 14.27 | 14.31 |
| 5 | 6.67 | 12.93 | 12.97 |
| 6 | 8.00 | 11.60 | 11.64 |

Fb = 40 MHZ
1 Wait DRAM Buffer Cycles
Fr = 0.35 MB/S (512 R/8 mS)
FB = 40/3 = 13.33 MB/s

| DISK RATE Fd (MB/s) | Fdb (Nd = 8) | Fh (Nb = 512) (256 KB DRAM) (Fp = 0.052 MB/S) | Fh(Nb = 1024) (1 MB DRAM) (Fp = 0.026 MB/S) |
|---|---|---|---|
| 2 | 2.67 | 10.26 | 10.29 |
| 3 | 4.00 | 8.93 | 8.96 |
| 4 | 5.33 | 7.60 | 7.63 |
| 5 | 6.67 | 6.26 | 6.29 |
| 6 | 8.00 | 4.93 | 4.96 |

| DISK RATE Fd (MB/s) | Fdb (Nd = 12) | Fh (Nb = 512) (256 KB DRAM) (Fp = 0.052 MB/S) | Fh(Nb = 1024) (1 MB DRAM) (Fp = 0.026 MB/S) |
|---|---|---|---|
| 2 | 2.44 | 10.49 | 10.52 |
| 3 | 3.67 | 9.26 | 9.29 |
| 4 | 4.89 | 8.04 | 8.07 |
| 5 | 6.11 | 6.82 | 6.85 |
| 6 | 7.33 | 5.60 | 5.63 |

The bandwidth of page mode buffer memory controller 200 has boundaries that are defined by the maximum clock speed and by the clock speed in relation to the disk access size Nd and the number of bytes in the FIFO memory. The disk FIFO memory size is a constant and in this embodiment is 16 bytes.

The disk access size Nd must be selected so that in a write from the disk to buffer memory 250, there is sufficient space in the FIFO memory to prevent a loss of data. Specifically, as described above, disk FIFO circuit 307 asserts signal DREQ when the FIFO memory contains Nd bytes of data. On each subsequent disk byte period $T_d$ another data byte is loaded in the FIFO memory by the disk sequencer. The FIFO memory must be m bytes longer than the Nd bytes required for the disk access, where m is the number of buffer clock cycles required for memory sequencer 306 to start transferring data from the FIFO memory to memory 250 after signal DREQ is asserted.

The worst case scenario is when signal DREQ goes active during a host cycle while a refresh request RREQ is pending. Then, upon starting of the disk cycle in response to signal DREQ, processing is interrupted by a page boundary. The time sequence for the scenario is illustrated in FIG. 13. For uncertainty and safety, the number of clock cycles in this scenario is padded by one. An alternative scenario is that the local microprocessor is accessing the buffer memory and so the host access in FIG. 13 is replaced by a local microprocessor access. Since the local microprocessor access must be two bytes, two additional states S3 and S2 must be added so that two additional clock cycles are required.

The definitions in Table 2 are used to define the relationship between buffer clock speed and disk access size Nd and the FIFO memory size.

TABLE 2

| |
|---|
| BCLK = buffer clock rate(MHZ) |
| BXFRn = worst case number of clocks to get n byte(s) out of the disk FIFO assuming a host cycle is active and interrupted by a refresh cycle and a page boundary occurs on the disk transfer and 1 clock cycle uncertainty in the disk request synchronization. |
| DSKCLK = number of buffer clocks to transfer one byte from the disk (= BCLK/DSKRATE). |
| PAGELENGTH = Number of bytes allowed in a disk page mode access. |
| FIFOADD = number of additional bytes beyond the disk access length (8 or 12). |

For a 0 and 1 wait DRAM Buffer Cycle refer to the following tables.

than 8 in all cases. When 12 byte disk accesses are used, only 4 bytes of FIFO memory remain to absorb new disk data. Therefore, any combination above with FIFOADD greater than 4 is illegal.

In TABLE 3, it is assumed that the local microprocessor is not accessing. If the local microprocessor is accessing then the BXFRN values increase by 2 and FIFOADD will increase accordingly, e.g. for 20 MHz BCLK, 2 MB/s disk rate, FIFOADD would be 2 because BXFR1=20 which is two times the DSKCLK time of 10 clocks. The values increase by two because if the local microprocessor port is active when signal DREQ goes active, the local microprocessor port must finish a two byte access as opposed to the host port immediately aborting after one byte.

TABLE 3

| 0 Wait State DRAM Buffer Cycle | | | | | | | |
|---|---|---|---|---|---|---|---|
| BCLK (MHZ) | BXFR1 (C) | BXFR2 (C) | BXFR3 (C) | BXFR4 (C) | DSKRATE (MB/S) | DSKCLK (C/B) | FIFOADD (BYTES) |
| 20 | 18 | 24 | 26 | 28 | 2 | 10 | 1 |
|    |    |    |    |    | 3 | 6.6 | 2 |
|    |    |    |    |    | 4 | 5 | 3 |
|    |    |    |    |    | 5 | 4 | 5 |
|    |    |    |    |    | 6 | 3.3 | 6 |
| 24 | 18 | 24 | 26 | 28 | 2 | 12 | 1 |
|    |    |    |    |    | 3 | 8 | 2 |
|    |    |    |    |    | 4 | 6 | 3 |
|    |    |    |    |    | 5 | 4.8 | 4 |
|    |    |    |    |    | 6 | 4 | 5 |
| 32 | 18 | 24 | 26 | 28 | 2 | 16 | 1 |
|    |    |    |    |    | 3 | 10 | 1 |
|    |    |    |    |    | 4 | 8 | 2 |
|    |    |    |    |    | 5 | 6 | 3 |
|    |    |    |    |    | 6 | 5 | 3 |
| 36 | 18 | 24 | 26 | 28 | 2 | 18 | 1 |
|    |    |    |    |    | 3 | 12 | 1 |
|    |    |    |    |    | 4 | 9 | 2 |
|    |    |    |    |    | 5 | 7 | 2 |
|    |    |    |    |    | 6 | 6 | 3 |
| 40 | 18 | 24 | 26 | 28 | 2 | 20 | 0 |
|    |    |    |    |    | 3 | 13 | 1 |
|    |    |    |    |    | 4 | 10 | 1 |
|    |    |    |    |    | 5 | 8 | 2 |
|    |    |    |    |    | 6 | 6 | 3 |

Since the disk FIFO memory in this embodiment is 16 bytes, all of the above combinations of BCLK and DSKRATE are acceptable for 8 byte disk accesses because 8 bytes (16-8) of FIFO memory remain and FIFOADD is less

TABLE 4

| | 1 Wait State DRAM Buffer Cycle | | | | | | |
|---|---|---|---|---|---|---|---|
| BCLK (MHZ) | BXFR1 (C) | BXFR2 (C) | BXFR3 (C) | BXFR4 (C) | DSKRATE (MB/S) | DSKCLK (C/B) | FIFOADD (BYTES) |
| 20 | 22 | 29 | 32 | 35 | 2 | 10 | 2 |
| | | | | | 3 | 6.6 | 3 |
| | | | | | 4 | 5 | 4 |
| | | | | | 5 | 4 | 6 |
| | | | | | 6 | 3.3 | 8 |
| 24 | 22 | 29 | 32 | 35 | 2 | 12 | 1 |
| | | | | | 3 | 8 | 2 |
| | | | | | 4 | 6 | 3 |
| | | | | | 5 | 4.8 | 5 |
| | | | | | 6 | 4 | 6 |
| 32 | 22 | 29 | 32 | 35 | 2 | 16 | 1 |
| | | | | | 3 | 10 | 2 |
| | | | | | 4 | 8 | 2 |
| | | | | | 5 | 6 | 3 |
| | | | | | 6 | 5 | 4 |
| 36 | 22 | 29 | 32 | 35 | 2 | 18 | 1 |
| | | | | | 3 | 12 | 1 |
| | | | | | 4 | 9 | 2 |
| | | | | | 5 | 7 | 3 |
| | | | | | 6 | 6 | 3 |
| 40 | 22 | 29 | 32 | 35 | 2 | 20 | 1 |
| | | | | | 3 | 13 | 1 |
| | | | | | 4 | 10 | 2 |
| | | | | | 5 | 8 | 2 |
| | | | | | 6 | 6 | 3 |

Since the disk FIFO memory is 16 bytes in this embodiment, all of the above combinations of BCLK and DSK-RATE are acceptable for 8 byte disk accesses because 8 bytes (16-8) of FIFO memory remain and FIFOADD is less than 8 in all cases.

When 12 byte disk accesses are used, only 4 bytes of FIFO memory remain to absorb new disk data. Therefore, any combination above with FIFOADD greater than 4 is illegal. In TABLE 4 it is assumed that the local microprocessor is not accessing buffer memory 250. If the local microprocessor is accessing buffer memory 250 then the BXFR values increase by 3 and FIFOADD will increase accordingly. For 20 MHz BCLK, 4 MB/s disk rate, FIFOADD would be 7 because BXFR2=29+3+32 which is seven times the DSKCLK time of 5 clocks. The disk puts in 7 bytes after 7×5=32 clocks which is greater than the buffer transfer time for 2 bytes. Checking further, 3 bytes are sent to the buffer after 35 clocks which is still less than 8×5=40, thus FIFOADD=7 is still ok.

In another embodiment of page mode buffer memory controller 200 of this invention, buffer prioritizer 305 has six ports, a refresh port, a disk port, an error correction code (ECC) port, a disk microprocessor port, a host microprocessor port, and a host port. FIGS. 14A, 14B, 14C and FIG. 15 are detailed schematic diagrams of this embodiment of buffer prioritizer 305.

In FIGS. 14A, 14B and 14C, the output lines from FIG. 14A are the input lines to FIG. 14B and the output lines of FIG. 14B are the input lines to FIG. 14C. In FIG. 14A, input lines DREAD, EREAD, PDREAD, PHREAD, and HREAD, are data transfer direction control lines. Line RESET- is the buffer prioritizer reset line. Input line PRESAMPLE carries the presample signal that is generated by the state machine in memory sequencer 306 in state S6. Notice that the signal on line PRESAMPLE is clocked through flip-flop U102. The output signal on terminal NQ of flip-flop U102 is signal SAMPLE that is active in state S4.

Signal SAMPLE is input to a first terminal of NAND gate U103 and signal GO is input to a second input terminal of NAND gate U103. The logic NAND function of signals SAMPLE and GO generates signal HOLD- that is provided to refresh module REFPORT, disk module DISKPORT, ECC module ECCPORT, disk microprocessor module PDPORT, host microprocessor module PHPORT, and host module HOSTPORT. Recall, as previously described, that signal HOLD is used to maintain the select signals after the signal GO is generated until the signal SAMPLE is generated.

Returning to the input lines to buffer prioritizer 305 in FIG. 14A, lines RREQ, DREQ, DISKEN, EREQ, PDREQ, PHREQ, HREQ, ENHREQ, and HOSTEN are the input request and enable lines to buffer prioritizer 305 in this embodiment. Notice that each of the request input lines, i.e., the lines with reference characters ending in "REQ" is connected to the input terminal of a flip-flop and to the reset terminal of the flip-flop so that when the signal on the input line is low, the flip-flop is held in the reset position. Flip-flops U102, U104, U106, U109, U112, U114 and U117 are clocked by buffer clock CLK. AND gates U107, U110, U113, U115, and U118, are used to select the port that has the highest priority. Here the priority is given by the location of the AND gate relative to the top of the drawing. The signals closest to the top have the highest priority. For example, if the signal on line RREQ is active, the signal from terminal NQ of flip-flop U104 is inactive after the signal on line RREQ is clocked in to flip-flop U104. The inactive signal from terminal NQ of flip-flop U104 holds the output signals of logic AND gates U107, U110, U113, U115 and U118 so that only signal RREQ is available.

Output terminal Q of flip-flop U104 drives port REF-PORT. Output terminal Q of flip-flop U106 drives AND gate U107 and the output terminal of AND gate U107 drives disk module DISKPORT.

Similarly, flip-flop 109 and NAND gate U110 are coupled to ECC module ECCPORT; flip-flop U112 and AND gate U113 are coupled to disk microprocessor module PDPORT; flip-flop U114 and AND gate 115 are coupled to host microprocessor module PHPORT; and flip-flop U117 and AND gate 118 are coupled to host module HOSTPORT. NAND GATE U1 is connected to terminal NQ of flip-flops U104, U106, U109, U112 and U113, and is used to generate host interrupt signal INTHOST, sometimes referred to above as HOSTINT. Thus, signal HOSTINT is inactive only when all the signals on line RREQ, DREQ, EREQ, PDREQ and PHREQ are inactive.

The structure of refresh module REFPORT (FIG. 14B) is illustrated in more detail in FIG. 16. Module REFPORT includes a two-to-one multiplexer U1 and a flip-flop U2.

Modules DISKPORT, ECCPORT, PDPORT, and PHPORT, all have the same structure. The structure of these ports is illustrated in FIG. 17. Finally, the structure of host module HOSTPORT is shown in more detail in FIG. 18.

Output terminals SC- (FIG. 14B) from modules REFPORT, DISKPORT, ECCPORT, PDPORT, and PHPORT drive AND gate U128. The output signal from AND gate U128 drives a first input terminal of AND gate U129. The second input terminal of AND gate U129 is driven by output terminal SC- of host port HOSTPORT. The output signal from AND gate U129 is inverted to generate signal GO.

Output signals SELRFRSH, SELDISK, SELECC, SELPD, SELPH, and SELHOST (FIG. 14C) from buffer prioritizer 305 are select control signals. The line with an active signal is determined by the group of AND gates described above. Signals READBUF, WRITE- indicate the operation to be performed. The five line bus SELPRT is used to select the address pointers in buffer address generator 309 which is described more completely below. Finally, output lines and GO were previously described and line HREQ1- carries the logic NAND function of input signal HREQ and the output signal of register U117.

FIG. 15 is a schematic of the local access detector which is used to determine when data is available for the local processor ports to access.

FIG. 19 is a detailed schematic diagram of refresh counter 308 of page mode buffer memory controller 200. Bus RT is connected to the register that contains the refresh time period. NOR gate U331 is used to decode the value 1 so that the signal on line RREQ can be set on the next cycle. Notice that refresh counter 308 is self-loading.

FIGS. 20A and 20B are a more detailed diagram of memory sequencer 306, which is used with buffer prioritizer 305 described above that has six ports. Each of the input lines in FIG. 20A, that has reference characters that start with "SEL" is driven by buffer prioritizer 305 that was just described. Line DBC12 carries a signal that indicates whether disk byte counter 310 is set for a disk access of 12 bytes or a disk access of 8 bytes. Signal FIFODONE- is from disk FIFO circuit 307 and line ADRUPD, sometimes called line AUPD, is from buffer address generator 309 as previously described.

Lines SELECC, SELRFRSH, SELDISK, SELHOST, STATE3-, DBC12, BW0, FIFODONE-, DSBLHXFR-, ADRUPD, PHDONE-, PDDONE-, INTHOST, LDWC, LDBC-, ENBC-, GORESET-, DISKDONE- and CLK are input lines to module WAITBC. Module WAITBC has output lines WAIT, WAIT-, and DONE. Module WAITBC does the wait state processing previously described for the state machine. Specifically, the signal online LDWC is used to load the wait state count in register U102 (FIG. 21). The signal on line BW0 indicates whether there is a zero or a one wait state. Line LDBC and ENBC- carry the signals to load disk byte counter 310 (FIG. 21) and enable disk byte counter 310 respectively. Line DSBLHXFR- carries this signal that is used to disable the column address strobe signals and the acknowledge signals, as described above, when a host transfer is complete. Signal DONE, which is used in the transition from state S2 to S6, is generated by module WAITBC using AND gate U13 and NAND gate U123 (FIG. 21).

In FIG. 20B, module MEMSTATE generates signals that control the branching of the state machine in memory sequencer 306. Signals GO, WAIT, WAIT-, and DONE are input to module MEMSTAT. A detailed schematic diagram of the logic in module MEMSTAT is presented in FIG. 22. This logic controls the branching through the state machine.

The final module in FIG. 20B is module MEMCTL, which is the state machine that controls decodes in memory sequencer 306. Module MEMCTL receives the control signals for branching from module MEMSTAT, signal GO, signal BW0, as well as the port select signals, signal DONE and a clock signal. As described above, module MEMCTL generates the column address strobe, the row address strobe, the signal INCRHP- to increment the host pointer for the buffer memory, signal INCRPH- to increment the host microprocessor port pointer, signal INCRPD- to increment the disk microprocessor port pointer, and signal INCRDP- to increment the disk port pointer. FIGS. 23A, 23B, and 23C, 24, 25, 26 and 27 are a more detailed schematic diagram of the circuitry in module MEMCTL (FIG. 20B).

In FIG. 23A, buffer U1, NOR gate U101, NAND gate U100, NOR gate U13, invertor U137, AND gate U138, D-type flip-flop U102, and NAND gate U103 are the host request abort control circuit. Signal HREQ1- from buffer prioritizer 305 (FIG. 14C) is connected to a first input terminal of NAND gate U100. The signal on line CAS12, that drives invertor U1, indicates that the column address strobe is inactive. The output terminal of invertor U1 drives a second input terminal of NAND gate U100. The output of NAND gate U100 drives the set terminal of D-type flip-flop U102.

Lines MS2, MS1 and MS0 from module MEMSTAT drive NOR gate U101, which is turn is connected to invertor U137 and a first input terminal of NOR gate U13. The other input terminal of NOR gate U13 is connected to output terminal NQ of flip-flop U102. The output terminal of NOR gate U13 drives input terminal D of flip-flop U102. The output terminal of invertor U137 is connected to a first input terminal of AND gate U138 and line SELHOST drives a second input terminal of AND gate U138. The output terminal of AND gate U138 is connected to a first input terminal of NAND gate U103. The second input terminal of NAND gate U103 is connected to output terminal Q of D-type flip-flop U102. The output terminal of NAND gate U103 drives line DSBLHXFR-. The output terminal NQ of flip-flop U102 drives line HOLDHP-.

As previously described, when the host port deasserts the signal of line HREQ, the column address strobe must be held inactive and the address pointer must not be incremented in buffer address generation circuit 309. The signals on lines HOLDHP- and DSBLHXFR- perform these functions. As previously described, the host request abort control circuit is an important aspect of this invention.

The row address strobe generator circuit includes components U105, U106, U107, U108, U109, U110, U111, U113, U115, U116, U117, U118, U119, U120, and U121 (FIG. 23B). The row address strobe generator circuit generates the row address strobe as well as the select row signal, the zero wait state, and one wait state signals.

FIG. 23C is a schematic of the column address strobe generator which includes elements U128, U129, U131, U132, U135, U125 and U126. Specifically, register U131 generates a signal CAS1- add register U135 generates a signal CAS2-. Signals CAS1- and CAS2- are combined by NAND gate U132 to generate the column address strobe signal that is ½ clock cycles long.

FIG. 24 is a schematic diagram of the circuitry used to generate host acknowledge signal HACK-, refresh acknowledge signal RACK-, and ECC acknowledge signal EACK-. FIG. 25 is a schematic diagram of the circuitry used to generate the signals on line PRESAMPLE, load wait count line LDWC, load disk byte counter line LDBC-, and enable disk byte counter ENBC-. FIG. 26 is a schematic diagram of the circuitry used to generate the control signals for the host processor port and the disk processor port respectively. FIG. 27 is a schematic diagram of the circuitry used to generate the address increment control signals. Also, signals WRFIFO- and RDFIFO- are generated to control reading from and writing to the FIFO memory in disk FIFO circuit 307.

Returning briefly to FIG. 20B, signal RSTDREQ-, which is used to reset disk request signal DREQ, is the logic NAND function of signal PRESAMPLE, signal SELDISK and the complement of signal DISKDONE-.

FIGS. 28A, 28B, and 29 are a more detailed schematic diagram of buffer address generator 309. Element DPLAT (FIG. 28A) is a 20 byte latch circuit that is used to capture the disk pointer address. Similarly, module HPLAT is a 20 byte latch that is used to capture the host port address. Elements PHPADDER and PDPADDR increment the buffer memory addresses supplied from the microprocessor host operations and for the microprocessor disk port operations respectively.

The output lines from module DPLAT drive module DPCTR counter which is the address counter for the disk port. Similarly, the output lines from element HPLAT drive element HPCTR. Element DPCTR is a 20 byte up counter. Element HPCTR is a 20 byte up counter with a hold capability because when the host port signal HREQ is deasserted, the host pointer position must be held.

Element BAMUX (FIG. 28B), which is shown in more detail in FIGS. 30A to 30D and 31, is a multiplexer that receives the five line select bus from buffer prioritizer and the addresses from counters and the adders, just described. The element BAMUX selects one of the addresses which is supplied to circuit BALATCH, which is a 10 byte latch circuit. The output from element BALATCH provides the address signal to buffer memory 250.

FIG. 31 illustrates the circuit that is used to decode the output from the multiplexer BAMUX to generate the page date signal on line ADRUPD.

FIG. 29 illustrates element XFRGEN of buffer address generator 309, which is used to control the reloading of the address pointer counters (DPCTR, HPCTR, EPCTR) and the initial values loaded in the latches. A more detailed schematic diagram of element XFRGEN is presented in FIG. 32.

Disk byte counter 310 is illustrated in more detail in FIG. 21. Disk byte counter 310 is a four bit counter.

Disk FIFO circuit 307 is shown in more detail in FIGS. 33A and 33B. The FIFO memory is element FIFOSX8 (FIG. 33B). Element DFSTAT is shown in more detail in FIGS. 34 and 35. Element U100 (FIG. 33A) is an eight bit latch. Element U1 is a 8×2:1 multiplexer. Elements U6 and U7 are 2:1 multiplexers. Element DFRCTR (FIG. 33B) and element DFWCTR are both four bit up counters. Element DFBCTR is a five bit up-down counter.

Module DFSTAT as illustrated in FIG. 34, generates signals on lines EMPTY, DREQ and FIFODONE-. The output signal from element U112, which is a 2:1 multiplexer, to OR gate U113 is high whenever there are eight or twelve bytes of (i) data for a write to disk and (ii) room for a read from disk in the FIFO memory. The output signal from OR gate U113 drives flip-flop U114, which in turn drives lines DREQ.

AND gate U119 drives the reset terminal of flip-flop U114. Flip-flop U114 is reset when the FIFO is either full in a write to buffer memory 250, or empty in a read to buffer memory 250. AND gate U122 drives line FIFODONE-, which provides the full/empty status of the FIFO memory to element WAITBC in memory sequencer 306. The detailed schematic diagram in FIGS. 35A and 35B is used to generate a signal to flush the FIFO memory and as a signal to indicate when the FIFO memory has overrun.

The embodiments of this invention described above are illustrative only of the principles of this invention and are not intended to limit the invention to the embodiments described herein. In view of this disclosure, those skilled-in-the art can utilize the page mode buffer controller of this invention in a wide variety of applications.

I claim:

1. In a disk drive, a structure comprising:

a buffer memory; and an integrated circuit including:

a page mode buffer memory controller operatively coupled to a host port and to said buffer memory, said page mode buffer memory controller comprising:

a buffer prioritizer having a plurality of ports wherein said plurality of ports includes said host port for receiving a host port request signal, and in response to two or more port request signals from said plurality of ports, said buffer prioritizer selects the port select signal having a highest priority; and a memory sequencer coupled to said buffer prioritizer wherein said memory sequencer is responsive to a predetermined signal from said buffer prioritizer;

wherein said memory sequencer transfers an Nb byte page data between said buffer memory and said host port and further wherein said Nb byte page size is determined by the structure of said buffer memory; and said Nb byte page of data is transferred without interruption until one event in a set of events consisting of (i) a buffer memory refresh request signal and (ii) completion of said transfer of said Nb byte page of data occurs so as to limit overhead clock cycles associated with said data transfer thereby optimizing a host port bandwidth of said page mode buffer memory controller.

2. The structure of claim 1 wherein said plurality of ports further comprises a refresh port for receiving said buffer memory refresh request signal.

3. The structure of claim 1 wherein said plurality of ports further comprises a disk port for receiving a disk request signal.

4. The structure of claim 2 wherein buffer prioritizer gives said buffer memory refresh request signal the highest priority.

5. The structure of claim 1 wherein said buffer prioritizer gives said host request signal the lowest priority.

6. The structure of claim 3 wherein said set of events further consists of said disk request signal.

7. The structure of claim 6 wherein said buffer prioritizer interrupts said transfer of said Nb byte page of data to said host port upon receipt of said disk request signal.

8. The structure of claim 7 wherein said buffer prioritizer further comprises a port select line wherein said buffer prioritizer generates a port select signal on said port select line.

9. The structure of claim 1 where said memory sequencer further comprises a state machine.

10. The structure of claim 9 where said memory sequencer includes a memory control module coupled to said buffer memory.

11. The structure of claim 10 where said memory sequencer further comprises a memory state module coupled to said state machine and to said memory control module wherein memory state module generates signals that control branching of said state machine.

12. The structure of claim 11 where said memory sequencer further comprises a wait module coupled to said buffer prioritizer and to said memory control module wherein said wait module generates a signal indicating termination of data transfer between said buffer memory and one of said ports.

13. The structure of claim 1 wherein said page mode buffer memory controller further comprises a disk byte counter responsive to control signals from said memory sequencer.

14. The structure of claim 13 wherein said page mode buffer memory controller further comprises a disk first-in-first-out (FIFO) circuit, operatively coupled to said buffer prioritizer, said memory sequencer, and said disk byte counter, wherein said disk first-in-first-out circuit transfers data between said buffer memory and a disk in said disk drive.

15. The structure of claim 14 wherein said disk FIFO circuit includes a FIFO memory.

16. The structure of claim 15 wherein said disk FIFO circuit generates a disk request signal upon said FIFO memory containing a predetermined number of bytes.

17. A page mode buffer controller for data transfer between a buffer memory, a host, and a disk comprising:
  a buffer prioritizer operatively coupled to a host port, a refresh port, and a disk port wherein said buffer prioritizer generates a port select signal;
  a buffer memory refresh counter operatively coupled to said refresh port wherein said buffer memory refresh counter periodically generates a buffer memory refresh request signal;
  a memory sequencer operatively coupled to said buffer prioritizer wherein said memory sequencer controls transfer of an Nb byte page of data between said buffer memory and said host port, and transfer of an Nd byte page of data between said buffer memory and said disk port;
  a disk first-in-first-out (FIFO) circuit operatively coupled to said disk, said memory sequencer, said buffer memory and said buffer prioritizer wherein said FIFO circuit transfers said Nd byte page of data between said disk and said buffer memory;
  a disk byte counter operatively coupled to said disk FIFO circuit and said memory sequencer wherein said disk byte counter generates a signal upon transfer of said Nd byte page of data; and
  a buffer address generator operatively coupled to said buffer prioritizer, said memory sequencer, and said buffer memory wherein said buffer address generator generates an address specifying a location in said buffer memory for transferring data:
  wherein said Nb byte page of data is transferred without interruption between said buffer memory and said host port until one event in the set of events consisting of (i) said buffer memory refresh request signal, (ii) a disk request signal, and (iii) completion of said Nb byte page of data transfer occurs so as to limit overhead clock cycles associated with said data transfer thereby optimizing a host port bandwidth of said page mode buffer memory controller.

18. The page mode buffer controller of claim 17 wherein said buffer prioritizer, in response to port request signals from one or more of said host, refresh, and disk ports, processes the port request signal having a highest priority.

19. The page mode buffer controller of claim 18 wherein said buffer prioritizer gives said buffer memory refresh request signal the highest priority.

20. The page mode buffer controller of claim 18 wherein said buffer prioritizer gives said host port request signal a lowest priority.

21. The page mode buffer controller of claim 17 wherein said buffer prioritizer interrupts said transfer of said Nb byte page of data to said host port upon receipt of a port request signal from any one of refresh and disk ports.

22. The page mode buffer controller of claim 17 wherein said buffer prioritizer generates a signal GO in response to said port select signal.

23. The page mode buffer controller of claim 17 where said memory sequencer further comprises a state machine.

24. The page mode buffer controller of claim 17 where said memory sequencer includes a memory control module coupled to said buffer memory.

25. The page mode buffer controller of claim 24 where said memory sequencer further comprises a memory state module coupled to said state machine and to said memory control module wherein memory state module generates signals that control branching of said state machine.

26. The page mode buffer controller of claim 25 where said memory sequencer further comprises a wait module coupled to said buffer prioritizer and to said memory control module wherein said wait module generates a signal indicating termination of data transfer between said buffer memory and one of said ports.

27. The page mode buffer controller of claim 17 wherein said disk FIFO circuit includes a FIFO memory.

28. The page mode buffer controller of claim 27 wherein said disk FIFO circuit generates said disk request signal upon said FIFO memory containing a predetermined number of bytes.

* * * * *